(12) United States Patent
Tsuzaki et al.

(10) Patent No.: US 8,351,055 B2
(45) Date of Patent: Jan. 8, 2013

(54) DISPLAY APPARATUS, DISPLAY-APPARATUS CONTROL METHOD AND PROGRAM

(75) Inventors: Ryoichi Tsuzaki, Tokyo (JP); Kazunori Yamaguchi, Kanagawa (JP); Tsutomu Harada, Kanagawa (JP); Mitsuru Tateuchi, Kanagawa (JP); Takeru Tamayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1455 days.

(21) Appl. No.: 11/940,187

(22) Filed: Nov. 14, 2007

(65) Prior Publication Data

US 2008/0136754 A1    Jun. 12, 2008

(30) Foreign Application Priority Data

Dec. 6, 2006  (JP) .................................. 2006-329756

(51) Int. Cl.
*G01B 11/14* (2006.01)
(52) U.S. Cl. ......... 356/620; 356/614; 356/615; 356/623
(58) Field of Classification Search ............. 356/3, 3.01, 356/3.03, 614, 615, 620, 623
See application file for complete search history.

(56) References Cited

U.S. PATENT DOCUMENTS

| | | | | |
|---|---|---|---|---|
| 5,793,361 | A * | 8/1998 | Kahn et al. ..................... | 345/179 |
| 5,914,783 | A * | 6/1999 | Barrus ........................... | 356/614 |
| 6,714,310 | B1 * | 3/2004 | Tanaka et al. .................. | 356/614 |
| 6,850,818 | B2 | 2/2005 | Sabe et al. | |
| 7,180,510 | B2 * | 2/2007 | Inoue et al. ................... | 345/180 |
| 7,190,336 | B2 | 3/2007 | Fujisawa | |
| 7,489,297 | B2 * | 2/2009 | Hohmann et al. ............. | 345/158 |
| 7,499,027 | B2 * | 3/2009 | Brigham et al. ............... | 345/158 |
| 2004/0041786 | A1 * | 3/2004 | Inoue et al. ..................... | 345/156 |
| 2005/0253807 | A1 * | 11/2005 | Hohmann et al. ............. | 345/156 |
| 2006/0244719 | A1 * | 11/2006 | Brigham et al. .............. | 345/156 |

FOREIGN PATENT DOCUMENTS

| | | |
|---|---|---|
| JP | 2000019478 | 1/2000 |
| JP | 2001-290585 | 10/2001 |
| JP | 2002-183832 | 6/2002 |
| JP | 2004127272 | 4/2004 |
| JP | 2004-282439 | 10/2004 |
| WO | 03035334 | 5/2003 |

OTHER PUBLICATIONS

Japanese Office Action issued Jul. 26, 2011 for corresponding Japanese Appln. No. 2006-329756.

* cited by examiner

*Primary Examiner* — My-Chau T Tran
(74) *Attorney, Agent, or Firm* — K&L Gates LLP

(57) ABSTRACT

Disclosed herein is a display apparatus including an input/output section for displaying an image as well as detecting a light beam representing an input received from an external source and is capable of handling inputs received from the external source as inputs destined for a plurality of points on a display screen. The apparatus further includes a target generation section configured to generate information on a target located on the display screen to represent a series of inputs received from the external source on the basis of a timewise or spatial relation between input portions located on the display screen as portions receiving inputs from the external source. The apparatus still further includes an event generation section configured to recognize an event representing a change of a state of the target on the basis of the information on the target and generate information on the event.

9 Claims, 27 Drawing Sheets

FIG. 17

```
<IODisplay>
    <Info frameNumber="22" numOfTargets="2" numOfEvents="1">
    <Targets>
        <tid="0" ft="1" x="10" y="20" a="100" rt="5" rb="25" rl="5" rr="15" />
    </Targets>
    <Targets>
        <tid="1" ft="2" x="30" y="40" a="200" rt="30" rb="50" rl="25" rr="35" />
    </Targets>
    <Events>
        <eid="1" fn="22" type="Rotate" numOfID="2" numOfValue="3">
            <tid="0" />
            <tid="1" />
            <extra ex "20"/>
            <extra ex "30"/>
            <extra ex "20"/>
        </e>
    </Events>
</IODisplay>
```

- `<IODisplay>` — NUMBER OF (t+1)th FRAME
- `numOfTargets="2"` — NUMBER OF TARGETS IN (t+1)th FRAME
- `numOfEvents="1"` — NUMBER OF EVENTS IN (t+1)th FRAME
- `ft="1"` — NUMBER OF FIRST INPUT FRAME
- `tid="0"` — TARGET ID
- `x="10" y="20"` — REPRESENTATIVE COORDINATES
- `a="100"` — AREA INFORMATION
- `rt="5" rb="25" rl="5" rr="15"` — REGION INFORMATION
- `<tid="0" />`, `<tid="1" />` — TARGET ID OF TARGET, STATE OF WHICH IS REPRESENTED BY EVENT
- `<extra ...>` — ADDITIONAL INFORMATION
- `numOfID="2"` — NUMBER OF TARGETS, STATES OF WHICH ARE REPRESENTED BY EVENT
- `numOfValue="3"` — ADDITIONAL-INFORMATION COUNT

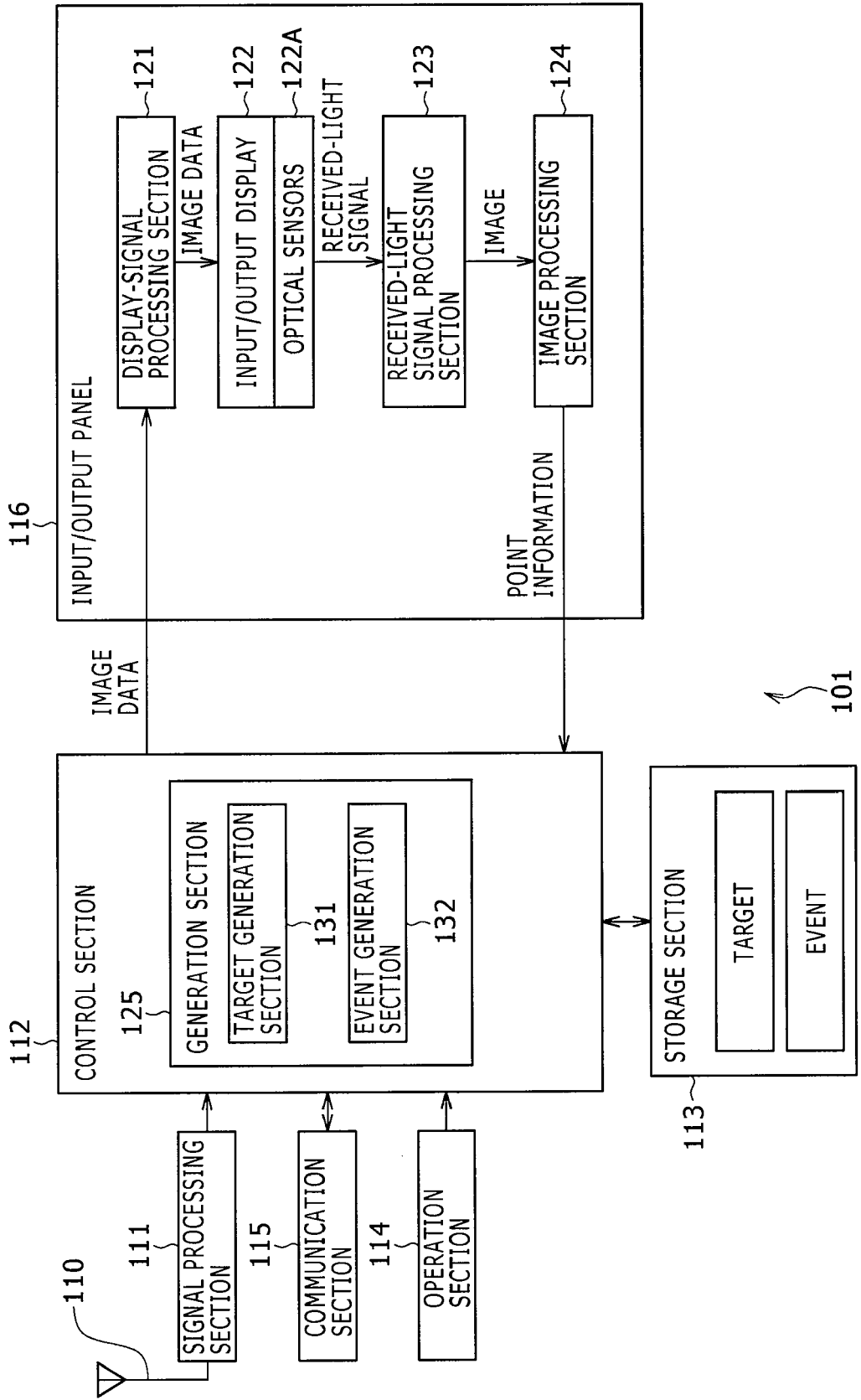

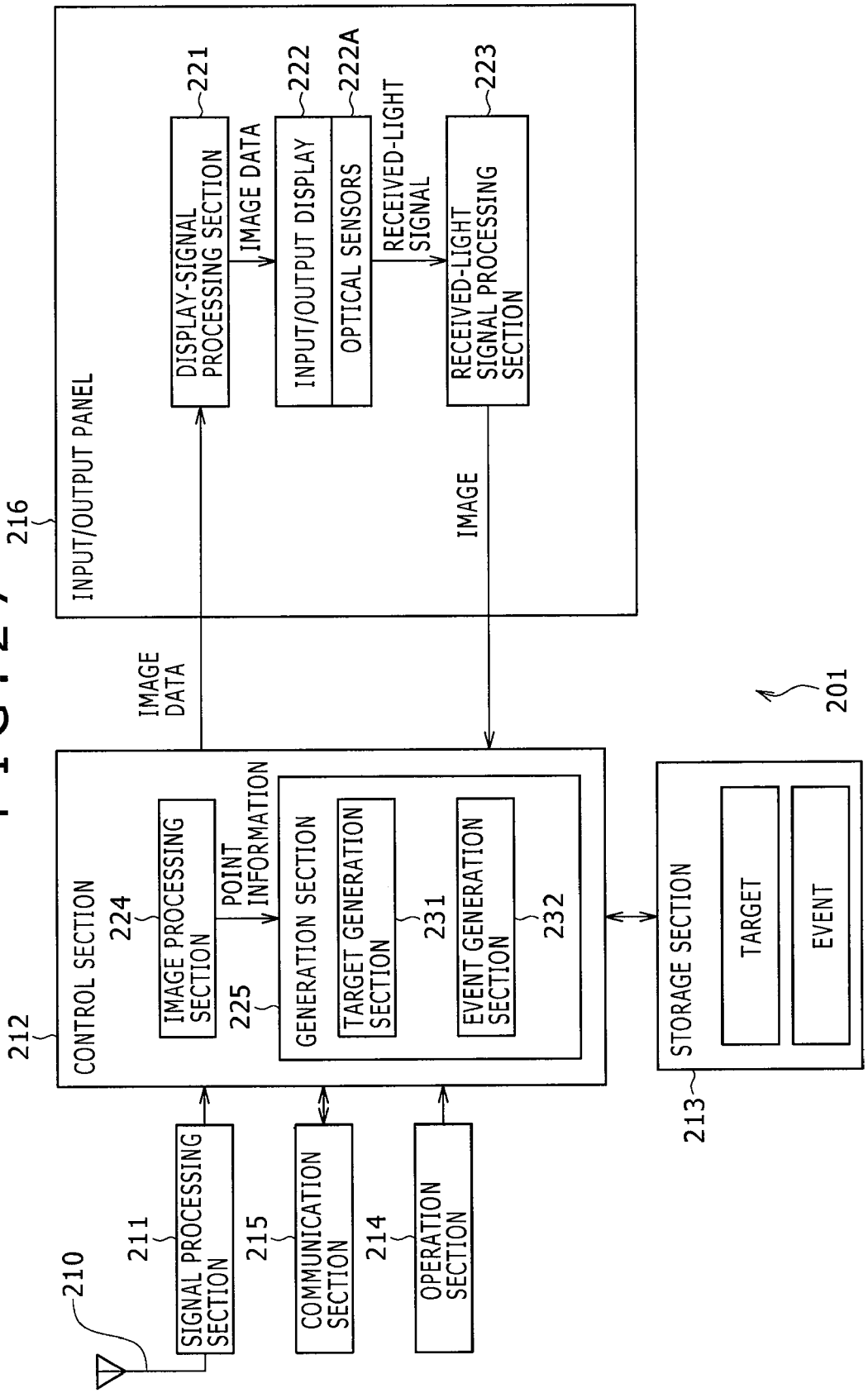

DISPLAY APPARATUS, DISPLAY-APPARATUS CONTROL METHOD AND PROGRAM

CROSS REFERENCES TO RELATED APPLICATIONS

The present application claims priority to Japanese Patent Application JP 2006-329756 filed in the Japan Patent Office on Dec. 6, 2006, the entire contents of which is being incorporated herein by reference.

BACKGROUND

The present application relates to a display apparatus, a display-apparatus control method and a display-apparatus control program. More particularly, the present application relates to a display apparatus making its upper-level application or the like capable of easily handling information on a plurality of points on its panel receiving inputs from typically an external input generator, a display-apparatus control method for controlling the apparatus and a display-apparatus control program implementing the method. In the following description, information on such points is also referred to as point information.

There has been proposed a panel capable of outputting point information for a plurality of points on the panel. Such a panel is implemented by optical sensors embedded in a liquid-crystal display apparatus. Each of the optical sensors is capable of detecting a light beam radiated by an external light generator to the panel and outputting point information according to the light beam. In this way, the panel functions as a panel capable of receiving an optical input from an external light generator. The panel, which is capable of receiving an optical input and outputting point information, is referred to as an input/output panel. For details of such an input/output panel, the reader is suggested to refer to Japanese Patent Laid-open No. 2000-019478 and/or Japanese Patent Laid-open No. 2004-127272.

Methods adopted by the input/output panel to detect an optical input are classified into two large categories. The first category includes methods each making use of a light beam generated by a body having an external light source such as an LED (Light Emitting Device). On the other hand, the second category includes methods each making use of a light beam generated by a liquid-crystal display apparatus. In accordance with each of the methods pertaining to the first category, the user operates the body such as a light generating pen on the input/output panel. In accordance with each of the methods pertaining to the second category, on the other hand, the user carries out an input operation on the input/output panel by making use of a body having no external light source. Examples of such a body are a finger or a pen not generating a light beam. When the user carries out an input operation on the input/output panel by making use of a body having no external light source, a light beam generated by the liquid-crystal display apparatus is reflected by the body approaching the input/output panel employed by the liquid-crystal display apparatus as a display screen and radiated back by the body to the inside of the liquid-crystal display apparatus to be detected therein by an optical sensor. Typically, the light beam generated by the liquid-crystal display apparatus is a light beam transmitted by a backlight employed in the liquid-crystal display apparatus.

In addition, in the case of a touch panel of an electrostatic or pressure-sensitive type, when an input is supplied from an external input provider to a point on the touch panel, information on the point is generated for the input. Typically, the information on a point on the touch panel is the coordinates of the point on the touch panel. In addition, only a piece of such information can be generated for a touched point on the touch panel.

For example, when the user touches the vicinity of two adjacent points on the touch panel, a piece of information on only one of the points is generated. Typically, such point information is generated for the point experiencing a stronger pressure or the point touched earlier.

On the other hand, the input/output panel is capable of outputting different values of point information for each point on the panel. In addition, it is expected that the input/output panel can be used in the same applications as the conventional touch panel in the future. For example, it is expected that the input/output panel can be applied to the same products as the conventional touch panel in the future.

It is to be noted that, as a technology for handling a plurality of inputs, there has been proposed a technology for a robot for processing recognition results, which are produced by a plurality of recognition sections each configured to recognize an environment, by making use of an STM (Short Term Memory). For details of the proposed technology, the reader is suggested to refer to International disclosure pamphlet No. 03/035334.

SUMMARY

As described above, the input/output panel is capable of outputting different values of point information for each of a plurality of points on the panel. If the point information for the points is delivered to an upper-level application in an apparatus employing the input/output panel as it is, however, the upper-level application must process the information. Thus, the load borne by the upper-level application increases.

Addressing the problem described above, the present application makes the point information, which is output for a plurality of points each receiving an input from an external source, easy to process by an upper-level application or the like.

In accordance with an embodiment, there is provided a display apparatus including:

an input/output section for displaying an image on a display screen of the input/output section as well as detecting a light beam representing an input received from an external source and is capable of handling inputs received from the external source as inputs destined for a plurality of points on the display screen;

a target generation section configured to generate information on a target located on the display screen to represent a series of inputs received from the external source on the basis of a timewise or spatial relation between input portions located on the display screen as portions receiving inputs from the external source; and an event generation section configured to recognize an event representing a change of a state of the target on the basis of the information on the target and generating information on the event.

It is possible to provide the display apparatus according to the embodiment of the present application with a configuration further employing a display control section configured to change a display state of the input/output section on the basis of the information on the target or the information on the event.

It is possible to provide the display apparatus according to an embodiment with a configuration further employing a target storage section configured to store the information on the target. The target storage section deletes the stored information on the target on the basis of a predetermined condition.

It is possible to provide the display apparatus according to the embodiment of the present application with a configuration further employing an event storage section configured to store the information on the event. The event storage section deletes the stored information on the event on the basis of a predetermined condition.

In accordance with another embodiment, there is provided a method for controlling a display apparatus including an input/output section for displaying an image on a display screen of the input/output section as well as detecting a light beam representing an input received from an external source and is capable of handling inputs received from the external source as inputs destined for a plurality of points on the display screen. In accordance with a further embodiment of the present application, there is provided a program to be executed by a computer in order to implement the method. The method includes the steps of:

generating information on a target located on the display screen to represent a series of inputs received from the external source on the basis of a timewise or spatial relation between input portions located on the display screen as portions receiving inputs from the external source; and recognizing an event representing a change of a state of the target on the basis of the information on the target and generating information on the event.

In accordance with the aforementioned embodiments:

information on a target located on a display screen to represent a series of inputs received from an external source is generated on the basis of a timewise or spatial relation between input portions located on the display screen as portions receiving inputs from the external source; and an event representing a change of a state of the target is recognized on the basis of the information on the target and information on the event is generated.

Thus, in accordance with the aforementioned embodiments, it is possible to make an upper-level application or the like capable of easily handling information on a plurality of points on a panel receiving inputs from typically an external source.

Additional features and advantages are described herein, and will be apparent from, the following Detailed Description and the figures.

BRIEF DESCRIPTION OF THE FIGURES

FIG. 17 is an explanatory diagram showing information output by the generation section as typical information on targets and events;

FIG. 26 is a block diagram showing a typical configuration of another embodiment implementing the display system to which the present application is applied; and FIG. 27 is a block diagram showing a typical configuration of a further embodiment implementing the display system to which the present application is applied.

DETAILED DESCRIPTION

Figure 1:
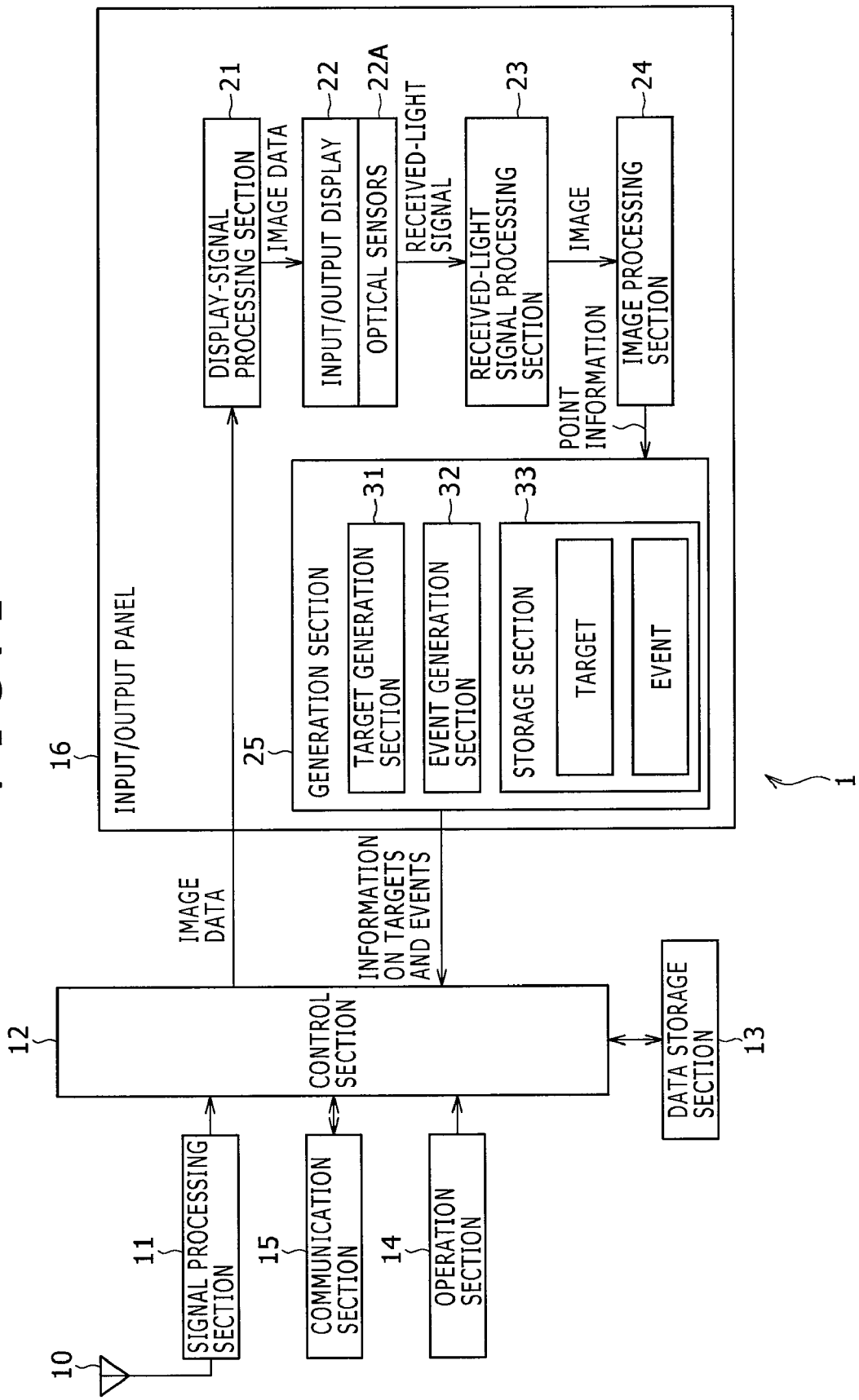
FIG. 1 is a block diagram showing a typical configuration of an embodiment implementing a display system to which the present application is applied.

In accordance with an embodiment of the present application, there is provided a display apparatus (such as a display system 1 shown in FIG. 1), which has an input/output section (such as an input/output display 22 shown in FIG. 1) for displaying an image on a display screen of the input/output section as well as detecting a light beam representing an input received from an external source and is capable of handling inputs received from the external source as inputs destined for a plurality of points on the display screen. The display apparatus employs:

target generation means (such as a target generation section 31 shown in FIG. 1) for generating information on a target located on the display screen to represent a series of inputs received from the external source on the basis of a timewise or spatial relation between input portions located on the display screen as portions receiving inputs from the external source; and event generation means (such as an event generation section 32 shown in FIG. 1) for recognizing an event representing a change of a state of the target on the basis of the information on the target and generating information on the event.

It is possible to provide the display apparatus according to the embodiment with a configuration further employing display control means (such as a control section 12 shown in FIG. 1) for changing a display state of the input/output section on the basis of the information on the target or the information on the event.

It is possible to provide the display apparatus according to the embodiment with a configuration further employing target storage means (such as a storage section 33 shown in FIG. 1) for storing the information on the target. The target storage means deletes the stored information on the target on the basis of a predetermined condition.

It is possible to provide the display apparatus according to the embodiment with a configuration further employing event storage means (such as the storage section 33 shown in FIG. 1) for storing the information on the event. The event storage means deletes the stored information on the event on the basis of a predetermined condition.

Figure 2:
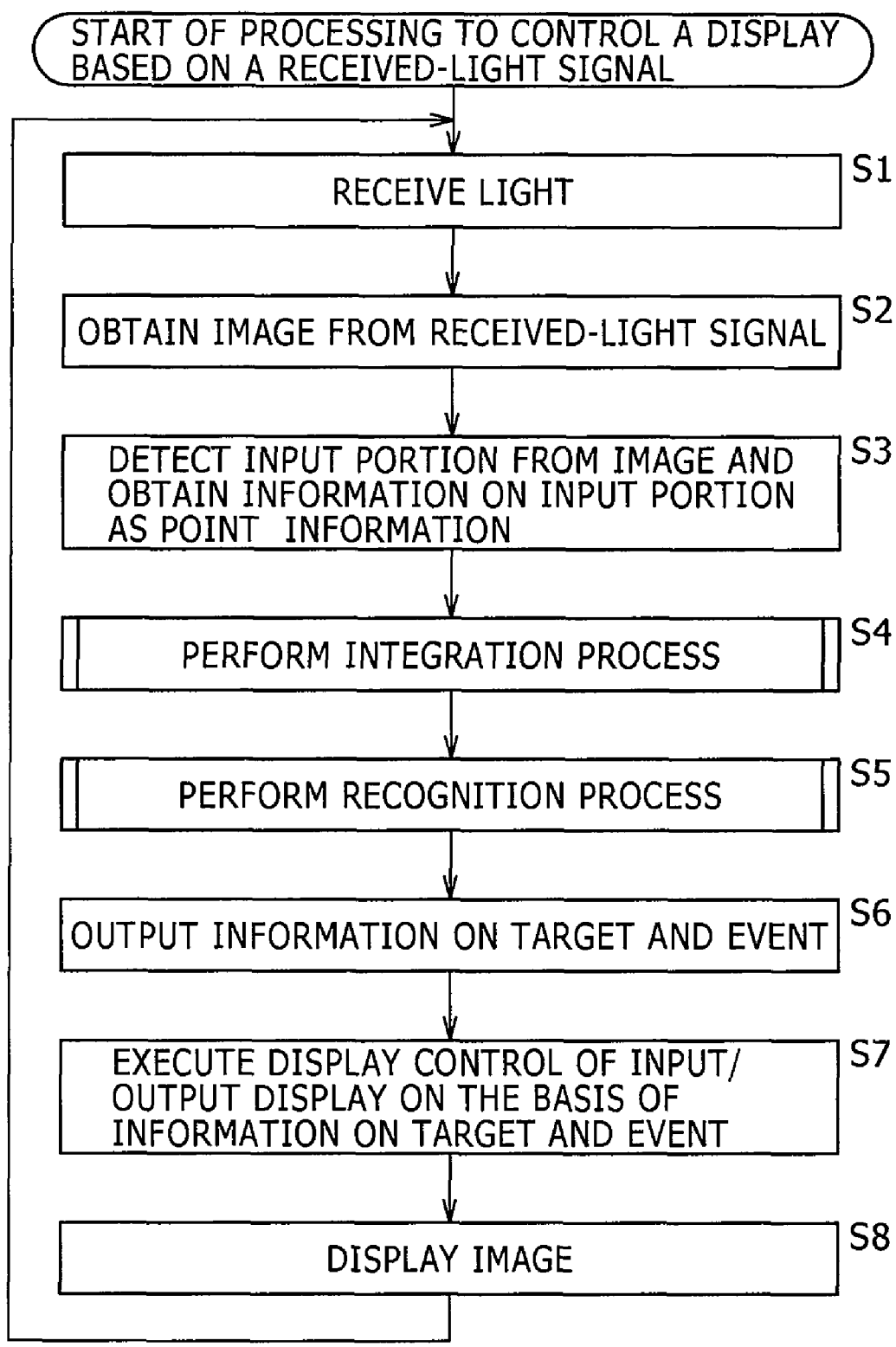
FIG. 2 shows a flowchart to be referred to in description of processing carried out by the display system in order to control an image display based on a received-light signal.

In accordance with another embodiment, there is provided a method for controlling a display apparatus, which have an input/output section for displaying an image on a display screen of the input/output section as well as detecting a light beam representing an input received from an external source and is capable of handling inputs received from the external source as inputs destined for a plurality of points on the display screen. In accordance with a further embodiment of the present application, there is provided a program to be executed by a computer in order to implement the method. The method includes the steps of:

generating information on a target located on the display screen to represent a series of inputs received from the external source on the basis of a timewise or spatial relation between input portions located on the display screen as portions receiving inputs from the external source (for example, a step S4 of a flowchart shown in FIG. 2); and recognizing an event representing a change of a state of the target on the basis of the information on the target and generating information on the event (for example, the steps S4 and S5 of the flowchart shown in FIG. 2).

Next, the embodiments are described by referring to diagrams as follows.

FIG. 1 is a block diagram showing a typical configuration of an embodiment implementing a display system 1 to which the present application is applied.

The display system 1 shown in FIG. 1 typically represents a hand phone, a TV (television) or the like.

As shown in the figure, the display system 1 employs an antenna 10, a signal processing section 11, a control section 12, a data storage section 13, an operation section 14, a communication section 15 and an input/output panel 16.

The signal processing section 11 is a unit for demodulating a broadcasted wave signal received by the antenna 10 as a signal of a TV broadcast and supplying image data as well as sound data obtained as a result of the demodulation process to the control section 12. The broadcasted wave signal is typically a ground wave signal or a satellite wave signal.

The control section 12 is a unit for carrying out various kinds of processing on the basis of an operation signal received from the operation section 14 as a signal representing an operation carried out by the user. The control section 12 supplies data that should be stored temporarily during the processing to the data storage section 13 used for storing the data. The control section 12 supplies image data and other data, which are received from the signal processing section 11, to the input/output panel 16 for displaying the image. In addition, if necessary, the control section 12 supplies the image data to an input/output display 22 employed in the input/output panel 16 in accordance with information on a target and information on an event, which are received from the input/output panel 16, in order to execute display control to change the state of a display appearing on the input/output display 22. The information on a target and the information on an event will be in detail described later.

The data storage section 13 is typically a RAM (Random Access Memory). The data storage section 13 is a memory used for temporarily storing data received from the control section 12.

The operation section 14 typically employs the ten keys and a keyboard. The operation section 14 is a unit, which is to be operated by the user and generates an operation signal representing the operation carried out by the user. The operation section 14 supplies the operation signal to the control section 12.

The communication section 15 is a unit for carrying out a communication typically with a radio station not shown in the figure by making use of a radio wave signal.

The input/output panel 16 displays an image represented by image data received from the control section 12 on the input/output display 22. The input/output panel 16 also carries out integration processing and recognition processing, which will be described later in detail, on input information detected from a received-light signal output by the input/output display 22 as described later as information for one or more points in order to generate information on a target and information on an event. The input/output panel 16 then supplies the information on a target and the information on an event to the control section 12.

As shown in the figure, the input/output panel 16 employs a display-signal processing section 21, the input/output display 22 cited above, a received-light signal processing section 23, an image processing section 24 and a generation section 25.

The display-signal processing section 21 is a unit for carrying out a process to display an image on image data received from the control section 12. The display-signal processing section 21 supplies an image obtained as a result of the process to the input/output display 22.

The input/output display 22 is a unit for displaying an image received from the display-signal processing section 21 and detecting a light beam corresponding to an input supplied by an external source. To put it in detail, the input/output display 22 displays an image obtained as a result of the process carried out by the display-signal processing section 21 on image data on a display screen. The input/output display 22 typically employs a plurality of embedded optical sensors 22A distributed throughout the entire display screen of the input/output display 22. The optical sensors 22A receive light beams from an external source and generate a received-light signal according to the quantity of the received light beams. Then, the optical sensors 22A supply the received-light signal to the received-light signal processing section 23.

The received-light signal processing section 23 carries out a predetermined process on the received-light signal received from the input/output display 22 in order to obtain an image for each frame and supplies the image to the image processing section 24. The images have different degrees of brightness for different body parts of the user. For example, the degree of brightness for a finger, which is separated from the display screen by a short distance but approaching the display screen (or the degree of brightness for a finger already brought into contact with the screen or the degree of brightness for a finger being separated away from the screen), is different from a body part not approaching the screen.

The image processing section 24 is a unit for carrying out image processing such as a binary conversion process, a noise elimination process and a labeling process on an image received from the received-light signal processing section 23 as an image obtained for a frame in order to detect a portion (or an area) of the display screen of the input/output display 22 as an input portion (or an input area) receiving an input supplied by an external source. In this case, the external source is typically a user body part such as a finger approaching the display screen or already brought into contact with the screen. The image processing section 24 obtains point information for the input portion and supplies the point information to the generation section 25. The point information is the information on a point serving as a representative of the input portion (or the input area) on the display screen. The point information is typically the coordinates of the representative point on the display screen.

The generation section 25 is a unit for carrying out an integration process to be described later on point information received from the image processing section 24 as information on an input portion in order to generate information on a target to be described later. In addition, on the basis of the information on a target, the generation section 25 also carries out a recognition process, which is described hereinafter, in order to generate information on an event, which is a change of the state of the target. It is to be noted that, in the integration process, the generation section 25 also generates a part of the information on an event.

As shown in the figure, the generation section 25 employs a target generation section 31, an event generation section 32 and a storage section 33. The generation section 25 generates the information on a target and the information on an event for every frame, supplying the pieces of information to the control section 12.

As described earlier, by bringing a finger or the like into contact with the display screen of the input/output display 22, the user is capable of entering an input. A series of entered input forms a target. To put it concretely, for example, when the user brings a specific finger thereof or the like into contact with the display screen of the input/output display 22 and thereafter moves the specific finger over the display screen while keeping the finger in the state of being in contact with the screen, a series of inputs entered by the user to the screen till the finger is moved away from the screen forms a target. That is to say, a target represents a series of inputs entered so far by the user to the display screen.

As described above, an event is a change of the state of a target. Examples of an event are a movement of a target from a position to another, reappearance (or regeneration) of a target and disappearance (deletion) of a target.

The target generation section 31 employed in the generation section 25 is a unit for carrying out an integration process on point information received from the image processing section 24 as information on an input portion for every frame in order to generate information on a target representing a series of inputs on the basis of a timewise or spatial relation of the input portions each receiving an input from an external source. The target generation section 31 supplies the information on a target to the storage section 33.

If the point information received from the image processing section 24 as information on input portions is point information of the (t+1)th frame observed at the (t+1) point of time, the target generation section 31 compares the point information for input portions of the (t+1)th frame with information on targets of the tth frame observed at the tth point of time. The tth frame observed at the tth point of time is a frame in a timewise closest relation with the (t+1)th frame observed at the (t+1) point of time. That is to say, the tth frame observed at the tth point of time is a frame immediately preceding the (t+1)th frame.

Let us take one of targets on the tth frame as an attention drawing target to which attention is paid. In this case, for the attention drawing target, the target generation section 31 takes an input portion, which exists on the (t+1)th frame as an input portion determined to be in a spatially close relation with the attention drawing target in accordance with a result of the comparison, as an input portion pertaining to a series of inputs represented by the attention drawing target, and integrates the input portion with the attention drawing target.

For the attention drawing target, if an input portion determined to be in a spatially close relation with the attention drawing target in accordance with a result of the comparison does not exist in the (t+1)th frame, the target generation section 31 assumes that the series of inputs represented by the attention drawing target has ended and deletes the attention drawing target.

If an input portion included in the (t+1)th frame is left as an input portion integrated with no target, the target generation section 31 assumes that a new series of inputs starting with this input portion to serve as a new target has started and generates the new target to represent the new series of inputs. Then, the target generation section 31 supplies information on targets each obtained as a result of an integration process, information on newly created targets and information on deleted targets to the storage section 33 as information on targets of the (t+1)th frame.

The event generation section 32 is a unit for properly generating information on an event representing a change of the state of the target on the basis of information on a target and supplying the information on an event to the storage section 33. That is to say, the event generation section 32 recognizes an event representing a change of the state of a target for example on the basis of information on the target on the tth frame and information on the target on the (t+1)th frame or, if necessary, on the basis of, among others, information stored in the storage section 33 as information on an event generated prior to the appearance of the tth frame. Then, the event generation section 32 carries out an event generation process of generating information on the recognized event and stores the generated information on the event in the storage section 33 as information on the event of the (t+1)th frame. The information on the recognized event is information describing the event.

In addition, the event generation section 32 reads out information on a target on the (t+1)th frame and information on an event of the (t+1)th frame from the storage section 33, supplying the pieces of information to the control section 12.

The storage section 33 is a memory used for storing information on targets and information on events. As described above, the information on targets is information generated by the target generation section 31 whereas the information on events is information generated by the event generation section 32.

By referring to a flowchart shown in FIG. 2, the following description explains processing carried out by the display system 1 to control an image display based on a received-light signal.

The processing carried out by the display system 1 to control an image display based on a received-light signal is started for example when the user turns on the power supply of the display system 1.

It is to be noted that, the processes of steps S1 to S8 of the flowchart shown in the figure have been carried out on the tth frame and, at least, information on targets on the tth frame and frames preceding the tth frame as well as information on events of the tth frame and frames preceding the tth frame have been properly stored in the storage section 33.

As shown in the figure, the flowchart begins with a step S1 at which, with the timing of the (t+1)th frame, the optical sensors 22A employed in the input/output display 22 receive light from an external source, convert the light into a received-light signal according to the quantity of the light and supply the signal to the received-light signal processing section 23. For example, the light received from the external source is light originated by a display-screen portion approached by a finger of the user and reflected by the finger back to the optical sensors 22A.

Then, at the next step S2, the received-light signal processing section 23 carries out a predetermined process on the received-light signal received from the input/output display 22 in order to obtain an image of the (t+1)th frame for the input/output display 22 from the received-light signal and supplies the image to the image processing section 24. In the image of the input/output display 22, the intensity for a portion approached by a body part such as a finger is different from the intensity for a portion not approached by a body part.

Then, at the next step S3, the image processing section 24 carries out image processing such as a binary conversion process, a noise elimination process and a labeling process on the image received from the received-light signal processing section 23 as an image obtained for the (t+1)th frame in order to detect a portion (or an area) of the display screen of the input/output display 22 as an input portion (or an input area) receiving an input supplied by the external source, supplying information on the input portion to the generation section 25 as point information. The detected input portion is a portion approached by a body part such as a finger of the user as described above.

Then, at the next step S4, the target generation section 31 employed in the generation section 25 carries out an integration process on the point information received from the image processing section 24 as point information for the input portion on the (t+1)th frame in order to generate information on a target on the (t+1)th frame, and stores the information on a target in the storage section 33. Then, on the basis of the information on a target, the event generation section 32 employed in the generation section 25 carries out an integration process in order to properly generate information on a specific event for the (t+1)th frame, and stores the information on a specific event in the storage section 33. The information on an event can be information indicating generation of a new target or deletion (or disappearance) of an existing target. Details of the integration process will be described later by referring to FIGS. 4 to 8.

Then, at the next step S5, on the basis of the information on a target, the event generation section 32 employed in the generation section 25 carries out a recognition process in order to properly generate information on an event for the (t+1)th frame, and stores the information on an event in the storage section 33. This information on an event is information on a change of the state of the target, that is, an event is a change of the state of the target. Details of the recognition process will be described later by referring to FIGS. 9 to 23.

Then, at the next step S6, the event generation section 32 employed in the generation section 25 reads out information on a target of the (t+1)th frame and information on an event for the (t+1)th frame, supplying (outputting) the pieces of information to the control section 12.

Then, at the next step S7, on the basis of the information on a target and the information on an event, which are received from (or supplied by) the generation section 25 employed in the input/output panel 16, if necessary, the control section 12 executes control of the display state of the input/output display 22 by supplying image data to the input/output display 22 by way of the display-signal processing section 21.

Then, at the next step S8, in accordance with the display control executed by the control section 12, the input/output display 22 displays an image in a display state different from the state sustained so far. For example, the input/output display 22 rotates the presently displayed image by 90 degrees in the clockwise direction.

Then, the flow of the processing represented by the flowchart goes back to the step S1 in order to repeat the processing for the (t+2)th frame.

Figure 3:
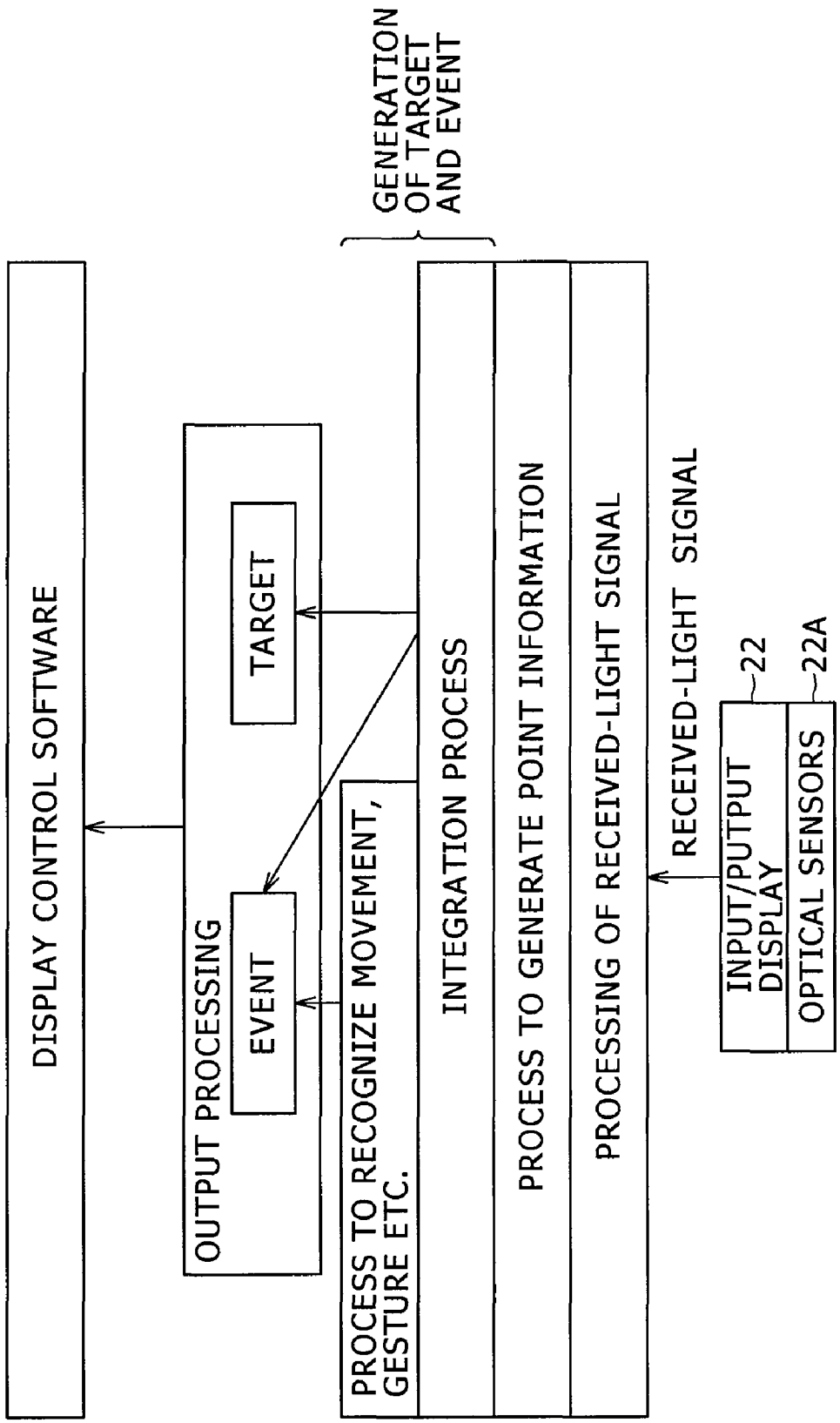
FIG. 3 is an explanatory diagram showing a typical structure of software to be executed for carrying out the processing represented by the flowchart of FIG. 2 as the processing performed by the display system 1 in order to control an image display based on a received-light signal.

FIG. 3 is a diagram showing a typical structure of software to be executed for carrying out the processing represented by the flowchart of FIG. 2 as the processing carried out by a display system 1 to control an image display based on a received-light signal.

The software to be executed for carrying out the processing carried out in order to control an image display based on a received-light signal includes:

software to be executed for carrying out processing carried out in order to process a received-light signal;

software to be executed for carrying out processing carried out in order to generate point information;

software to be executed for carrying out an integration process;

software to be executed for carrying out a recognition process;

software to be executed for carrying out an output processing; and software to be executed to function as an upper-level application for controlling the display of an image.

In the software structure shown in FIG. 3, the optical sensors 22A employed in the input/output display 22 receive light from an external source and generate a received-light signal for one frame. For example, the light received from the external source is light originated by a display-screen portion approached by a body part such as a finger of the user and reflected by the finger back to the optical sensors 22A.

At a layer of the processing carried out in order to process a received-light signal, a signal received from the input/output display 22 as the received-light signal for one frame is subjected to the processing carried out in order to process the received-light signal in order to obtain an image for the frame.

The processing carried out in order to process the received-light signal includes amplification and filtering processes.

At a layer provided above the layer of the processing carried out in order to process a received-light signal as a layer of the processing carried out in order to generate point information, predetermined image processing is carried out on an image output by the processing carried out in order to process a received-light signal in order to detect an input portion on the display screen of the input/output display 22. As explained before, the predetermined image processing includes a binary conversion process, a noise elimination process and a labeling process. Also as described earlier, the input portion on the display screen of the input/output display 22 is a portion approached by a body part such as a finger of the user. Then, point information of an input portion is generated for each frame.

At a layer provided above the layer of the processing carried out in order to generate point information as a layer of the integration process, an integration process is carried out on the point information obtained from the processing to generate point information in order to generate information on a target for each frame. In addition, on the basis of the information generated for a frame as the information on a target, information on a specific event is generated. Examples of the specific event include generation of a target and deletion (or disappearance) of a target.

At a layer provided above the layer of the integration process as a layer of the recognition process, on the basis of data including the information generated in the integration process as the information on a target, a process is carried out to recognize a movement of a finger of the user, a gesture and the like in order to generate information on an event representing a change of the state of a target for each frame.

At a layer provided above the layer of the recognition process as a layer of the output processing, the information on a target and the information on an event, which are generated in the integration process, as well as the information generated in the recognition process as the information on an event are output for every frame.

On the basis of the information output in the output processing as the information on a target and the information on an event, if necessary, an upper-level application above the hierarchical layer of the output processing supplies image data to the input/output display 22 employed in the input/output panel 16 as shown in FIG. 1 in order to execute display control to change the display state of the input/output display 22. An example of the upper-level application is the software for controlling the display of an image.

The integration process carried out by the generation section 25 employed in the display system 1 shown in FIG. 1 is explained in detail by referring to FIGS. 4 to 8 as follows.

Figure 4:
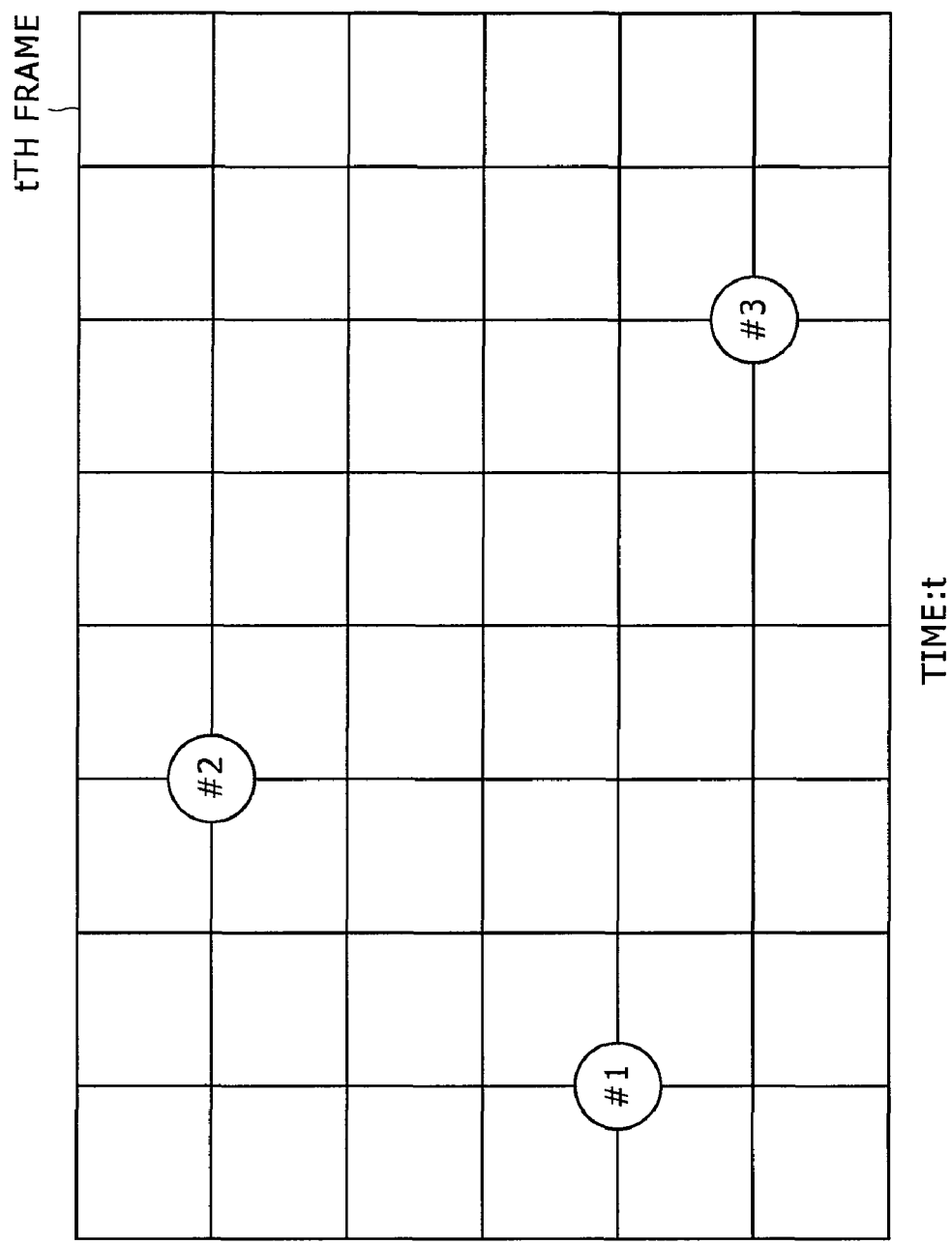
FIG. 4 is an explanatory diagram showing targets existing on a tth frame.

FIG. 4 is a diagram showing targets existing on the tth frame generated at the tth point of time.

Figure 5:
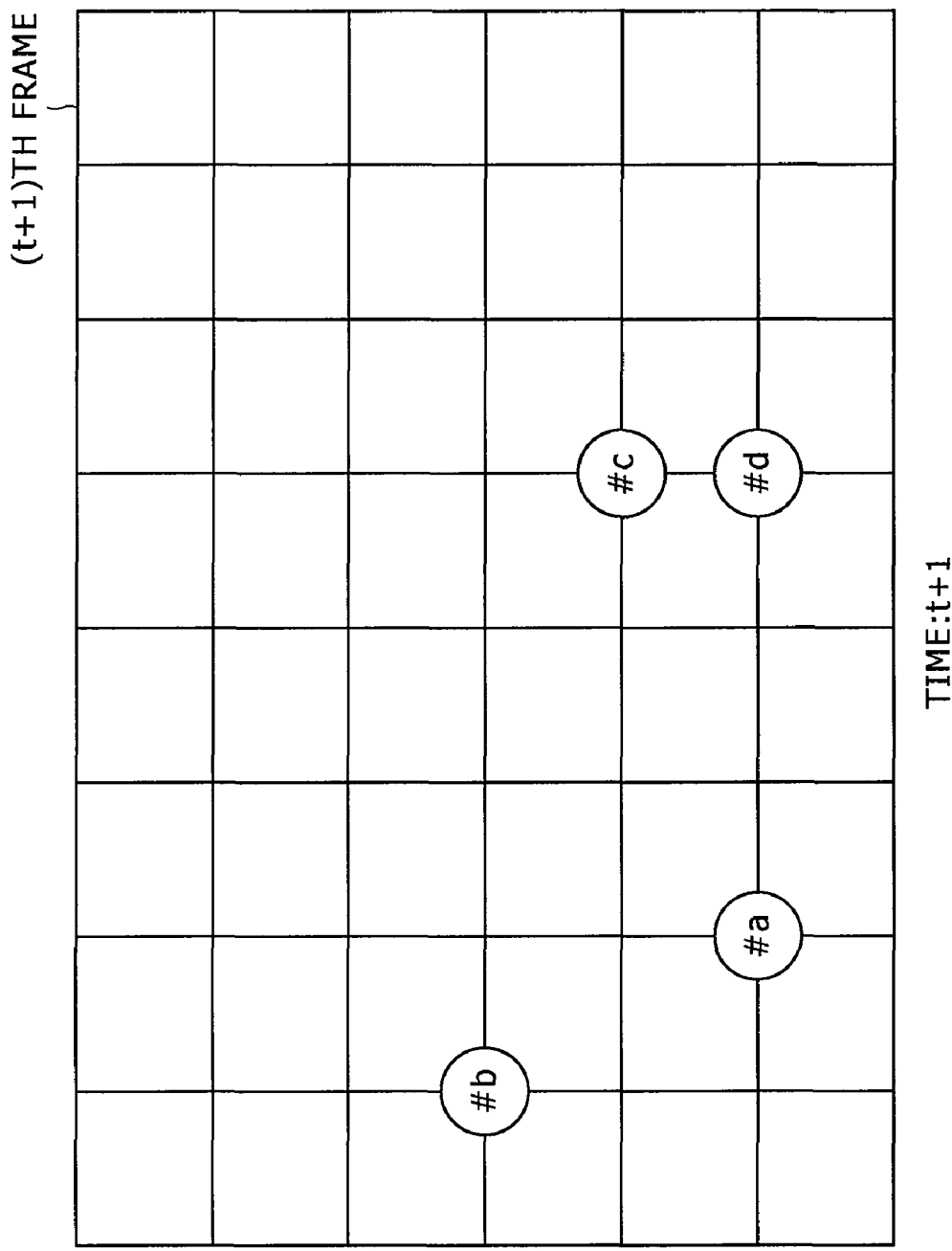
FIG. 5 is an explanatory diagram showing input portions existing on a (t+1)th frame.
Figure 6:
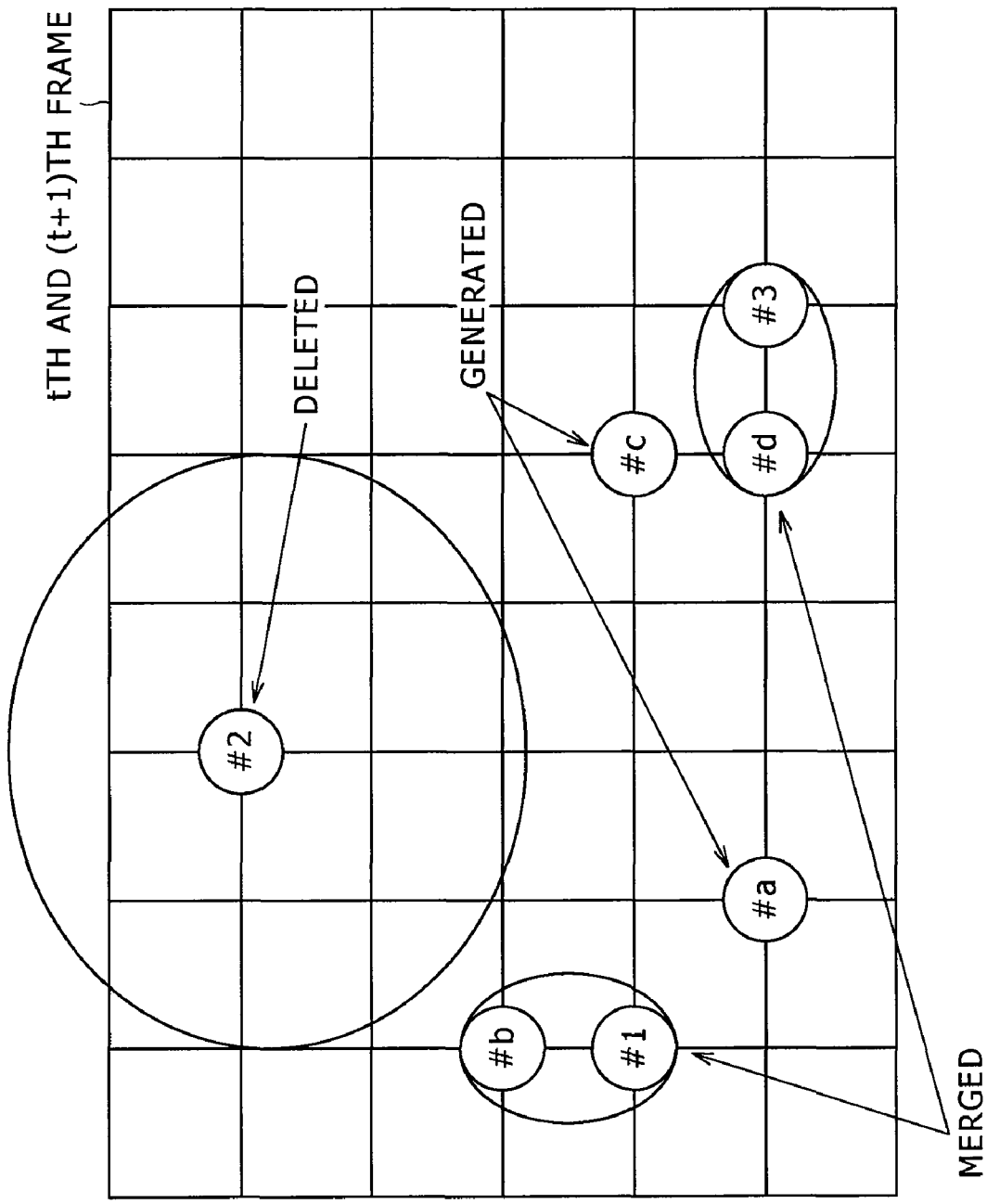
FIG. 6 is an explanatory diagram showing the (t+1)th frame shown in FIG. 5 as a frame superposed on the tth frame shown in FIG. 4.

In FIG. 4 as well as FIGS. 5 and 6, a frame is drawn as a net consisting of squares and having a rectangular shape in order to make the explanation of the process easy to understand.

FIG. 4 shows three targets #1, #2 and #3 existing on the tth frame generated at the tth point of time. A target can be provided with attributes. The attributes of a target typically include a target ID (identifier or identification number) used as information for identifying the target. Thus, #1, #2 and #3 shown in FIG. 4 are target IDs assigned to the three targets respectively.

For example, when the user brings three fingers thereof into contact with the surface of the display screen of the input/output display 22 (or to the vicinity of the surface) and moves the fingers over the surface, the movements of the fingers over the surface each result in a sequence (or a series) of inputs and the three input sequences are eventually represented by the three targets #1, #2 and #3 as shown in FIG. 4.

FIG. 5 is a diagram showing input portions existing on the (t+1)th frame lagging behind the tth frame by one frame prior to an integration process.

As shown in FIG. 5, four input portions #a to #d exist on the (t+1)th frame.

For example, when the user brings four fingers thereof into contact with the surface of the display screen of the input/output display 22 (or to the vicinity of the surface), the movements of the fingers to approach the surface of the input/output display 22 create the 4 input portions like the ones shown in FIG. 5.

FIG. 6 is a diagram showing a state obtained as a result of superposing the (t+1)th frame shown in FIG. 5 on the tth frame shown in FIG. 4.

In an integration process, each input portion on the (t+1)th frame is compared with every target on the tth frame, which is in a timewise close relation with the (t+1)th frame. One of the targets on the tth frame is taken as an attention drawing target, which is a target being subjected to consideration. In this case, a specific input portion on the (t+1)th frame is regarded as an input portion of a series of inputs represented by the attention drawing target on the tth frame and integrated with the attention drawing target. The specific input portion on the t+1 frame is typically an input portion in a spatially close relation with the attention drawing target on the tth frame. For example, the specific input portion is an input portion separated away from the attention drawing target by a distance not exceeding two squares of the net.

If there are a plurality of input portions each in a spatially close relation with the attention drawing target, typically, the input portion in a spatially closest relation with the attention drawing target among the input portions is integrated with the attention drawing target.

In addition, for example, if there is no input portion found in the comparison process as an input portion in a spatially close relation with the attention drawing target, the series of inputs represented by the attention drawing target is assumed to have ended and, in this case, the attention drawing target is deleted in the integration process.

If an input portion included in the (t+1)th frame is left as an input portion integrated with no target, that is, if an input portion is not in a spatially close relation with any target, the target generation section 31 assumes that a new series of inputs starting with this input portion to serve as a new target has started and generates the new target to represent the new series of inputs.

Thus, in the integration process carried out on input portions #a to #d on the (t+1)th frame and targets #1 to #3 on the tth frame as shown in FIG. 6, input portions #a and #b are each found to be an input portion in a spatially close relation with target #1. However, input portion #b is found to be an input portion in a spatially closer relation with target #1 in comparison with input portion #a. Therefore, in this case, input portion #b is integrated (merged) with target #1.

In addition, as shown in FIG. 6, no input portion is in a spatially close relation with target #2. Thus, target #2 is deleted. In this case, a 'delete' event is generated as an event indicating that a target has been deleted.

In addition, in the integration process, input portions #c and #d are each found to be in a spatially close relation with target #3. However, input portion #d is found to be in a spatially closer relation with target #3 in comparison with input portion #c. Therefore, in this case, input portion #d is integrated (merged) with target #3.

Input portions #a and #c are each left as an input portion integrated with none of targets #1 to #3. In this case, new targets each representing one of the new sequences of inputs are created for input portions #a and #c. That is to say, input portions #a and #c are each taken as a new target. Then, 'create' events are each generated as an event indicating that a new target has been created.

Targets each remaining as an undeleted target on the tth frame and new targets each generated for an input portion remaining on the (t+1)th frame as an input portion integrated with none of targets on the tth frame are each handled as a target on the (t+1)th frame as a result of the integration process. Then, information on the targets on the (t+1)th frame is generated on the basis of the point information for input portions on the (t+1)th frame.

The point information of an input portion is information obtained as a result of image processing carried out on a received-light image, which is an image supplied by the received-light signal processing section 23 to the image processing section 24 as an image of one frame.

Figure 7:
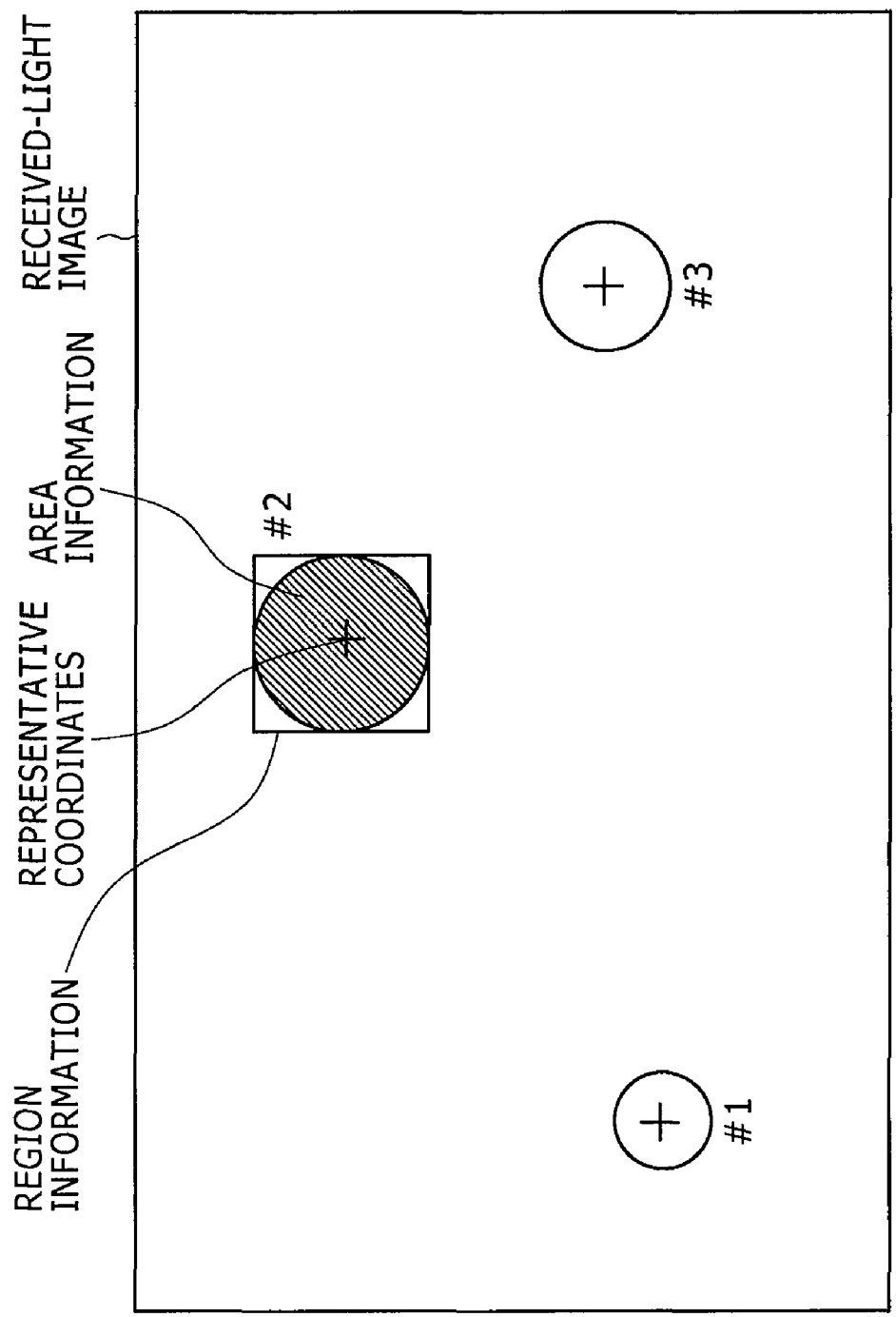
FIG. 7 is an explanatory diagram showing an image based on a received-light signal.

FIG. 7 is a diagram showing an image based on a received-light signal.

On the received-light image shown in FIG. 7, three input portions #1 to #3 exist.

Each of the input portions existing on the image based on a received-light signal is a display-screen portion receiving light originated by the display-screen portion approached by a body part such as a finger of the user and reflected by the finger back to the display-screen portion. In comparison with display-screen portions not approached by a body part such as a finger, the input portion receives light having a high or low intensity. The image processing section 24 detects a display-screen portion receiving light having a high or low intensity as an input portion and outputs the characteristic quantity of the region of the input portion as point information of the input portion.

The point information of an input portion typically includes representative coordinates of the input portion, inform on the area (or the size) of the input portion and information on the region of the input portion. The representative coordinates of an input portion are typically the coordinates of a representative point of the input portion. The representative point of an input portion is typically the center of the input portion, the center of a shortest-radius circle enclosing the input portion or the center of gravity of the input portion. The information on the area of an input portion is typically the area (or the size) of a hatched part included in the input portion as shown in the figure. The information on the region of an input portion is typically the coordinates of the top, bottom, left-hand and right-hand sides of a smallest-area rectangle enclosing the input portion.

Target attributes, which are attributes of a target, are included in the information on a target. Target attributes of a target are generated on the basis of the point information of an input portion integrated with the target. That is to say, when an input portion is integrated with a target in an integration process, the identification information peculiar to the target is retained as an attribute of the target while other attributes of the target are updated. In the following description, the identification information peculiar to a target is also referred to as a target ID. The other attributes of a target include representative coordinates of the target, inform on the area of the target and information on the region of the target. Thus, other attributes of a target are replaced with the representative coordinates of the input portion integrated with the target, inform on the area of the input portion and information on the region of the input portion. As described above, the representative coordinates of an input portion, inform on the area of the input portion and information on the region of the input portion are included in the point information of the input portion.

In addition, the attributes of a target may include information on the time at which the series of inputs represented by the target is started and information on the time at which the series of inputs represented by the target is ended.

On top of that, in addition to the target attributes described above, the target information supplied by the generation section 25 to the control section 12 may typically include the number of targets in each frame.

Figure 8:
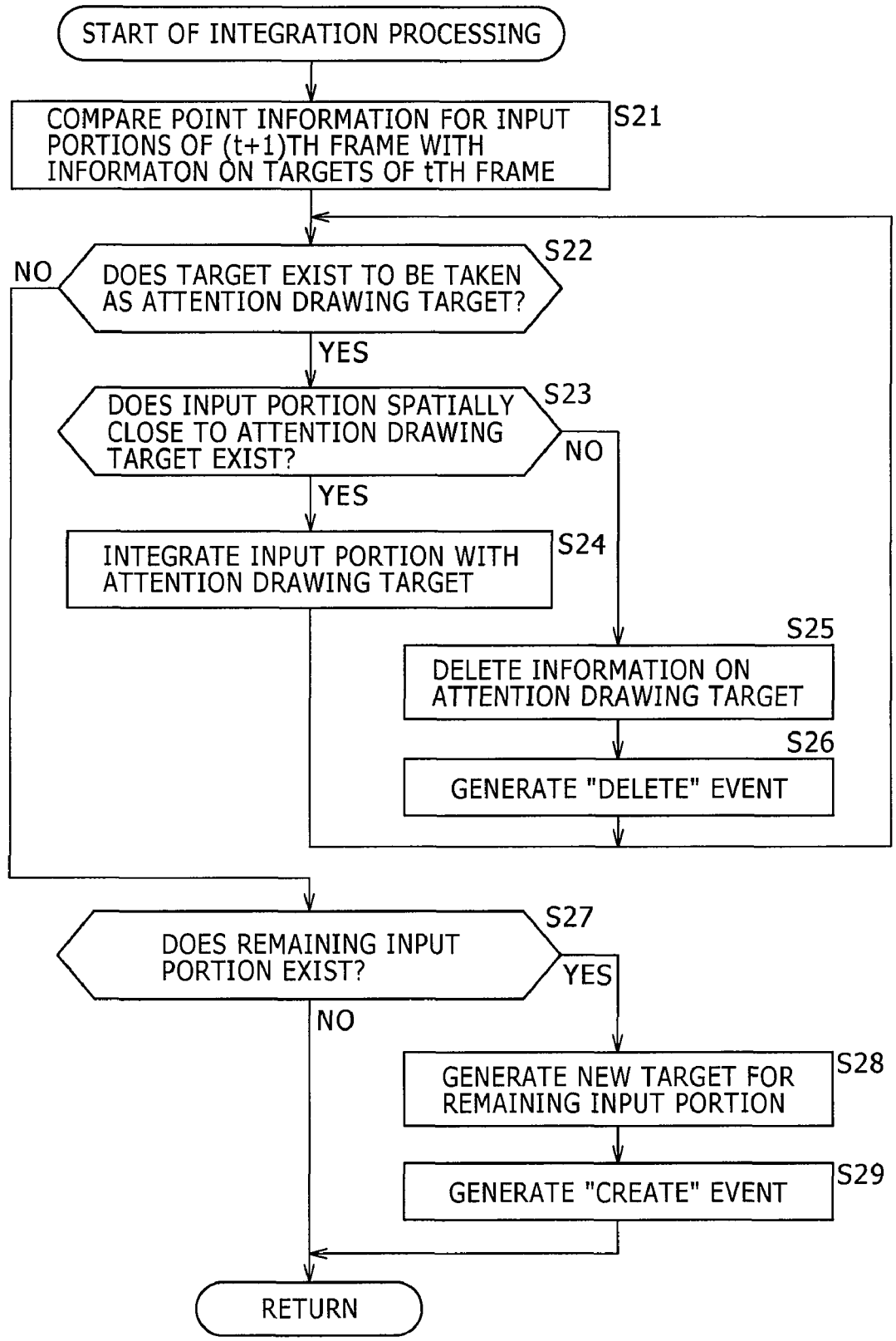
FIG. 8 shows a flowchart to be referred to in description of integration processing carried out at a step S4 of the flowchart shown in FIG. 2.

By referring to a flowchart shown in FIG. 8, the following description explains the integration processing carried out by the target generation section 31 of the generation section 25 employed in the display system 1 shown in FIG. 1 at the step S4 of the flowchart shown in FIG. 2.

The flowchart shown in FIG. 8 begins with a step S21 at which the target generation section 31 reads out information on targets of the tth frame in a timewise close relation with the (t+1)th frame from the storage section 33. Then, the target generation section 31 compares information received from the image processing section 24 as point information for input portions of the (t+1)th frame with the information read out from the storage section 33 as information on targets of the tth frame.

Subsequently, at the next step S22, the target generation section 31 produces a result of determination as to whether or not a target still exists on the tth frame whose information on targets has been read out in the process carried out at the step S21 as a target not yet taken as an attention drawing target. If the determination result produced in the process carried out at the step S22 indicates that a target still exists on the tth frame whose information on targets has been read out in the process carried out at the step S21 as a target not yet taken as an attention drawing target, the flow of the integration processing represented by this flowchart goes on to a step S23. At the step S23, the target generation section 31 takes one of targets, which each still exist on the tth frame as a target not yet taken as an attention drawing target, as an attention drawing target. Then, the target generation section 31 produces a result of determination as to whether or not an input portion exists on the (t+1)th frame in a timewise close relation with the tth frame as an input portion in a spatially close relation with the attention drawing target on the tth frame.

If the determination result produced in the process carried out at the step S23 indicates that an input portion exists on the (t+1)th frame in a timewise close relation with the tth frame as an input portion in a spatially close relation with the attention drawing target on the tth frame, the flow of the integration processing represented by this flowchart goes on to a step S24. At the step S24, the target generation section 31 integrates the input portion determined in the process carried out at the step S23 to be an input portion existing on the (t+1)th frame as an input portion in a spatially close relation with the attention drawing target on the tth frame with the attention drawing target. Then, the target generation section 31 stores information on the attention drawing target obtained as a result of the integration process in the storage section 33 as information on a target of the (t+1)th frame.

To put it concretely, in the integration process carried out at the step S24, the identification information (ID) peculiar to the attention drawing target is retained as an attribute of the attention drawing target while other attributes of the attention drawing target are updated. The other attributes of the attention drawing target include representative coordinates of the attention drawing target, inform on the area (or the size) of the attention drawing target and information on the region of the attention drawing target. Thus, other attributes of the target are replaced with the representative coordinates of the input portion, inform on the area (or the size) of the input portion and information on the region of the input portion. As described above, the representative coordinates of the input portion, inform on the area of the input portion and information on the region of the input portion are included in the point information of the input portion. Then, the target generation section 31 stores information on the attention drawing target obtained as a result of the integration process in the storage section 33 as information on a target of the (t+1)th frame.

If the determination result produced in the process carried out at the step S23 indicates that no input portion exists on the (t+1)th frame in a timewise close relation with the tth frame as an input portion in a spatially close relation with the attention drawing target on the tth frame, on the other hand, the flow of the integration processing represented by this flowchart goes on to a step S25. At the step S25, the target generation section 31 deletes the information on the attention drawing target from the storage section 33.

Then, when the target generation section 31 deletes the attention drawing target, that is, when the target generation section 31 deletes the information on the attention drawing target from the storage section 33, at the next step S26, the event generation section 32 generates a new 'delete' event indicating the deletion of the attention drawing target or indicating the deletion of the series of inputs represented by the attention drawing target. Subsequently, the event generation section 32 stores information on the generated event in the storage section 33 as information on an event for the (t+1)th frame. In the case of target #2 taken as an attention drawing target as shown in the example of FIG. 6, the target generation section 31 generates a 'delete' event indicating that target #2 has been deleted with the appearance of the (t+1)th frame and stores information on the 'delete' event in the storage section 33 as information on an event for the (t+1)th frame.

After the process of the step S24 or S26 has been completed, the flow of the integration processing represented by this flowchart goes back to the step S22 in order to repeat the same processing for another target newly taken as an attention drawing target.

If the determination result produced in the process carried out at the step S22 indicates that no more target exists on the tth frame whose information on targets has been read out in the process carried out at the step S21 as a target not yet taken as an attention drawing target, on the other hand, the flow of the integration processing represented by this flowchart goes on to a step S27. At the step S27, the target generation section 31 produces a result of determination as to whether or not an input portion is left on the (t+1)th frame whose information on input portions has been received from the image processing section 24 as an input portion integrated with none of targets on the tth frame.

If the determination result produced in the process carried out at the step S27 indicates that an input portion is left on the (t+1)th frame whose information on input portions has been received from the image processing section 24 as an input portion integrated with none of targets on the tth frame, the flow of the integration processing represented by this flowchart goes on to a step S28. At the step S28, the target generation section 31 generates a new target for the input portion left on the (t+1)th frame as input portion integrated with none of targets on the tth frame. That is to say, the target generation section 31 takes such an input portion as a new target.

An input portion left on the (t+1)th frame whose information on input portions has been received from the image processing section 24 as an input portion integrated with none of targets on the tth frame is an input portion not in a spatially close relation with any of the targets. Such an input portion is regarded as an input portion serving as the start of a new series of inputs. Thus, in this case, the input portion is taken as a new target, that is, a new target is created as a target, which will represent the new series of inputs. The target generation section 31 stores information on the new target in the storage section 33 as information on a target of the (t+1)th frame.

Then, when the target generation section 31 generates the new target, at the next step S29, the event generation section 32 newly generates a 'create' event and stores information on the event in the storage section 33 as information on an event of the (t+1)th frame. Finally, the integration processing represented by this flowchart is ended. Then, the flow of the processing represented by the flowchart shown in FIG. 2 goes on to the step S5.

If the determination result produced in the process carried out at the step S27 indicates that no input portion is left on the (t+1)th frame whose information on input portions has been received from the image processing section 24 as an input portion integrated with none of targets on the tth frame, on the other hand, the integration processing represented by this flowchart is ended without carrying out the processes of the steps S28 and S29. Then, the flow of the processing represented by the flowchart shown in FIG. 2 goes on to the step S5.

In the integration processing described above, if no input portion exists on the (t+1)th frame in a timewise close relation with the tth frame as an input portion in a spatially close relation with any target selected as an attention drawing target on the tth frame, the target generation section 31 deletes the information on the target from the storage section 33. It is to be noted that, as an alternative, instead of deleting the information on an attention drawing target on the tth frame in case no input portion exists on the (t+1)th frame in a timewise close relation with the tth frame as an input portion in a spatially close relation with the attention drawing target, the information on the attention drawing target can also be kept for several subsequent consecutive frames following the (t+1)th frame before being deleted. Thus, even when the user undesirably stops an operation to bring a specific finger thereof into contact with a position on the surface of the display screen in an instant by mistake, the input portion corresponding to the position approached by the finger can be integrated with the undeleted target existing before the operation to bring the finger into contact with the position on the surface of the display screen is stopped provided that the user resumes the operation.

As described above, in the integration processing, the target generation section 31 integrates an input portion existing in the (t+1)th frame in a timewise close relation with the tth frame as an input portion in a spatially close relation with an attention drawing target on the tth frame with the attention drawing target, which represents a series of inputs. This is because the input portion, which is a position on the surface of the display screen of the input/output display 22, is regarded as a part of the series of inputs. As described before, an input portion is a position newly receiving an input from an external source. In addition, in the integration processing, a 'create' event may be properly generated in order to indicate that a new target has been generated or a 'delete' event may be generated in order to indicate that an existing target has been deleted or that the number of existing targets has been reduced.

Figure 9:
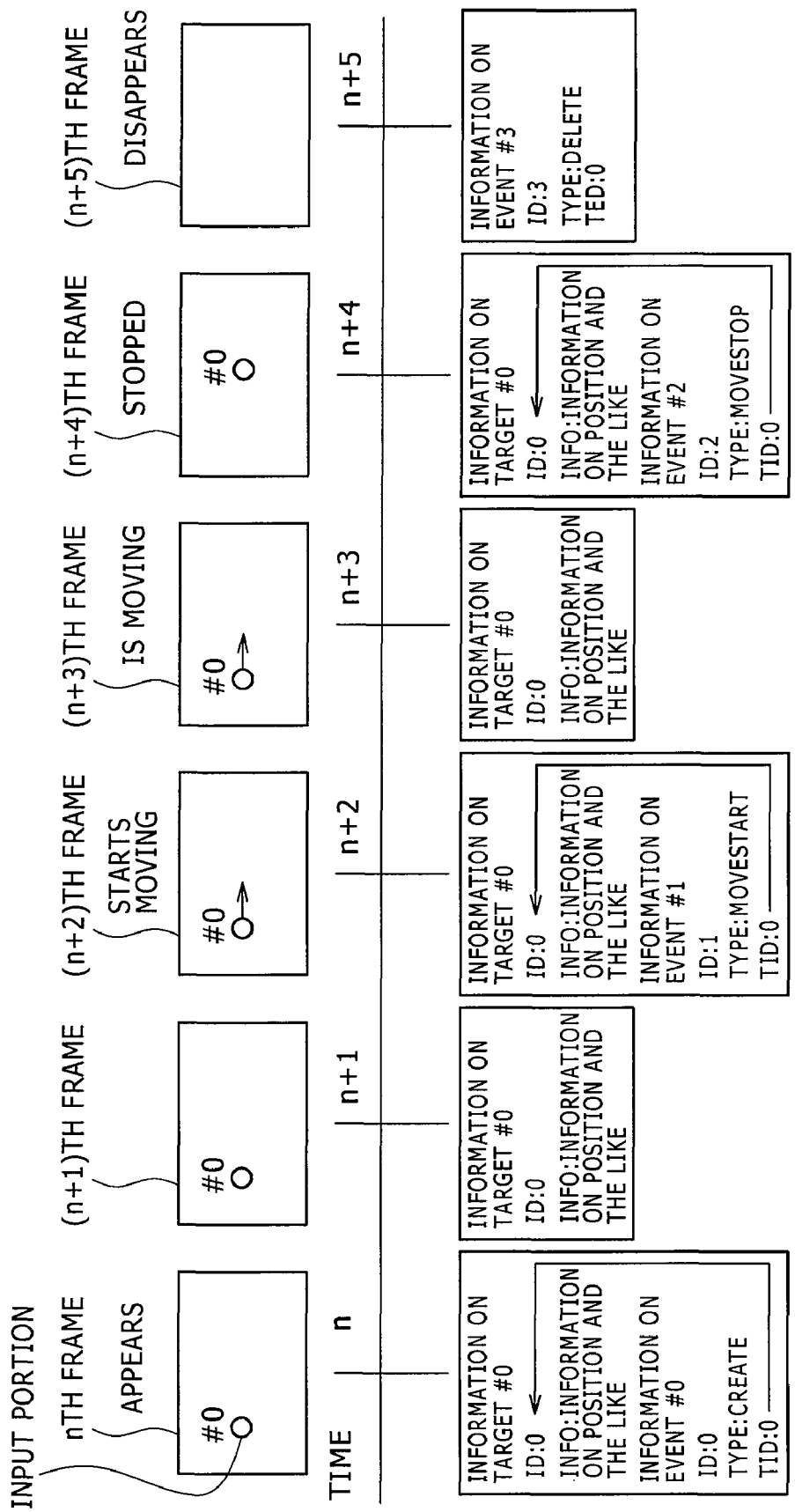
FIG. 9 is an explanatory diagram showing examples of information on a target and information on an event, which are output by a generation section.

FIG. 9 is an explanatory diagram showing examples of the information on a target and the information on an event, which are output by the generation section 25.

An upper diagram of FIG. 9 shows input portions on an image based on a received-light signal for the nth frame observed at the nth point of time to the (n+5)th frame observed at the (n+5)th point of time. In the diagram, the input portions are each shown as a white circle. On the other hand, a lower diagram of FIG. 9 shows information on a target and information on an event, which are output with the same timing as the nth frame observed at the nth point of time to the (n+5)th frame observed at the (n+5)th point of time.

Let us assume for example that, at the nth point of time, the user starts an operation to bring a finger thereof into contact with positions on the surface of the display screen of the input/output display 22 and, while sustaining the finger in the state of being in contact with the surface of the display screen thereafter between the nth point of time and the (n+4)th point of time, the user starts an operation to move the finger over the surface of the display screen in a direction from the left to the right at the (n+2)th point of time and stops the operation to move the finger over the surface of the display screen in a direction from the left to the right at the (n+4)th frame as shown in an upper diagram of FIG. 9. Then, at the (n+5)th point of time, no input portion is shown in order to indicate that the operation to bring the finger into contact with positions on the surface of the display screen of the input/output display 22 has been ended, that is, in order to indicate that the finger has been removed from the surface. Thus, input portion #0 on the (n+4)th frame is the last input portion, which is obtained when the user stops the operation to bring the finger into contact with positions on the surface of the display screen of the input/output display 22, that is, when the user removes the finger from the surface.

That is to say, when the user starts the operation to bring the finger into contact with positions on the surface of the display screen of the input/output display 22, new input portion #0 on the nth frame appears as shown in the upper diagram of FIG. 9.

In the case of the example shown in the figure, for input portion #0 on the nth frame, new target #0 is created. That is to say, new target #0 is created with the same timing as the nth frame as a target having information on the target, which represents a series of inputs received so far at input portion #0. In this case, the series of inputs consists of only one input received at the nth point of time. The information on the created target includes a target ID of 0 and target related information referred to as INFO as shown at the left end of the lower diagram of FIG. 9. The target related information INFO is target attributes excluding the target ID. INFO includes positional information of input portion #0 on the nth frame. The positional information of an input is typically the coordinates of a representative point of the input portion.

It is to be noted that the substance of a target is a region, information on which is held in a memory used for storing attributes the target.

With the same timing as the nth frame, when new target #0 is created, an event representing (a change of) the state of the target is also generated as well. That is to say, new event #0 is generated with the same timing as the nth frame as an event having information on the event. The information on the event is attributes of the event and includes an event ID of 0, an event type of 'Create' and target identification information tid of 0 as shown at the left end of the lower diagram of FIG. 9. The event ID is information used for identifying the event. The event type is information used for indicating the type of the event. In this case, the event type of 'Create' indicates that target #0 is newly created. The target identification information tid is information used for identifying a target, the state of which is represented by the event. In this case, since the target is target #0, the target identification information tid is also set at 0 as well.

It is to be noted that an event having an event type of 'Create' indicating that a target has been newly created is referred to as a 'create' event.

As described above, attributes of an event include the target identification information tid used for identifying a target, the state of which is represented by the event. Thus, the target identification information tid can be used for identifying a target, the state of which is represented by the event.

It is to be noted that the substance of an event is a region, information on which is held in a memory used for storing attributes the event.

Then, on the (n+1)th frame, input portion #0 is not moved but stays at its position as it is as shown in the upper diagram of FIG. 9.

In this case, input portion #0 on the (n+1)th frame is integrated with target #0 newly generated with the same timing as the nth frame leading ahead of the (n+1)th frame by one frame. This is because input #0 is in a spatially close relation with target #0. As a result of the integration process, target #0 on the (n+1)th frame retains its target ID of 0 assigned to target #0 on the nth frame and has its target related information INFO replaced with the information on input portion #0 on the (n+1)th frame as shown in the lower diagram of FIG. 9. The information on input portion #0 on the (n+1)th frame includes information on the position of input portion #0.

At the (n+2)th point of time corresponding to the (n+2)th frame, the user starts the operation to move input portion #0 over the surface of the display screen in a direction from the left to the right at the (n+2)th point of time as shown in the upper diagram of FIG. 9.

In this case, input portion #0 on the (n+2)th frame is integrated with target #0 updated with the same timing as the (n+1)th frame leading ahead of the (n+2)th frame by one frame. This is because input #0 is still in a spatially close relation with target #0. As a result of the integration process, target #0 on the (n+2)th frame retains its target ID of 0 assigned to target #0 on the (n+1)th frame and has its target related information INFO replaced with the information on input portion #0 on the (n+2)th frame as shown in the lower diagram of FIG. 9. The information on input portion #0 on the (n+2)th frame includes information on the position of input portion #0.

In addition, when the user starts the operation to move input portion #0 integrated with target #0 at the (n+2)th point of time corresponding to the (n+2)th frame, that is, when the user starts an operation to move target #0, new event #1 is generated in order to indicate that the movement of target #0 has been started. Information on event #1 generated with the same timing as the (n+2)th frame is attributes of the event and includes an event ID of 1, an event type of 'MoveStart' and target identification information tid of 0 as shown in the lower diagram of FIG. 9. The event ID of 1 is information used for identifying the event, which is event #1. This event ID of 1 is deliberately made different from the event ID of 0 assigned to event #0 generated with the same timing as the nth frame. The event type of 'MoveStart' is information used for indicating the type of the event representing the state of target #0, which starts to move. The target identification information tid of 0 is information used for identifying target #0 (having a target ID of 0), the state of which is represented by the event.

Then, on the (n+3)th frame, input portion #0 is moving as shown in the upper diagram of FIG. 9.

In this case, input portion #0 on the (n+3)th frame is integrated with target #0 newly generated with the same timing as the (n+2)th frame leading ahead of the (n+3)th frame by one frame. This is because input #0 is still in a spatially close relation with target #0. As a result of the integration process, target #0 on the (n+3)th frame retains its target ID of 0 assigned to target #0 on the (n+2)th frame and has its target related information INFO replaced with the information on input portion #0 on the (n+3)th frame as shown in the lower diagram of FIG. 9. The information on input portion #0 on the (n+3)th frame includes information on the position of input portion #0.

At the (n+4)th point of time corresponding to the (n+4)th frame, the user stops the operation to move input portion #0 over the surface of the display screen in a direction from the left to the right at the (n+4)th point of time as shown in the upper diagram of FIG. 9.

In this case, input portion #0 on the (n+4)th frame is integrated with target #0 updated with the same timing as the (n+3)th frame leading ahead of the (n+4)th frame by one frame. This is because input #0 is in a spatially close relation with target #0. As a result of the integration process, target #0 on the (n+4)th frame retains its target ID of 0 assigned to target #0 on the (n+3)th frame and has its target related information INFO replaced with the information on input portion #0 on the (n+4)th frame as shown in the lower diagram of FIG. 9. The information on input portion #0 on the (n+4)th frame includes information on the position of input portion #0.

In addition, when the user stops the operation to move input portion #0 integrated with target #0 at the (n+4)th point of time corresponding to the (n+4)th frame, that is, when the user stops the operation to move target #0, new event #2 is generated in order to indicate that the movement of target #0 has been stopped. Information on event #2 generated with the same timing as the (n+4)th frame is attributes of the event and includes an event ID of 2, an event type of 'MoveStop' and target identification information tid of 0 as shown in the lower diagram of FIG. 9. The event ID of 2 is information used for identifying the event, which is event #2. This event ID of 2 is deliberately made different from the event ID of 0 assigned to event #0 generated with the same timing as the nth frame and different from the event ID of 1 assigned to event #1 generated with the same timing as the (n+2)th frame. The event type of 'MoveStop' is information used for indicating the type of the event representing the state of target #0, which stops moving. The target identification information tid of 0 is information used for identifying target #0 (having a target ID of 0), the state of which is represented by the event.

At the (n+5)th point of time corresponding to the (n+5)th frame, the user discontinues the operation to bring the finger into contact with positions on the surface of the display screen of the input/output display 22, that is, the user removes the finger from the surface. In this case, input portion #0 disappears from the surface of the display screen of the input/output display 22 as shown in the upper diagram of FIG. 9.

In this case, target #0 is also deleted at the (n+5)th point of time corresponding to corresponding to the (n+5)th frame.

When, input portion #0 disappears from a position on the surface of the display screen of the input/output display 22 and target #0 is thus deleted at the (n+5)th point of time corresponding to corresponding to the (n+5)th frame, new event #3 is generated. Information on event #3 generated with the same timing as the (n+5)th frame is attributes of the event and includes an event ID of 3, an event type of 'delete' and target identification information tid of 0 as shown in the lower diagram of FIG. 9. The event ID of 3 is information used for identifying the event, which is event #3. This event ID of 3 is deliberately made different from the event ID of 0 assigned to event #0 generated with the same timing as the nth frame, different from the event ID of 1 assigned to event #1 generated with the same timing as the (n+2)th frame and different from the event ID of 2 assigned to event #2 generated with the same timing as the (n+4)th frame. The event type of 'delete' is information used for indicating the type of the event representing the state of target #0, which is deleted. The target identification information tid of 0 is information used for identifying target #0 (having a target ID of 0), the state of which is represented by the event.

It is to be noted that an event having an event type of 'Delete' indicating that a target has been deleted is referred to as a 'delete' event.

Figure 10:
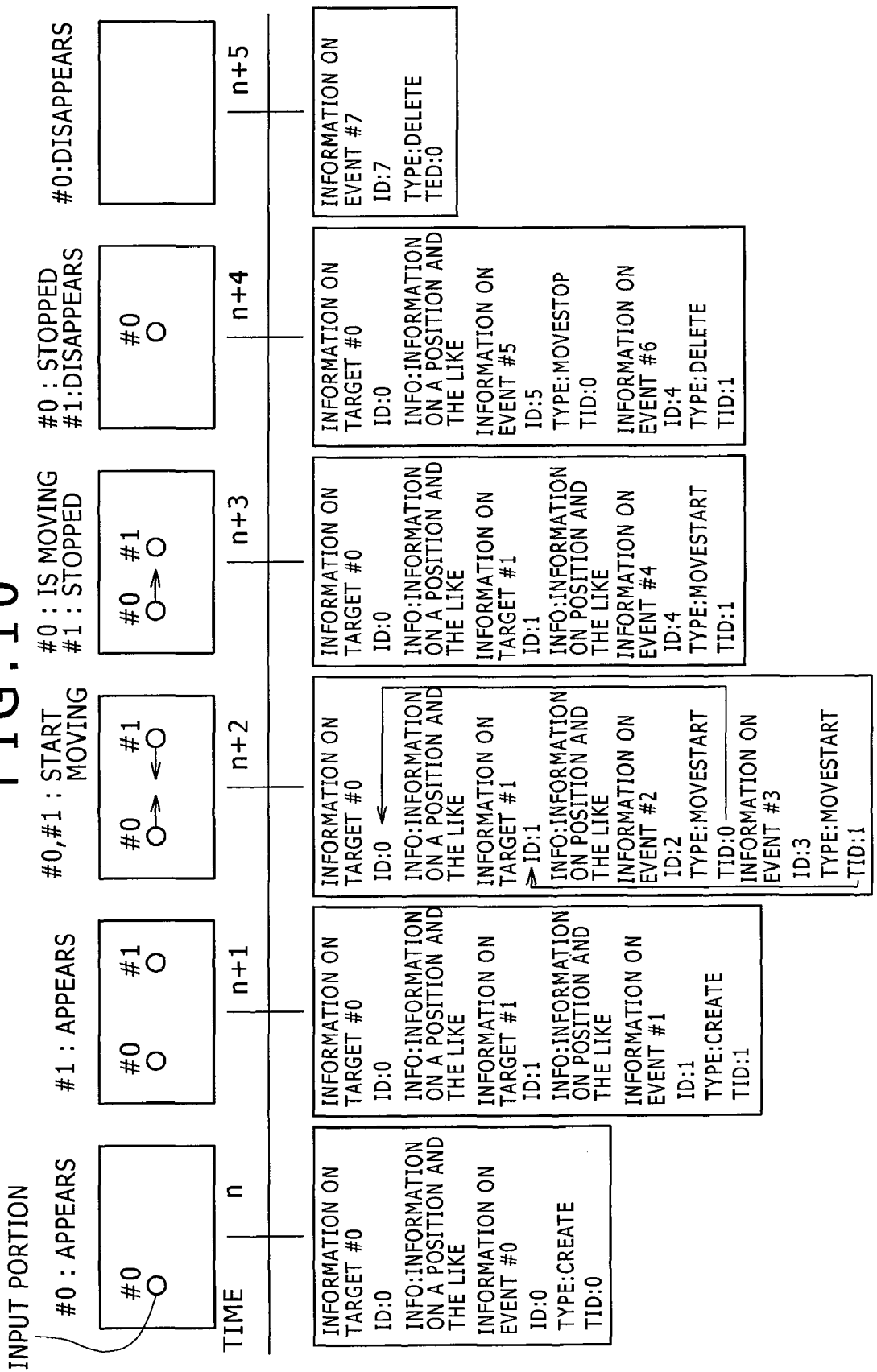
FIG. 10 is an explanatory diagram showing other examples of the information on a target and the information on an event, which are output by the generation section.

FIG. 10 is an explanatory diagram showing examples of the information on a target and the information on an event, which are output by the generation section 25.

An upper diagram of FIG. 10 shows input portions on an image based on a received-light signal for the nth frame observed at the nth point of time to the (n+5)th frame observed at the (n+5)th point of time. In the diagram, the input portions are each shown as a white circle. On the other hand, a lower diagram of FIG. 10 shows information on a target and information on an event, which are output with the same timing as the nth frame observed at the nth point of time to the (n+5)th frame observed at the (n+5)th point of time.

Let us assume for example that, at the nth point of time, the user starts an operation to bring a finger thereof into contact with positions on the surface of the display screen of the input/output display 22 and, while sustaining the finger in the state of being in contact with the surface of the display screen thereafter between the nth point of time and the (n+4)th point of time, the user starts an operation to move the finger over the surface of the display screen in a direction from the left to the right at the (n+2)th point of time and stops the operation to move the finger over the surface of the display screen in a direction from the left to the right at the (n+4)th frame as shown in FIG. 10. Then, at the (n+5)th point of time, no input portion is shown in order to indicate that the operation to bring the finger into contact with positions on the surface of the display screen of the input/output display 22 has been ended, that is, in order to indicate that the finger has been removed from the surface. Thus, input portion #0 on the (n+4)th frame is the last input portion, which is obtained when the user stops the operation to bring the finger into contact with positions on the surface of the display screen of the input/output display 22, that is, when the user removes the finger from the surface.

In addition, at the (n+1)th point of time, the user also starts an operation to bring another finger into contact with other positions on the surface of the display screen of the input/output display 22 and, while sustaining the finger in the state of being in contact with the surface of the display screen thereafter between the (n+1)th point of time and the (n+3)th point of time, the user starts an operation to move the other finger over the surface of the display screen in a direction from the right to the left at the (n+2)th point of time and stops the operation to move the finger over the surface of the display screen in a direction from the left to the right at the (n+3)th frame. Then, at the (n+4)th point of time, no input portion #1 is shown in order to indicate that the operation to bring the other finger into contact with the other positions on the surface of the display screen of the input/output display 22 has been ended.

That is to say, when the user starts the operation to bring the finger into contact with positions on the surface of the display screen of the input/output display 22, new input portion #0 on the nth frame appears as shown in the upper diagram of FIG. 10.

In the case of the example shown in FIG. 10, for input portion #0 on the nth frame, new target #0 is created in the same way as the example shown in FIG. 9. That is to say, new target #0 is created with the same timing as the nth frame as a target having information on the target. The information on the created target includes a target ID of 0 and target related information referred to as INFO as shown at the left end of the lower diagram of FIG. 10. The target related information INFO is target attributes excluding the target ID. INFO includes positional information of input portion #0 on the nth frame. The positional information of an input is typically the coordinates of a representative point of the input portion.

In addition, with the same timing as the nth frame, when new target #0 is created, an event for the target is also generated as well in the same way as the example shown in FIG. 9. That is to say, new event #0 is generated with the same timing as the nth frame as an event having information on the event. The information on the event is attributes of the event and includes an event ID of 0, an event type of 'Create' and target identification information tid of 0 as shown at the left end of the lower diagram of FIG. 10. The event ID of 0 is information used for identifying event #0. The event type is information used for indicating the type of the event. The target identification information tid is information used for identifying a target, the state of which is represented by the event.

Then, on the (n+1)th frame, input portion #0 is not moved but stays at its position as it is as shown in the upper diagram of FIG. 10.

In this case, input portion #0 on the (n+1)th frame is integrated with target #0 newly generated with the same timing as the nth frame leading ahead of the (n+1)th frame by one frame. As a result of the integration process, target #0 on the (n+1)th frame retains its target ID of 0 assigned to target #0 on the nth frame and has its target related information INFO replaced with the information on input portion #0 on the (n+1)th frame as shown in the lower diagram of FIG. 10. The information on input portion #0 on the (n+1)th frame includes information on the position of input portion #0.

In addition, at the (n+1)th point of time corresponding to the (n+1)th frame, the user also starts an operation to bring another finger into contact with other positions on the surface of the display screen of the input/output display 22 as described earlier. When the user starts the operation to bring the other finger into contact with the other positions on the surface of the display screen of the input/output display 22, new input portion #1 on the (n+1)th frame appears as shown in the upper diagram of FIG. 10.

In this case, for input portion #1 on the (n+1)th frame, new target #1 is created in the same way as the example shown in FIG. 9. That is to say, new target #1 is created with the same timing as the (n+1)th frame as a target having information on the target. The information on the created target includes a target ID of 1 and target related information referred to as INFO as shown in the lower diagram of FIG. 10. The target ID of 1 is made deliberately different from the target ID of 0 assigned to target #0. The target related information INFO is target attributes excluding the target ID. INFO includes positional information of input portion #1 on the (n+1)th frame. The positional information of an input is typically the coordinates of a representative point of the input portion.

In addition, with the same timing as the (n+1)th frame, when new target #1 is created, an event for the target is also generated as well in the same way as the example shown in FIG. 9. That is to say, new event #1 is generated with the same timing as the (n+1)th frame as an event having information on the event. The information on the event is attributes of the event and includes an event ID of 1, an event type of 'Create' and target identification information tid of 1 as shown in the lower diagram of FIG. 10. This event ID of 1 is deliberately made different from the event ID of 0 assigned to event #0 created with the same timing as the nth frame. The event ID of 1 is information used for identifying event #1. The event type is information used for indicating the type of the event. The target identification information tid is information used for identifying a target, the state of which is represented by the event.

At the (n+2)th point of time corresponding to the (n+2)th frame, the user starts the operation to move input portion #0 over the surface of the display screen in a direction from the left to the right and the operation to move input portion #1 over the surface of the display screen in a direction from the right to the left at the (n+2)th point of time as shown in the upper diagram of FIG. 10.

In this case, input portion #0 on the (n+2)th frame is integrated with target #0 updated with the same timing as the (n+1)th frame leading ahead of the (n+2)th frame by one frame. As a result of the integration process, target #0 on the (n+2)th frame retains its target ID of 0 assigned to target #0 on the (n+1)th frame and has its target related information INFO replaced with the information on input portion #0 on the (n+2)th frame as shown in the lower diagram of FIG. 10. The information on input portion #0 on the (n+2)th frame includes information on the position of input portion #0.

By the same token, input portion #1 on the (n+2)th frame is integrated with target #1 generated with the same timing as the (n+1)th frame leading ahead of the (n+2)th frame by one frame. As a result of the integration process, target #1 on the (n+2)th frame retains its target ID of 1 assigned to target #1 on the (n+1)th frame and has its target related information INFO replaced with the information on input portion #1 on the (n+2)th frame as shown in the lower diagram of FIG. 10. The information on input portion #1 on the (n+2)th frame includes information on the position of input portion #1.

In addition, when the user starts the operation to move input portion #0 integrated with target #0 at the (n+2)th point of time corresponding to r the (n+2)th frame, that is, when the user starts the operation to move target #0, new event #2 is generated in order to indicate that the movement of target #0 has been started. Information on event #2 generated with the same timing as the (n+2)th frame is attributes of the event and includes an event ID of 2, an event type of 'MoveStart' and target identification information tid of 0 as shown in the lower diagram of FIG. 10. The event ID of 2 is information used for identifying the event, which is event #2. This event ID of 2 is deliberately made different from the event ID of 0 assigned to event #0 generated with the same timing as the nth frame and different from the event ID of 1 assigned to event #1 generated with the same timing as the (n+1)th frame. The event type of 'MoveStart' is information used for indicating the type of the event representing the state of target #0, which starts to move. The target identification information tid of 0 is information used for identifying target #0 (having a target ID of 0), the state of which is represented by the event.

By the same token, when the user starts the operation to move input portion #1 integrated with target #1 at the (n+2)th point of time corresponding to the (n+2)th frame, that is, when the user starts the operation to move target #1, new event #3 is generated in order to indicate that the movement of target #1 has been started. Information on event #3 generated with the same timing as the (n+2)th frame is attributes of the event and includes an event ID of 3, an event type of 'MoveStart' and target identification information tid of 1 as shown in the lower diagram of FIG. 10. The event ID of 3 is information used for identifying the event, which is event #3. This event ID of 3 is deliberately made different from the event ID of 0 assigned to event #0 generated with the same timing as the nth frame, different from the event ID of 1 assigned to event #1 generated with the same timing as the (n+1)th frame and different from the event ID of 2 assigned to event #2 generated with the same timing as the (n+2)th frame. The event type of 'MoveStart' is information used for indicating the type of the event representing the state of target #1, which starts to move. The target identification information tid of 1 is information used for identifying target #1 (having a target ID of 1), the state of which is represented by the event.

Then, on the (n+3)th frame, input portion #0 is moving as shown in the upper diagram of FIG. 10.

In this case, input portion #0 on the (n+3)th frame is integrated with target #0 newly generated with the same timing as the (n+2)th frame leading ahead of the (n+3)th frame by one frame. As a result of the integration process, target #0 on the (n+3)th frame retains its target ID of 0 assigned to target #0 on the (n+2)th frame and has its target related information INFO replaced with the information on input portion #0 on the (n+3)th frame as shown in the lower diagram of FIG. 10. The information on input portion #0 on the (n+3)th frame includes information on the position of input portion #0.

On the other hand, at the (n+3)th point of time corresponding to the (n+3)th frame, the user stops the operation to move input portion #1 at the (n+3)th point of time as shown in the upper diagram of FIG. 10.

In this case, input portion #1 on the (n+3)th frame is integrated with target #1 for the (n+2)th frame leading ahead of the (n+3)th frame by one frame. As a result of the integration process, target #1 on the (n+3)th frame retains its target ID of 1 assigned to target #1 on the (n+2)th frame and has its target related information INFO replaced with the information on input portion #1 on the (n+3)th frame as shown in the lower diagram of FIG. 10. The information on input portion #1 on the (n+3)th frame includes information on the position of input portion #1.

In addition, when the user stops the operation to move input portion #1 integrated with target #1 at the (n+3)th point of time corresponding to the (n+3)th frame, that is, when the user stops the operation to move target #1, new event #4 is generated in order to indicate that the movement of target #1 has been stopped. Information on event #4 generated with the same timing as the (n+3)th frame is attributes of the event and includes an event ID of 4, an event type of 'MoveStop' and target identification information tid of 1 as shown in the lower diagram of FIG. 10. The event ID of 4 is information used for identifying the event, which is event #4. This event ID of #4 is deliberately made different from the event IDs of 0 to 3 assigned to events #0 to #3 respectively. The event type of 'MoveStop' is information used for indicating the type of the event representing the state of target #1, which stops moving. The target identification information tid of 1 is information used for identifying target #1 (having a target ID of 1), the state of which is represented by the event.

At the (n+4)th point of time corresponding to the (n+4)th frame, the user discontinues the operation to bring its other finger into contact with a position on the surface of the display screen of the input/output display 22. In this case, input portion #1 disappears from the position on the surface of the display screen of the input/output display 22 as shown in the upper diagram of FIG. 10.

In this case, target #1 is deleted at the (n+4)th point of time corresponding to the (n+4)th frame.

In addition, at the (n+4)th point of time corresponding to the (n+4)th frame, the user stops the operation to move input portion #0 at the (n+4)th point of time as shown in the upper diagram of FIG. 10.

In this case, input portion #0 on the (n+4)th frame is integrated with target #0 updated with the same timing as the (n+3)th frame leading ahead of the (n+4)th frame by one frame. As a result of the integration process, target #0 on the (n+4)th frame retains its target ID of 0 assigned to target #0 on the (n+3)th frame and has its target related information INFO replaced with the information on input portion #0 on the (n+4)th frame as shown in the lower diagram of FIG. 10. The information on input portion #0 on the (n+4)th frame includes information on the position of input portion #0.

In addition, when the user stops the operation to move input portion #0 integrated with target #0 at the (n+4)th point of time corresponding to the (n+4)th frame, that is, when the user stops the operation to move target #0, new event #5 is generated in order to indicate that the movement of target #0 has been stopped. Information on event #5 generated with the same timing as the (n+4)th frame is attributes of the event and includes an event ID of 5, an event type of 'MoveStop' and target identification information tid of 0 as shown in the lower diagram of FIG. 10. The event ID of 5 is information used for identifying the event, which is event #5. This event ID of #5 is deliberately made different from the event IDs of 0 to 4 assigned to events #0 to #4 respectively. The event type of 'MoveStop' is information used for indicating the type of the event representing the state of target #0, which stops moving. The target identification information tid of 0 is information used for identifying target #0 (having a target ID of 0), the state of which is represented by the event.

At the same time, when, input portion #1 disappears from the position on the surface of the display screen of the input/output display 22 and target #1 is thus deleted at the (n+4)th point of time corresponding to the (n+4)th frame, new event #6 is generated. Information on event #6 generated with the same timing as the (n+4)th frame is attributes of the event and includes an event ID of 6, an event type of 'delete' and target identification information tid of 1 as shown in the lower diagram of FIG. 10. The event ID of 6 is information used for identifying the event, which is event #6. This event ID of #6 is deliberately made different from the event IDs of 0 to 5 assigned to events #0 to #5 respectively. The event type of 'delete' is information used for indicating the type of the event representing the state of target #1, which is deleted. The target identification information tid of 1 is information used for identifying target #1 (having a target ID of 1), the state of which is represented by the event.

At the (n+5)th point of time corresponding to the (n+5)th frame, the user discontinues the operation to bring the finger into contact with positions on the surface of the display screen of the input/output display 22. In this case, input portion #0 disappears from the position on the surface of the display screen of the input/output display 22 as shown in the upper diagram of FIG. 10.

In this case, target #0 is deleted at the (n+5)th point of time corresponding to the (n+5)th frame.

When, input portion #0 disappears from the position on the surface of the display screen of the input/output display 22 and target #0 is thus deleted at the (n+5)th point of time corresponding to the (n+5)th frame, new event #7 is generated. Information on event #7 generated with the same timing as the (n+5)th frame is attributes of the event and includes an event ID of 7, an event type of 'delete' and target identification information tid of 0 as shown in the lower diagram of FIG. 10. The event ID of 7 is information used for identifying the event, which is event #7. This event ID of 7 is deliberately made different from the event IDs 0 to 6 assigned events #0 to #6 respectively. The event type of 'delete' is information used for indicating the type of the event representing the state of target #0, which is deleted. The target identification information tid of 0 is information used for identifying target #0 (having a target ID of 0), the state of which is represented by the event.

By referring to FIGS. 11 to 23, the following description explains the recognition processing carried out by the event generation section 32 of the generation section 25 employed in the display system 1 shown in FIG. 1 at the step S5 of the flowchart shown in FIG. 2.

First of all, the description explains processing carried out in order to recognize an event representing a change of the state of a target. The state of a target is changed by an operation to move an input portion, an operation to stop the movement of an input portion or other operations. In the following description, a target-state change caused by an operation to move an input portion, which is integrated with a target or taken as a target, is referred to as a target movement. On the other hand, a target-state change caused by an operation to stop the movement of an input portion, which is integrated with a target or taken as a target, is referred to as a target stop.

Figure 11:
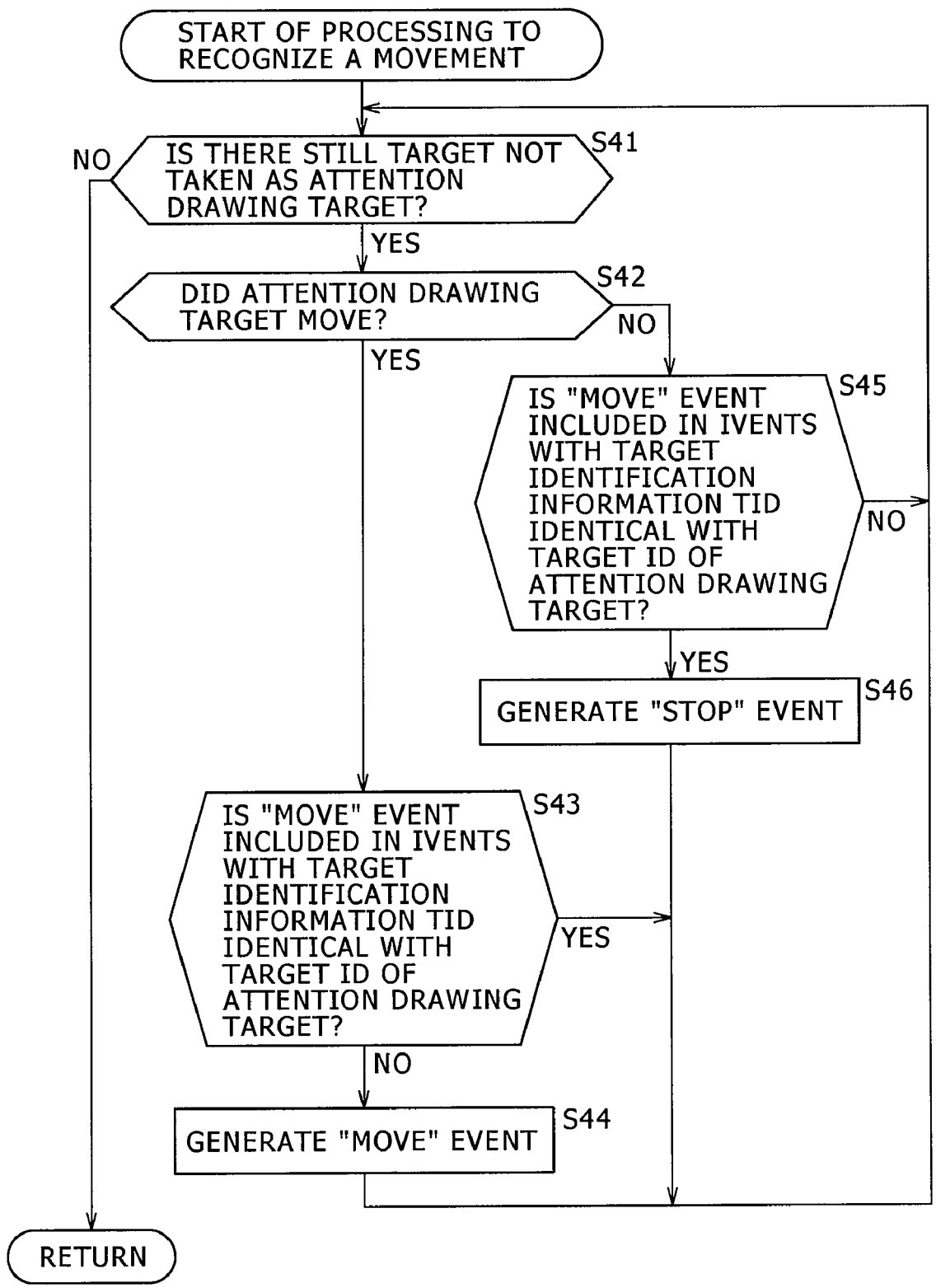
FIG. 11 shows a flowchart to be referred to in description of processing carried out at a step S5 of the flowchart shown in FIG. 2 in order to recognize a target movement and a target stop.

By referring to a flowchart shown in FIG. 11, the following description explains processing carried out by the event generation section 32 of the generation section 25 employed in the display system 1 shown in FIG. 1 at the step S5 of the flowchart shown in FIG. 2 in order to recognize a target movement as well as a target stop and generate respectively a 'move' event representing a target movement as well as a 'stop' event representing a target stop.

It is to be noted that the 'move' event is an event having the type of 'MoveStart' shown in FIGS. 9 and 10. On the other hand, the 'stop' event is an event having the type of 'MoveStop' shown in FIGS. 9 and 10.

Since the processing carried out in order to recognize the movement state of a target (that is, processing carried out in order to recognize whether a change of the state of the target is caused by a target move or a target stop) is carried out after an integration process, at the start of the processing, information on a target on the tth frame and information on a target on the (t+1)th frame appearing after the integration process are already in a state of being usable.

As shown in FIG. 11, the flowchart begins with a step S41 at which the event generation section 32 produces a result of determination as to whether or not there is still a target left on the (t+1)th frame as a target not taken as an attention drawing target.

If the determination result produced in the process carried out at the step S41 indicates that there is no target left on the (t+1)th frame as a target not taken as an attention drawing target, the event generation section 32 ends the execution of the target movement state recognition processing represented by this flowchart.

If the determination result produced in the process carried out at the step S41 indicates that there is still a target left on the (t+1)th frame as a target not taken as an attention drawing target, on the other hand, the flow of the target movement state recognition processing represented by this flowchart goes on to a step S42. At the step S42, the event generation section 32 takes the target left on the (t+1)th frame as a target not taken as an attention drawing target as an attention drawing target. Then, the event generation section 32 produces a result of determination as to whether or not a target movement has occurred between the tth frame and the (t+1)th frame.

If the determination result produced in the process carried out at the step S42 indicates that a target movement has occurred between the tth frame and the (t+1)th frame, the flow of the target movement state recognition processing represented by this flowchart goes on to a step S43. At the step S43, the event generation section 32 retrieves information on events from the storage section 33 and produces a result of determination as to whether or not a 'move' event is included in events, the retrieved information of each of which has a target identification information tid identical with the target ID of the attention drawing target.

If the determination result produced in the process carried out at the step S43 indicates that a 'move' event is not included in events, the retrieved information of each of which has a target identification information tid identical with the target ID of the attention drawing target, that is, if the state of the attention drawing target has been a target stop so far and an input portion integrated with the attention drawing target starts moving, the flow of the target movement state recognition processing represented by this flowchart goes on to a step S44. At the step S44, the event generation section 32 generates a new 'move' event.

To put it concretely, the new 'move' event generated by the event generation section 32 has attributes including an event ID different from event IDs assigned to events generated so far. The attributes also include an event type of 'MoveStart'. In addition, the attributes include target identification information tid identical with the ID of the attention drawing target, which starts moving along with an input portion integrated therewith.

Then, the event generation section 32 stores the information on the 'move' event in the storage section 33. As described above, the information on the 'move' event includes an event ID, an event type and target identification information tid. Then, the flow of the target movement state recognition processing represented by this flowchart goes back to the step S41 in order to repeat the processes described so far in the same way.

If the determination result produced in the process carried out at the step S43 indicates that a 'move' event is included in events, the retrieved information of each of which has a target identification information tid identical with the target ID of the attention drawing target, that is, the attention drawing target is moving along with an input portion integrated therewith, on the other hand, the flow of the target movement state recognition processing represented by this flowchart goes back to the step S41 in order to repeat the processes described so far in the same way.

If the determination result produced in the process carried out at the step S42 indicates that a target movement has not occurred between the tth frame and the (t+1)th frame, on the other hand, the flow of the target movement state recognition processing represented by this flowchart goes on to a step S45. At the step S45, the event generation section 32 retrieves information on events from the storage section 33 and produces a result of determination as to whether or not a 'move' event is included in events, the retrieved information of each of which has a target identification information tid identical with the target ID of the attention drawing target.

If the determination result produced in the process carried out at the step S45 indicates that a 'move' event is included in events, the retrieved information of each of which has a target identification information tid identical with the target ID of the attention drawing target, that is, if an input portion integrated with the attention drawing target stops moving or has been stopped, the flow of the target movement state recognition processing represented by this flowchart goes on to a step S46. At the step S46, the event generation section 32 generates a new 'stop' event.

To put it concretely, the new 'stop' event generated by the event generation section 32 has attributes including an event ID different from event IDs assigned to events generated so far. The attributes also include an event type of 'MoveStop'. In addition, the attributes include target identification information tid identical with the ID of the attention drawing target, which stops moving along with the input portion integrated therewith.

Then, the event generation section 32 stores the information on the 'stop' event in the storage section 33. As described above, the information on the 'stop' event includes an event ID, an event type and target identification information tid. Then, the flow of the target movement state recognition processing represented by this flowchart goes back to the step S41 in order to repeat the processes described so far in the same way.

If the determination result produced in the process carried out at the step S45 indicates that a 'move' event is not included in events, the retrieved information of each of which has a target identification information tid identical with the target ID of the attention drawing target, that is, the attention drawing target is in a standstill state along with an input portion integrated therewith, on the other hand, the flow of the target movement state recognition processing represented by this flowchart goes back to the step S41 in order to repeat the processes described so far in the same way.

By carrying out the processing carried out in order to recognize the movement state of a target as described above, it is possible to recognize a target movement as well as a target stop and generate respectively a 'move' event representing a target movement as well as a 'stop' event representing a target stop.

Next, let us assume for example that the user brings a finger thereof into contact with a first position on the surface of the display screen and, then, while sustaining the finger in the state of being in contact with the surface of the display screen thereafter, the user moves the finger over the surface to a second position. Then, the user removes the finger from the second position on the surface of the display screen. If the distance between first position, into which the finger is brought into contact for the first time, and the second position, from which the finger is removed, is at least equal to a predetermined threshold value, the event generation section 32 generates a 'project' event representing projection of a target.

Figure 12:
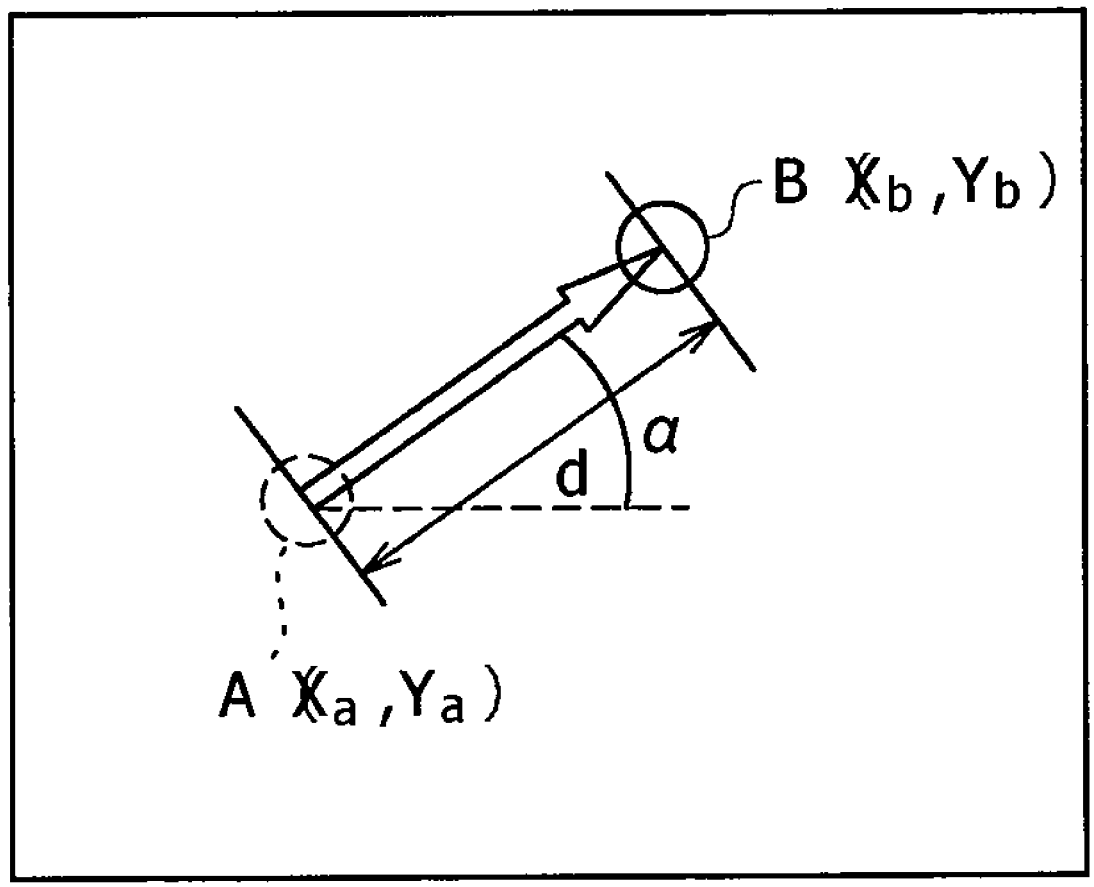
FIG. 12 is an explanatory diagram to be referred to in description of processing carried out in order to recognize projection.

By referring to FIG. 12, the following description explains projection recognition processing carried out in order to recognize projection and generate a 'project' event according to the recognized projection.

A frame with an appearance timing coinciding with the start of an operation to bring a finger thereof into contact with the surface of the display screen is referred to as a start frame. On the other hand, a frame with an appearance timing coinciding with the timing of a process carried out in order to generate the 'project' event is referred to as the (t+1)th frame.

FIG. 12 is an explanatory diagram showing a state in which the user starts an operation to bring a finger thereof into contact with the surface of the display screen at a position A on the start frame appearing on the surface of the display screen of the input/output display 22 and, then, while sustaining the finger in the state of being in contact with the surface of the display screen thereafter, the user moves the finger over the surface to a position B on the (t+1)th frame appearing on the surface of the display screen before the user removes the finger from the surface.

The coordinates (Xa, Ya) of the position A are the representative coordinates of a target on the start frame, at which the operation to bring a finger thereof into contact with the surface of the display screen is started. The position B is a display-screen surface point from which the finger is removed. Let coordinates (Xb, Yb) be the coordinates of the position B. In this case, the distance d between the positions A and B is referred to as the displacement distance of the target and expressed by the following equation.

$$d=\sqrt{[(Xb-Xa)2+(Yb-Ya)2]}$$

If the displacement target d of the target is at least equal to a predetermined threshold value, the event generation section 32 generates a 'project' event.

The 'project' event has attributes including an event ID, an event type, target identification information tid and additional information also referred to as extra information. Examples of the extra information of a 'project' event are the displacement target d of a target, the state of which is represented by the 'project event', and a projection angle α expressed by the following equation:

$$\alpha = a\tan 2(Yb-Ya, Xb-Xa)$$

The function a tan 2 (x, y) having arguments x and y on the right-hand side of the equation α=a tan 2 (Yb−Ya, Xb−Xa) expressing the projection angle α has a return value representing an angle φ satisfying the equation tan φ=y/x where x and y are the arguments cited above and having a value expressed in terms of radians in the range $-\pi \square \phi \square \pi$. For x>0 and y=0, a tan 2 (y, x)=0. For x<0 and y=0, a tan 2 (y, x)=π. For x=0 and y=0, the return value of the function a tan 2 (x, y) is not defined. For y<0, −π<a tan 2 (y, x)<0. For y>0, 0<a tan 2 (y, x)<π.

As described above, the displacement distance d of a target, the state of which is represented by a 'project' event, and the projection angle α of the target are included in the attributes of the 'project' event. Thus, it is possible to find the coordinates (Xa, Ya) of the position A serving as the start point of the displacement of the target, the state of which is represented by a 'project' event, from only information on the target and information on the 'project' event, which have been generated with the timing of the (t+1)th frame.

Figure 13:
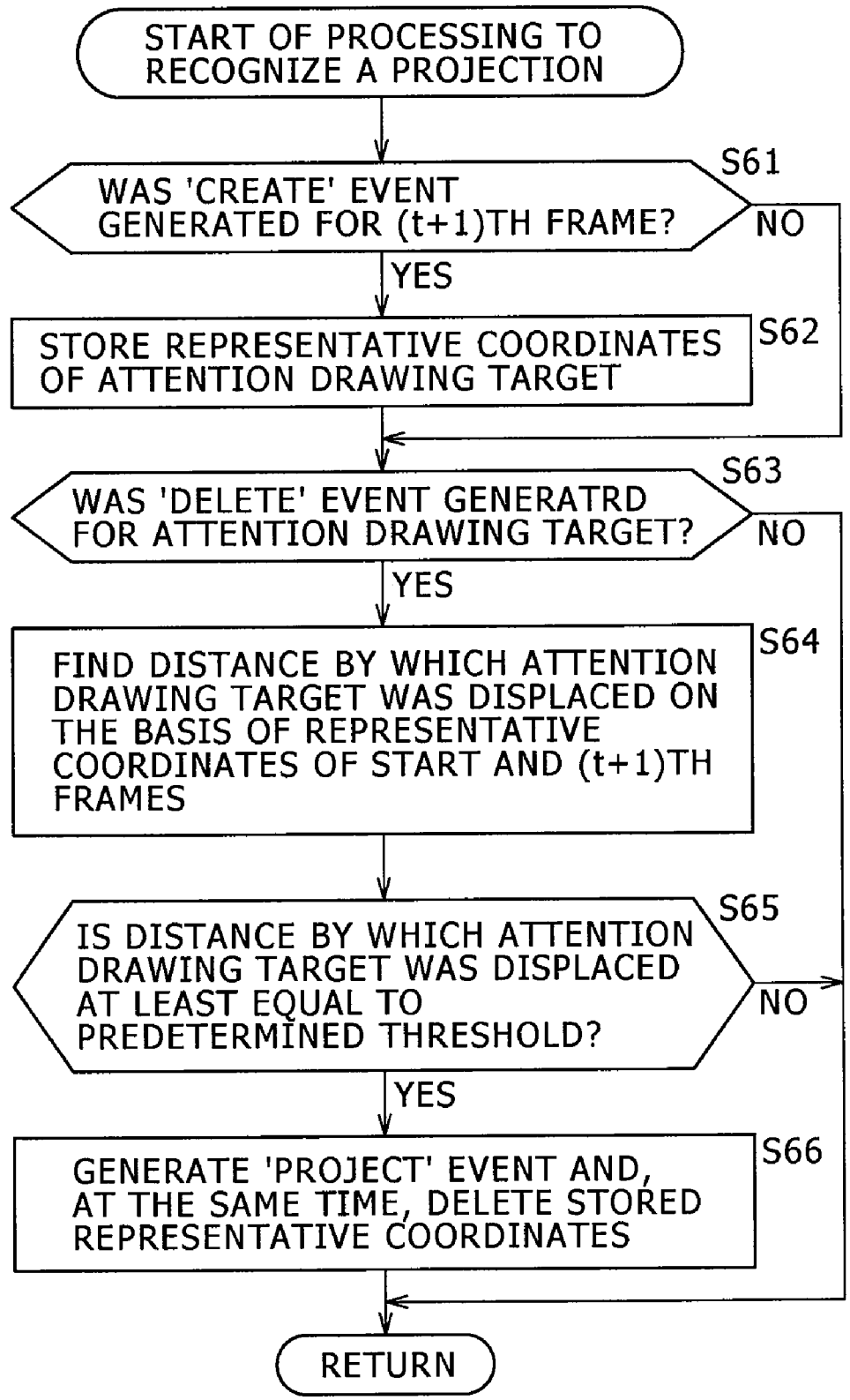
FIG. 13 shows a flowchart to be referred to in description of processing carried out at the step S5 of the flowchart shown in FIG. 2 in order to recognize projection.

By referring to a flowchart shown in FIG. 13, the following description explains projection recognition processing carried out by the event generation section 32 of the generation section 25 employed in the display system 1 shown in FIG. 1 at the step S5 of the flowchart shown in FIG. 2 in order to recognize projection and generate a 'project' event representing the recognized projection.

It is to be noted that, since the projection recognition processing is carried out after the integration processing, at the start of the projection recognition processing, information on any target and information on any event, which are generated with the timing of the start frame and the timing of the (t+1)th frame appearing after the integration processing, are already in a state of being usable.

As shown in FIG. 13, the flowchart begins with a step S61 at which the event generation section 32 produces a result of determination as to whether or not a 'create' event has been generated with the timing of the (t+1)th frame. If the determination result produced in the process carried out at the step S61 indicates that a 'create' event has been generated with the timing of the (t+1)th frame, the flow of the projection recognition processing represented by this flowchart goes on to a step S62. At the step S62, the event generation section 32 takes a target identified by the target identification information tid of the 'create' event generated with the timing of the (t+1)th frame as an attention drawing target. Then, the event generation section 32 stores the representative coordinates of the attention drawing target and the ID of the attention drawing target in the storage section 33 by associating the representative coordinates and the target ID with each other.

If the determination result produced in the process carried out at the step S61 indicates that a 'create' event has not been generated with the timing of the (t+1)th frame, on the other hand, the flow of the projection recognition processing represented by this flowchart goes on directly to a step S63, skipping the process of the step S62. At the step S63, the event generation section 32 produces a result of determination as to whether or not a 'delete' event has been generated for the attention drawing target. If the determination result produced in the process carried out at the step S63 indicates that a 'delete' event has not been generated for the attention drawing target, the event generation section 32 ends the execution of the projection recognition processing represented by this flowchart.

If the determination result produced in the process carried out at the step S63 indicates that a 'delete' event has been generated for the attention drawing target, on the other hand, the flow of the projection recognition processing represented by this flowchart goes on to a step S64. At the step S64, the event generation section 32 reads out the representative coordinates associated with the ID of the attention drawing target for the start frame from the storage section 33. In addition, the event generation section 32 also reads out the representative coordinates associated with the ID of the attention drawing target for the (t+1)th frame from the storage section 33. Then, the event generation section 32 finds the displacement distance d of the attention drawing target and the projection angle α of the attention drawing target from the representative coordinates associated with the ID of the attention drawing target for the start frame and the representative coordinates associated with the ID of the attention drawing target for the (t+1)th frame.

Subsequently, at the next step S65, the event generation section 32 produces a result of determination as to whether or not the displacement distance d by which the attention drawing target has been displaced is at least equal to a predetermined threshold value. If the determination result produced in the process carried out at the step S65 indicates that the displacement distance d by which the attention drawing target has been displaced is at least equal to the predetermined threshold value, the flow of the projection recognition processing represented by this flowchart goes on to a step S66. At the step S66, the event generation section 32 generates a 'project' event with event attributes including additional (or extra) information having the displacement distance d of the attention drawing target and the projection angle α of the attention drawing target, which have been found in the process carried out at the step S64. At the same time, at the step S66, the event generation section 32 deletes the representative coordinates associated with the ID of the attention drawing target for the start frame and the representative coordinates associated with the ID of the attention drawing target on the start and (t+1)th frames and the IDs of the attention drawing targets from the storage section 33 in order to prevent the storage area of the storage section 33 from being wasted unnecessarily. As described above, the representative coordinates associated with the ID of the attention drawing target for the (t+1)th frame have been stored in the storage section 33 in the process carried out at the step S62. Finally, the event generation section 32 ends the execution of the projection recognition processing represented by this flowchart.

If the determination result produced in the process carried out at the step S65 indicates that the displacement distance d by which the attention drawing target has been displaced is shorter than the threshold value, on the other hand, the event generation section 32 ends the execution of the projection recognition processing represented by this flowchart without carrying out the process of the step S66.

By determining whether or not the displacement distance d by which the attention drawing target has been displaced is at least equal to a predetermined threshold value, it is possible to prevent a 'project' event from being generated by mistake in case a displacement distance d is shorter than the predetermined threshold value.

By carrying out the projection recognition processing as described above, it is possible to recognize projection and generate a 'project' event for the recognized projection. In this case, the projection is a movement made by an attention drawing target during a period of time between the appearance of the start frame and the appearance of the (t+1)th frame by a displacement distance at least equal to a predetermined threshold value.

Next, let us assume for example that the user starts an operation to bring two fingers thereof into contact with the surface of the display screen and, then, while sustaining the two fingers in the state of being in contact with the surface of the display screen thereafter, the user moves the two fingers over the surface of the display screen in order to increase or decrease the distance between the fingers before removing the fingers from the surface. In this case, the event generation section 32 takes the distance between the two fingers brought into contact with the surface of the display screen at the beginning of the operation to bring the two fingers into contact with the surface as a reference. Then, the event generation section 32 compares a distance extension rate based on the reference with a predetermined threshold value. If the extension rate is found to be at least equal to the threshold value, the event generation section 32 generates an 'extend' event. By the same token, the event generation section 32 compares a distance reduction rate based on the reference with another predetermined threshold value. If the reduction rate is found to be equal to or smaller than the other threshold value, the event generation section 32 generates a 'reduce' event.

Figure 14:
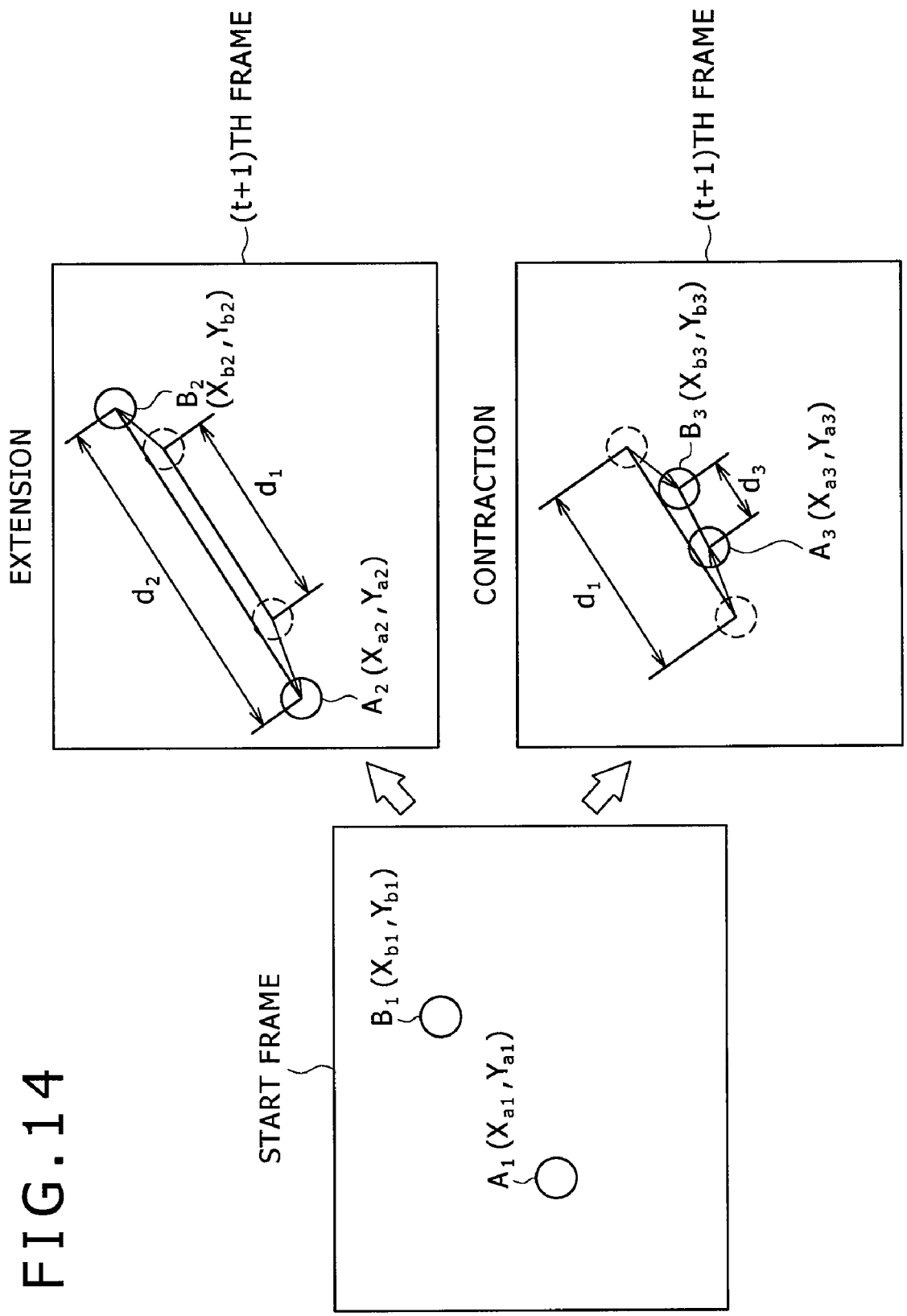
FIG. 14 is an explanatory diagram to be referred to in description of processing carried out in order to recognize extension and reduction.

By referring to FIG. 14, the following description explains recognition processing carried out by the event generation section 32 in order to generate an 'extend' or 'reduce' event.

A technical term 'start frame' used in the following description is a frame observed at the beginning of the operation carried out by the user to bring two fingers thereof into contact with the surface of the display screen. On the other hand, a frame with an appearance timing coinciding with generation of the 'extend' or 'reduce' event is referred to as the (t+1)th frame.

A diagram on the left-hand side of the figure shows two targets on the start frame. An upper diagram on the right-hand side of the figure shows two targets existing on the (t+1)th frame as targets resulting from an operation to increase the distance between the two targets on the start frame. On the other hand, a lower diagram on the right-hand side of the figure shows two targets existing on the (t+1)th frame as targets resulting from an operation to reduce the distance between the two targets on the start frame.

The diagram on the left-hand side of the figure and the upper diagram on the right-hand side of FIG. 14 show a case in which the user starts an operation to bring two fingers thereof into contact with respectively positions A1 and B1 on the surface of the display screen with the timing of the start frame appearing on the surface of the display screen of the input/output display 22. Then, the diagrams further show that, while sustaining the two fingers in the state of being in contact with the surface of the display screen thereafter, the user moves the two fingers over the surface of the display screen to respectively positions A2 and B2 on the (t+1)th frame appearing on the surface in order to increase the distance between the fingers before removing the fingers from the surface.

Let coordinates (Xa1, Ya1) and (Xb1, Yb1) be the coordinates of the positions A1 and B1 respectively, that is, the representative coordinates of the two targets on the start frame, which is a frame observed at the beginning of the operation carried out by the user to bring the two fingers thereof into contact with respectively the positions A1 and B1 on the surface of the display screen. By the same token, let coordinates (Xa2, Ya2) and (Xb2, Yb2) be the coordinates of the positions A2 and B2 respectively, that is, the representative coordinates of the two targets on the (t+1)th frame, which is a frame observed when the user carries out an operation to remove the two fingers from the surface of the display screen. In this case, the event generation section 32 takes the distance d1 between the positions A1 and B1 as a reference and computes an extension rate E ($=d2/d1$) based on the reference distance d1 where notation d2 denotes the distance between the positions A2 and B2. By the way, the distance d1 between the positions A1 and B1 is expressed by the following equation:

$$d1=\sqrt{[(Xb1-Xa1)2+(Yb1-Ya1)2]}$$

By the same token, the distance d2 between the positions A2 and B2 is expressed by the following equation:

$$d2=\sqrt{[(Xb2-Xa2)2+(Yb2-Ya2)2]}$$

If the extension rate E of the distance between the two targets is at least equal to a predetermined threshold value, an 'extend' event is generated.

The diagram on the left-hand side of the figure and the lower diagram on the right-hand side of FIG. 14 shows a case in which the user starts an operation to bring two fingers thereof into contact with respectively the positions A1 and B1 on the surface of the display screen for the start frame appearing on the surface of the display screen of the input/output display 22 and, then, while sustaining the two fingers in the state of being in contact with the surface of the display screen thereafter, the user moves the two fingers over the surface of the display screen to respectively positions A3 and B3 on the (t+1)th frame appearing on the surface in order to decrease the distance between the fingers before removing the fingers from the surface.

As described above, the coordinates (Xa1, Ya1) and (Xb1, Yb1) are the coordinates of the positions A1 and B1 respectively, that is, the representative coordinates of the two targets on the start frame, which is a frame observed at the beginning of the operation carried out by the user to bring the two fingers thereof into contact with respectively the positions A1 and B1 on the surface of the display screen. By the same token, let coordinates (Xa3, Ya3) and (Xb3, Yb3) be the coordinates of the positions A3 and B3 respectively, that is, the representative coordinates of the two targets on the (t+1)th frame, which is a frame observed when the user carries out an operation to remove the two fingers from the surface of the display screen. In this case, in the same way, the event generation section 32 takes the distance d1 between the positions A1 and B1 as a reference and computes a reduction rate R ($=d3/d1$) based on the reference distance d1 where notation d3 denotes the distance between the positions A3 and B3. By the way, as described above, the distance d1 between the positions A1 and B1 is expressed by the following equation:

$$d1=\sqrt{[(Xb1-Xa1)2+(Yb1-Ya1)2]}$$

By the same token, the distance d3 between the positions A3 and B3 is expressed by the following equation:

$$d3=\sqrt{[(Xb3-Xa3)2+(Yb3-Ya3)2]}$$

If the reduction rate R of the distance between the two targets is equal to or smaller than another predetermined threshold value, a 'reduce' event is generated.

It is to be noted that, as described above, the extension rate E is a quotient obtained by dividing the distance d2 between the two targets at the positions A2 and B2 on the (t+1)th frame by the distance d1 between the two targets at the positions A1 and B1 on the start frame. On the other hand, the reduction rate R is a quotient obtained by dividing the distance d3 between the two targets at the positions A3 and B3 on the (t+1)th frame by the distance d1 between the two targets at the positions A1 and B1 on the start frame.

The 'extend' and 'reduce' events each have attributes including an event ID, an event type, target identification information tid and additional information also referred to as extra information. An example of the extra information of the event is the coordinates (Xa1, Ya1) and (Xb1, Yb1) of the two targets on the start frame. The coordinates (Xa1, Ya1) and (Xb1, Yb1) of the two targets on the start frame are the representative coordinates of the two targets, the state of which is represented by the event.

Figure 15:
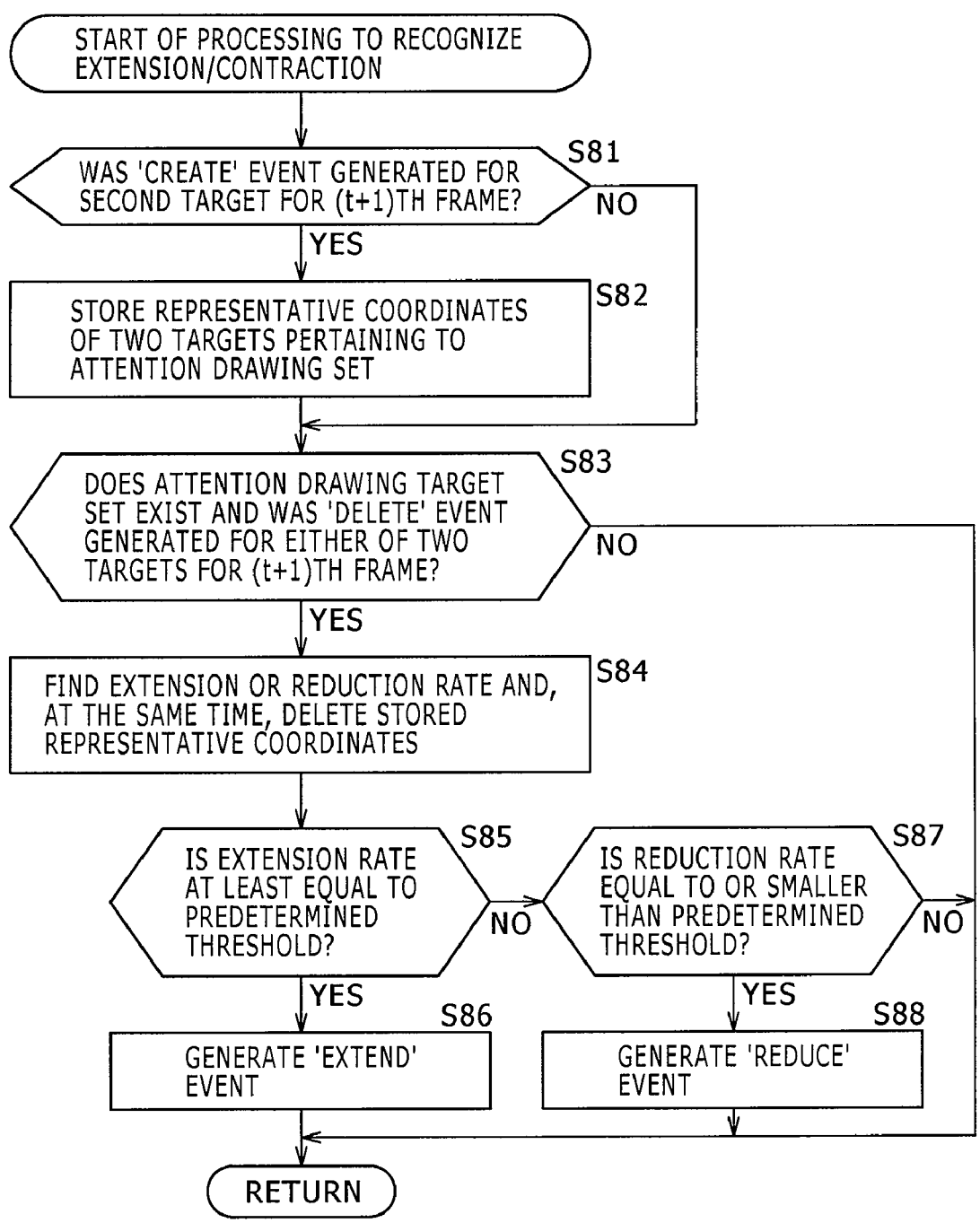
FIG. 15 shows a flowchart to be referred to in description of processing carried out at the step S5 of the flowchart shown in FIG. 2 in order to recognize extension and reduction.

By referring to a flowchart shown in FIG. 15, the following description explains processing carried out by the event generation section 32 of the generation section 25 employed in the display system 1 shown in FIG. 1 at the step S5 of the flowchart shown in FIG. 2 in order to recognize extension of the distance between two targets as well as reduction of the distance between two targets and generate an 'extend' event representing the recognized extension of the distance between the two targets as well as a 'reduce' event representing the recognized reduction of the distance between the two targets.

It is to be noted that, since the processing carried out in order to recognize a change of the state of the distance between two targets (that is, processing carried out in order to recognize whether the change of the state of the distance between the two targets is caused by extension or reduction of the distance) is carried out after an integration process, at the start of the processing, information on targets on the start frame and information on events for the targets as well as information on targets on the (t+1)th frame appearing after the integration process and information on events for the targets are already in a state of being usable.

As shown in FIG. 15, the flowchart begins with a step S81 at which the event generation section 32 produces a result of determination as to whether or not a 'create' event has been generated for the second target on the (t+1)th frame. If the determination result produced in the process carried out at the step S81 indicates that a 'create' event has been generated for the second target on the (t+1)th frame, the flow of the target-distance extension/reduction recognition processing represented by this flowchart goes on to a step S82. At the step S82, the event generation section 32 takes the first and second targets on the (t+1)th frame as an attention drawing set and stores the representative coordinates of the two targets as well as the target IDs of the two targets in the storage section 33 by associating the representative coordinates and their respective target IDs with each other.

If the determination result produced in the process carried out at the step S81 indicates that a 'create' event has not been generated for the second target on the (t+1)th frame, a 'create' event has been generated for a target other than the second target on the (t+1)th frame or a 'create' event has not been generated at all for the (t+1)th frame, on the other hand, the flow of the target-distance extension/reduction recognition processing represented by this flowchart goes on directly to a step S83 by skipping the process of the step S82.

At the step S83, the event generation section 32 produces a result of determination as to whether or not the two targets pertaining to the attention drawing set exist on the start frame and a 'delete' event has been generated for either of the two targets with the timing of the (t+1)th frame.

If the determination result produced in the process carried out at the step S83 indicates that the two targets pertaining to the attention drawing set exist on the start frame and a 'delete' event has been generated for either of the two targets with the timing of the (t+1)th frame, the flow of the target-distance extension/reduction recognition processing represented by this flowchart goes on to a step S84. At the step S84, the event generation section 32 reads out representative coordinates associated with the target IDs as the representative coordinates of the two targets pertaining to the attention drawing set on the start frame as well as the representative coordinates associated with the target IDs as the representative coordinates of the two targets pertaining to the attention drawing set on the (t+1)th frame from the storage section 33. Then, the event generation section 32 finds a change rate, which can be an extension rate E or a reduction rate R, from the representative coordinates of the two targets pertaining to the attention drawing set for the start and (t+1)th frames. In addition, the event generation section 32 deletes the representative coordinates of the two targets pertaining to the attention drawing sets on the start and (t+1)th frames and the IDs of the two targets from the storage section 33 in order to prevent the storage area of the storage section 33 from being wasted unnecessarily.

If the determination result produced in the process carried out at the step S83 indicates that the two targets pertaining to the attention drawing set do not exist on the start frame or a 'delete' event has not been generated for either of the two targets with the timing of the (t+1)th frame even though the two targets pertaining to the attention drawing set exist on the start frame, on the other hand, the event generation section 32 ends the execution of the target-distance extension/reduction recognition processing represented by this flowchart without carrying out the processes of the steps S84 to S88.

Then, at a step S85 following the step S84, the event generation section 32 produces a result of determination as to whether or not the change rate found in the process carried out at the step S84 as the extension rate E of the two targets pertaining to the attention drawing set is at least equal to a predetermined threshold value. If the determination result produced in the process carried out at the step S85 indicates that the change rate found in the process carried out at the step S84 as the extension rate E of the two targets pertaining to the attention drawing set is at least equal to the predetermined threshold value, the flow of the target-distance extension/reduction recognition processing represented by this flowchart goes on to a step S86. At the step S86, the event generation section 32 generates an 'extend' event having extra information including the change rate E found in the process carried out at the step S84 as the extension rate E of the two targets pertaining to the attention drawing set and the representative coordinates of the two targets pertaining to the attention drawing set on the start frame as start coordinates. Finally, the event generation section 32 ends the execution of the target-distance extension/reduction recognition processing represented by this flowchart.

If the determination result produced in the process carried out at the step S85 indicates that the change rate found in the process carried out at the step S84 as the extension rate E of the two targets pertaining to the attention drawing set is smaller than the predetermined threshold value, on the other hand, the flow of the target-distance extension/reduction recognition processing represented by this flowchart goes on to a step S87. At the step S87, the event generation section 32 produces a result of determination as to whether or not the change rate found in the process carried out at the step S84 as the contraction rate R of the two targets pertaining to the attention drawing set is equal to or smaller than another predetermined threshold value. If the determination result produced in the process carried out at the step S85 indicates that the change rate found in the process carried out at the step S84 as the contraction rate R of the two targets pertaining to the attention drawing set is equal to or smaller than the other predetermined threshold value, the flow of the target-distance extension/reduction recognition processing represented by this flowchart goes on to a step S88. At the step S88, the event generation section 32 generates a 'contract' event having extra information including the change rate found in the process carried out at the step S84 as the contraction rate R of the two targets pertaining to the attention drawing set and the representative coordinates of the two targets pertaining to the attention drawing set on the start frame as start coordinates. Finally, the event generation section 32 ends the execution of the target-distance extension/reduction recognition processing represented by this flowchart.

If the determination result produced in the process carried out at the step S87 indicates that the contraction rate R is greater than the other predetermined threshold value, on the other hand, the event generation section 32 ends the execution of the target-distance extension/reduction recognition processing without carrying out the process of the step S88.

The event generation section 32 generates an 'extend' event only if the extension rate E computed for the distance between the two targets on the (t+1)th frame by taking the distance between the two targets on the start frame as a reference is found at least equal to a predetermined threshold value as described above in order to prevent an 'extend' event from being generated by mistake in case an extension rate E is found smaller than the predetermined threshold value. By the same token, the event generation section 32 generates a 'contract' event only if the reduction rate R computed for the distance between the two targets on the (t+1)th frame by taking the distance between the two targets on the start frame as a reference is found equal to or smaller than another predetermined threshold value as described above in order to prevent a 'contract' event from being generated by mistake in case a reduction rate R is found greater than the other predetermined threshold value.

By carrying out the target-distance extension/reduction recognition processing as described above, it is possible to detect a case in which the extension rate E computed for the distance between the two targets on the (t+1)th frame by taking the distance between the two targets on the start frame as a reference is at least equal to a predetermined threshold value. In this case, the event generation section 32 generates an 'extend' event indicating that the distance between the two targets has increased. By the same token, it is possible to detect a case in which the reduction rate R computed for the distance between the two targets on the (t+1)th frame by taking the distance between the two targets on the start frame as a reference is equal to or smaller than another predetermined threshold value. In this case, the event generation section 32 generates a 'contract' event indicating that the distance between the two targets has decreased.

Figure 16:
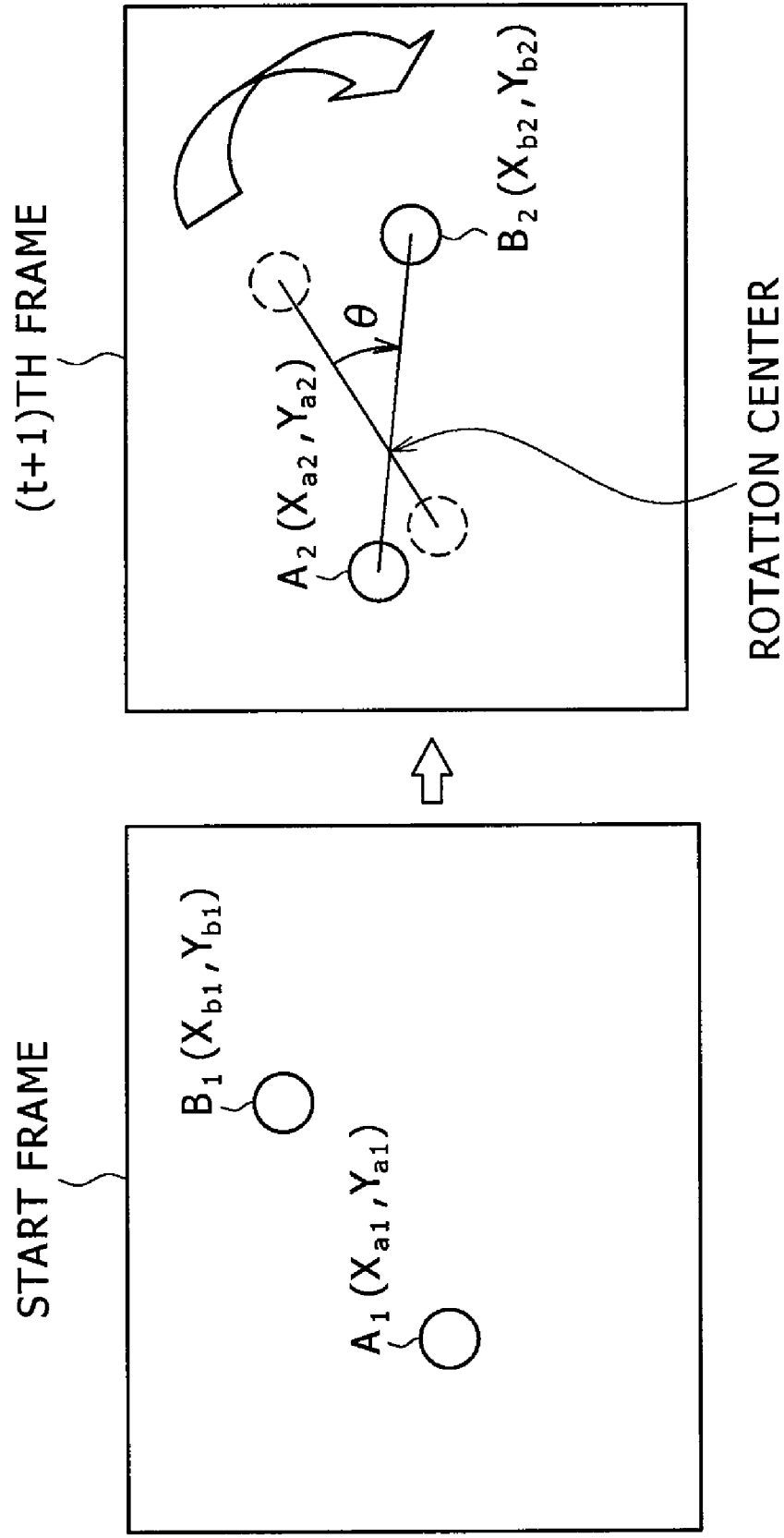
FIG. 16 is an explanatory diagram to be referred to in description of processing carried out in order to recognize rotation of a straight line connecting two fingers.

Next, let us assume for example a case in which the user starts an operation to bring two fingers thereof into contact with respectively two positions on the surface of the display screen of the input/output display 22 and, then, while sustaining the two fingers in the state of being in contact with the surface of the display screen thereafter, the user moves the two fingers over the surface of the display screen in order to draw two concentric circles on the surface in such a way that the center common to the concentric circles coincides with a point on the surface as shown in a diagram on the right-hand side of FIG. 16 before removing the fingers from the surface. As shown in the diagram, a straight line connecting the two positions each shown as a dashed-line circle on the surface of the display screen shown in the start frame observed at the beginning of the operation forms a rotation angle θ in conjunction with a straight line connecting the two positions each shown as a solid-line circle on the surface of the display screen shown in the (t+1)th frame observed at the end of the operation. If the absolute value of the rotation angle θ is at least equal to a predetermined threshold value, a 'rotate' event is generated.

By referring to FIG. 16, the following description explains processing to recognize rotation of a straight line connecting two fingers and generate a 'rotate' event for the recognized rotation.

A frame with an appearance timing coinciding with the start of an operation to bring two fingers thereof into contact with the surface of the display screen is referred to as the start frame cited above. On the other hand, a frame with an appearance timing coinciding with generation of the 'rotate' event is referred to as the (t+1)th frame.

A diagram on the left-hand side of FIG. 16 shows two targets at two positions on the start frame whereas a diagram on the right-hand side of FIG. 16 shows two targets at two positions on the (t+1)th frame as two solid-line circles and the two targets at the two positions on the start frame as two dashed-line circles. As shown in the diagram on the right hand side, the straight line connecting the two targets at the two positions on the start frame forms a rotation angle θ in conjunction with the straight line connecting the two targets at the two positions on the (t+1)th frame as a result of rotating the connection line in the clockwise direction.

The diagrams on the left-hand side and right-hand sides of FIG. 16 show a state in which the user starts an operation to bring two fingers thereof into contact with respectively two positions A1 and B1 on the start frame appearing on the surface of the display screen of the input/output display 22 and, then, while sustaining the two fingers in the state of being in contact with the surface of the display screen thereafter, the user moves the two fingers over the surface of the display screen to respectively positions A2 and B2 on the (t+1)th frame appearing on the surface, drawing two concentric circles on the surface in such a way that the center common to the concentric circles coincides with a point on the surface before removing the fingers from the surface.

Let coordinates (Xa1, Ya1) and (Xb1, Yb1) be the coordinates of the positions A1 and B1 respectively, that is, the representative coordinates of the two targets on the start frame, which is a frame observed at the beginning of the operation carried out by the user to bring two fingers thereof into contact with respectively the positions A1 and B1 on the surface of the display screen. By the same token, let coordinates (Xa2, Ya2) and (Xb2, Yb2) be the coordinates of the positions A2 and B2 respectively, that is, the representative coordinates of the two targets on the (t+1)th frame, which is a frame observed when the user carries out an operation to remove the two fingers from the surface of the display screen. The straight line connecting the two targets at the two positions A1 and B1 on the start frame forms a rotation angle θ in conjunction with the straight line connecting the two targets at the two positions A2 and B2 on the (t+1)th frame. The rotation angle θ is the gradient angle of the straight line connecting the two targets at the two positions A2 and B2 on the (t+1)th frame with respect to the straight line connecting the two targets at the two positions A1 and B1 on the start frame. Thus, the rotation angle θ can be found by subtracting the gradient angle of the straight line connecting the two targets at the two positions A2 and B2 on the (t+1)th frame from the gradient angle of the straight line connecting the two targets at the two positions A1 and B1 on the start frame in accordance with Eq. (1) as follows.

$$\theta = a\tan2(Yb1-Ya1, Xb1-Xa1) - a\tan2(Yb2-Ya2, Xb2-Xa2) \quad (1)$$

In the above equation, the expression a tan 2 (Yb2−Ya2, Xb2−Xa2) represents the gradient angle of the straight line connecting the two targets at the two positions A2 and B2 on the (t+1)th frame as a gradient angle relative to a horizontal line whereas the expression a tan 2 (Yb1−Ya1, Xb1−Xa1) represents the gradient angle of the straight line connecting the two targets at the two positions A1 and B1 on the start frame as a gradient angle relative to the horizontal line.

If the absolute value of the rotation angle θ formed by the straight line connecting the two targets at the two positions A1 and B1 on the start frame in conjunction with the straight line connecting the two targets at the two positions A2 and B2 on the (t+1)th frame is at least equal to a predetermined threshold value, a 'rotate' event is generated.

It is to be noted that the 'rotate' event is an event with an event type of 'rotate' indicating that rotation has been recognized.

The 'rotate' event has event attributes including an event ID, an event type, target identification information tid and additional information also referred to as extra information. Examples of the extra information of the 'rotate' event are the rotation angle θ and the coordinates of the center of the rotation.

FIG. 17 is an explanatory diagram showing typical information on targets and events. These pieces of information are output by the generation section 25 when a 'rotate' event is generated.

As shown in FIG. 17, the information on targets and events is described by making use of an XML (Extensible Markup Language).

As shown in FIG. 17, the second line of the information on targets and events shows frameNumber representing the number of the (t+1)th frame, numOfTargets representing the number of targets on the (t+1)th frame and numOfEvents representing the number of events generated with the timing of the (t+1)th frame. The number of the (t+1)th frame is actually a time at which the generation section 25 outputs the information on targets and events. In the information on targets and events, the number of the (t+1)th frame is 22, the number of targets on the (t+1)th frame is 2 and the number of events generated with the timing of the (t+1)th frame is 1.

The fourth and seventh lines from the top line each show the attributes of one of the two targets on the (t+1)th frame, which is a frame identified by the frame number of 22. The attributes of a target include a target ID (tid), a frame number (ft), the representative coordinates of the target on the (t+1)th frame, the area (a) of the target and information on a region. The target ID (tid) is information used for identifying the target. The frame number (ft) is the number of a frame, which is observed when the operation to enter an input to an input portion integrated with the target is started. That is to say, the frame number (ft) is the number of a frame, which is observed when the target is created. The representative coordinates of the target consists of an x coordinate (x) and a y coordinate (y). The information on a region is the coordinates of the top, bottom, left-hand and right-hand sides of a smallest-area rectangle enclosing the target. In the information on targets and events, the coordinates of the top side are denoted by notation rt, the coordinates of the bottom side are denoted by notation rb, the coordinates of the left-hand side are denoted by notation rl and the coordinates of the right-hand side are denoted by notation rr. In the target attributes shown on the fourth line, the target ID (tid) is 0, the frame number (ft) is 1, the representative coordinates of the target on the (t+1)th frame is x=10 and y=20, the area (a) of the target is 100 whereas the information on a region is rt=5, rb=25, rl=5 and rr=15. On the other hand, in the target attributes shown on the seventh line, the target ID (tid) is 1, the frame number (ft) is 2, the representative coordinates of the target on the (t+1)th frame is x=30 and y=40, the area (a) of the target is 200 whereas the information on a region is rt=30, rb=50, rl=25 and rr=35.

The tenth to fifteenth lines from the top line each show the attributes of an event created with the timing of the (t+1)th frame, which is a frame identified by the frame number of 22.

The tenth line from the top line shows the attributes of event #1, which is an event identified by an event ID (eid) of 1.

To put it in detail, the attributes of the event include the event ID (eid), a frame number (fn), an event type, a target count (numOfID) and an extra-information count (numOfValue), which are arranged from the left to the right on the tenth line. The frame number (fn) is the number of a frame for which the event is generated. The event type is the type of the event. The target count (numOfID) is the number of targets, the states of which are represented by the event. The extra-information count (numOfValue) is the number of pieces of extra information. On the tenth line, as an example, the event ID (eid) is 1, the frame number (fn) is 22, the event type is 'rotate', the target count (numOfID) is 2 and the extra-information count (numOfValue) is 3.

It is to be noted that, by including the frame number (fn) in the attributes of an event as the number of a frame for which the event is generated, the event can be searched for more easily.

The eleventh and twelfth lines from the top line each show target identification information (tid) used for identifying targets, the states of which are represented by event #1. As an example, the eleventh and twelfth lines show target identification information (tid) of 0 and 1 respectively.

Event #1 is a 'rotate' event having pieces of extra information described respectively on the thirteenth, fourteenth and fifteenth lines from the top line. The extra information described on the thirteenth line is the x coordinate of the rotation center. The extra information described on the fourteenth line is the y coordinate of the rotation center. The extra information described on the fifteenth line is a rotation angle $\theta$. As an example, the x coordinate, the y coordinate and rotation angle $\theta$ are 20, 30 and 20 respectively.

In the example shown in FIG. 17, the information on targets and events includes information on only one event, that is, event #1. It is to be noted, however, that the information on targets and events generally includes information on a plurality of events.

Figure 18:
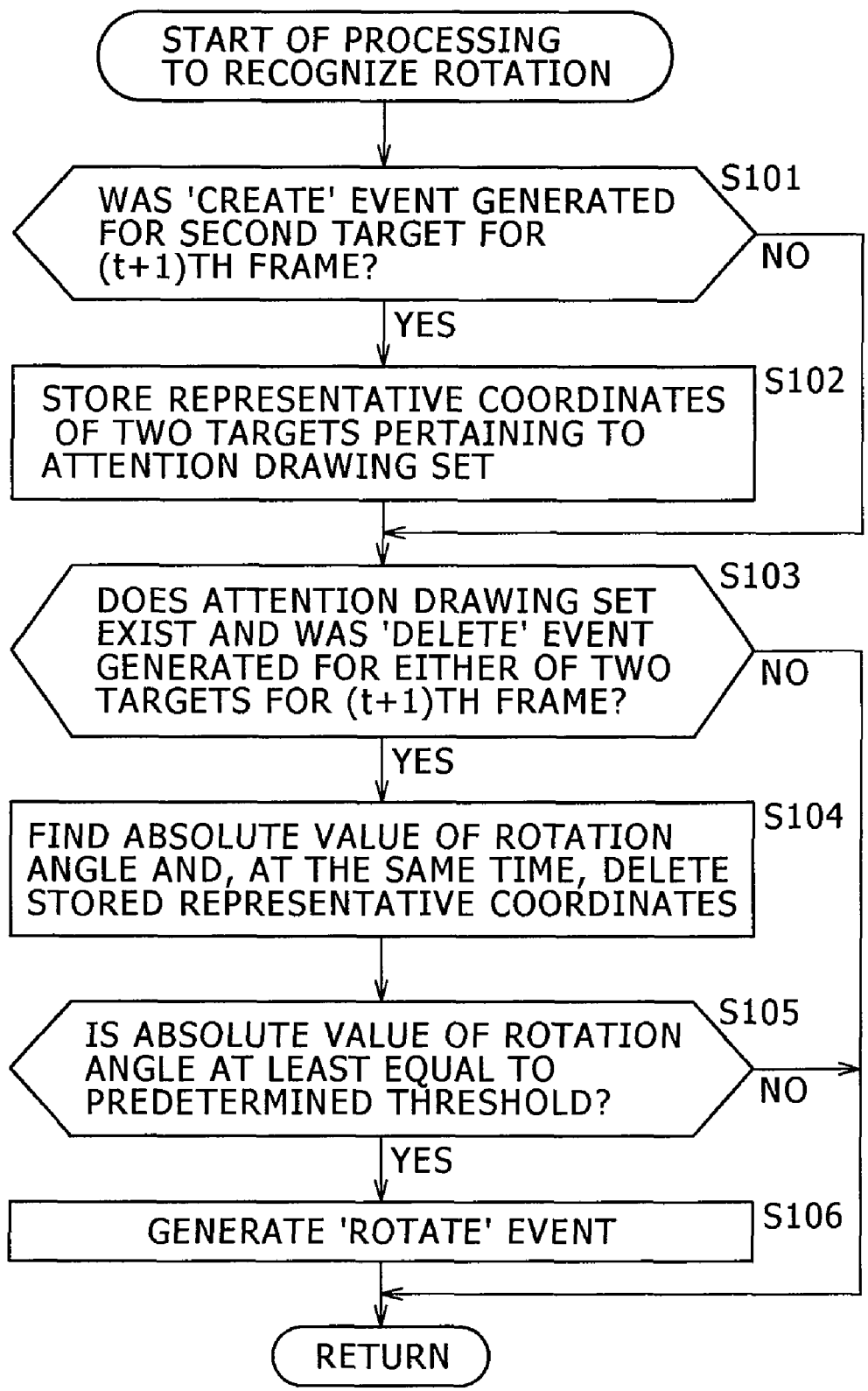
FIG. 18 shows a flowchart to be referred to in description of processing carried out at the step S5 of the flowchart shown in FIG. 2 in order to recognize rotation.

By referring to a flowchart shown in FIG. 18, the following description explains processing carried out by the event generation section 32 of the generation section 25 employed in the display system 1 shown in FIG. 1 at the step S5 of the flowchart shown in FIG. 2 in order to recognize rotation and generate a 'rotate' event indicating the recognized rotation.

It is to be noted that, since the processing carried out in order to recognize rotation and generate a 'rotate' event indicating the recognized rotation is carried out after an integration process, at the start of the processing, information on targets on the start frame and information on targets on the (t+1)th frame appearing after the integration process are already in a state of being usable.

As shown in FIG. 18, the flowchart begins with a step S101 at which the event generation section 32 produces a result of determination as to whether or not a 'create' event has been generated for a second target with the timing of the (t+1)th frame. If the determination result produced in the process carried out at the step S101 indicates that a 'create' event has been generated for a second target with the timing of the (t+1)th frame, the flow of the rotation recognition processing represented by this flowchart goes on to a step S102. At the step S102, the event generation section 32 takes a set of two targets on the (t+1)th frame as an attention drawing set and stores the representative coordinates of the two targets pertaining to the attention drawing set in the storage section 33 along with the target IDs of the two targets by associating the representative coordinates and their respective target IDs with each other.

If the determination result produced in the process carried out at the step S101 indicates that a 'create' event has been generated for a target other than the second target with the timing of the (t+1)th frame or a 'create' event has not been generated at all with the timing of the (t+1)th frame, on the other hand, the flow of the rotation recognition processing represented by this flowchart goes on directly to a step S103 by skipping the process of the step S102.

At the step S103, the event generation section 32 produces a result of determination as to whether or not the two targets pertaining to the attention drawing set exist on the start frame and a 'delete' event has been generated for either of the two targets pertaining to the attention drawing set with the timing of the (t+1)th frame.

If the determination result produced in the process carried out at the step S103 indicates that the two targets pertaining to the attention drawing set exist on the start frame and a 'delete' event has been generated for either of the two targets pertaining to the attention drawing set with the timing of the (t+1)th frame, the flow of the rotation recognition processing represented by this flowchart goes on to a step S104. At the step S104, the event generation section 32 reads out representative coordinates associated with the target IDs as the representative coordinates of the two targets pertaining to the attention drawing set on the start frame as well as representative coordinates associated with the target IDs as the representative coordinates of the two targets pertaining to the attention drawing set on the (t+1)th frame from the storage section 33. Then, the event generation section 32 finds the absolute value of a rotation angle $\theta$ for the two targets from the representative coordinates of the two targets pertaining to the attention drawing set on the start frame and the representative coordinates of the two targets pertaining to the attention drawing set on the (t+1)th frame in accordance with Eq. (1). In addition, the event generation section 32 deletes the representative coordinates of the two targets pertaining to the attention drawing set on the start and (t+1)th frames and the IDs of the two targets from the storage section 33 in order to prevent the storage area of the storage section 33 from being wasted unnecessarily.

If the determination result produced in the process carried out at the step S103 indicates that the two targets pertaining to the attention drawing set do not exist on the start frame or a 'delete' event has not been generated for either of the two targets pertaining to the attention drawing set with the timing of the (t+1)th frame, on the other hand, the event generation section 32 ends the execution of the rotation recognition processing represented by this flowchart without carrying out the processes of the steps S1104 to S1106.

At the step S105 following the step S104, the event generation section 32 produces a result of determination as to whether or not the absolute value found in the process carried out at the step S1104 as the absolute value of the rotation angle θ for the two targets pertaining to the attention drawing set is at least equal to a predetermined threshold value. If the determination result produced in the process carried out at the step S105 indicates that the absolute value found in the process carried out at the step S104 as the absolute value of the rotation angle θ for the two targets pertaining to the attention drawing set is at least equal to the predetermined threshold value, the flow of the rotation recognition processing represented by this flowchart goes on to a step S106. At the step S106, the event generation section 32 generates a 'rotate' event with extra information thereof including the rotation angle θ of the two targets pertaining to the attention drawing set and the coordinates of the center of the rotation made by the two targets. Finally, the event generation section 32 ends the execution of the rotation recognition processing represented by this flowchart.

If the determination result produced in the process carried out at the step S105 indicates that the absolute value found in the process carried out at the step S104 as the absolute value of the rotation angle θ for the two targets pertaining to the attention drawing set is smaller than the predetermined threshold value, on the other hand, the event generation section 32 ends the execution of the rotation recognition processing represented by this flowchart without carrying out the process of the step S106.

By producing a result of determination as to whether or not the absolute value of the rotation angle θ formed by a straight line connecting two targets pertaining to the attention drawing set on the start frame in conjunction with a straight line connecting two targets pertaining to the attention drawing set on the (t+1)th frame is at least equal to a predetermined threshold value as described above, it is possible to prevent a 'rotate' event from being generated by mistake in case the absolute value of a rotation angle θ is found smaller than the predetermined threshold value.

By carrying out of the rotation recognition processing as described above, it is possible to generate a 'rotate' event indicating that the absolute value of the rotation angle θ formed by a straight line connecting two targets pertaining to the attention drawing set on the start frame in conjunction with a straight line connecting two targets pertaining to the attention drawing set on the (t+1)th frame is at least equal to a predetermined threshold value.

Figure 19:
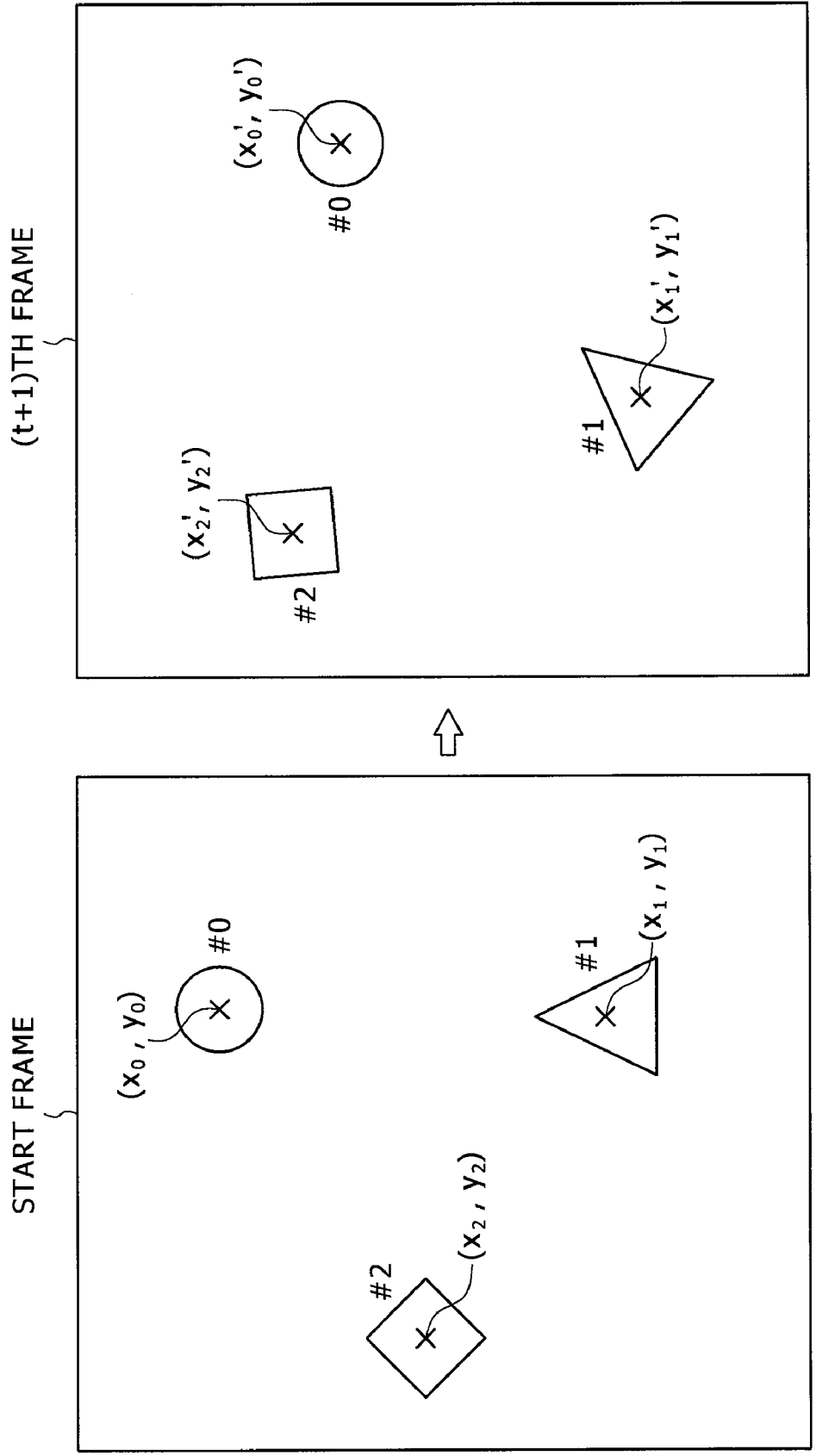
FIG. 19 is an explanatory diagram to be referred to in description of processing carried out in order to recognize 3-point rotation.

Next, let us assume for example a case in which the user starts an operation to bring three fingers thereof into contact with respectively three positions on the surface of the display screen of the input/output display 22 and, then, while sustaining the three fingers in the state of being in contact with the surface of the display screen thereafter, the user moves the three fingers over the surface of the display screen from the positions on a start frame shown in a diagram on the left-hand side of FIG. 19 as a frame appearing on the surface of the display screen at the beginning of the operation to positions on the (t+1)th frame shown in a diagram on the right-hand side of FIG. 19 as a frame appearing on the surface of the display screen at the operation end in which the user removes the three fingers from the surface. As shown in the figure, the three positions are represented by a rectangle, a triangle and a circle respectively. A straight line connecting the rectangular and triangular positions on the (t+1)th forms a first angle of rotation in conjunction with a straight line connecting the rectangular and triangular positions on the start frame. By the same token, a straight line connecting the triangular and circular positions on the t+1 frame forms a second angle of rotation in conjunction with a straight line connecting the triangular and circular positions on the start frame. In the same way, a straight line connecting the rectangular and circular positions on the t+1 frame forms a third angle of rotation in conjunction with a straight line connecting the rectangular and circular positions on the start frame. If the absolute value of the average of the first, second and third angles of rotation is at least equal to a predetermined threshold value, a '3-point rotate' event is generated.

By referring to FIGS. 19 to 22, the following description explains processing to recognize 3-point rotation and generate a '3-point rotate' event indicating the recognized 3-point rotation.

As described above, the start frame shown in the diagram on the left-hand side of FIG. 19 is a frame observed at the beginning of the operation carried out by the user to bring three fingers thereof into contact with respectively three positions on the surface of the display screen. On the other hand, a frame for which the '3-point rotate' event is generated is referred to as the (t+1)th frame.

As explained above, the diagram on the left-hand of FIG. 19 shows three targets represented by a rectangle, a triangle and a circle respectively on the start frame. On the other hand, the diagram on the right-hand side of FIG. 19 shows the three targets on the (t+1)th frame.

As shown in FIG. 19, the user starts an operation to bring three fingers thereof into contact with respectively three circular, triangular and rectangular positions having respectively representative coordinates of (x0, y0), (x1, y1) and (x2, y2) on the start frame appearing on the surface of the display screen of the input/output display 22 as shown in the diagram on left-hand side as a frame observed at the beginning of the operation and, while sustaining the three fingers in the state of being in contact with the surface of the display screen thereafter, the user moves the three fingers over the surface of the display screen from the positions on the start frame to three circular, triangular and rectangular positions having respectively representative coordinates of (x0', y0'), (x1', y1') and (x2', y2') on the (t+1)th frame appearing on the surface of the display screen as shown in the diagram on the right-hand side as a frame observed at the operation end in which the user removes the three fingers from the surface.

That is to say, when the user starts an operation to bring the three fingers thereof into contact with the surface of the display screen, targets #0, #1 and #2 exist at the triangular and rectangular positions having respectively representative coordinates of (x0, y0), (x1, y1) and (x2, y2) on the start frame and, when the user moves the three fingers from the surface, targets #0, #1 and #2 exist at the three circular, triangular and rectangular positions having respectively representative coordinates of (x0', y0'), (x1', y1') and (x2', y2') on the (t+1)th frame.

The event generation section 32 finds a first rotation angle formed by a straight line connecting target #0 to target #1 on the (t+1)th frame in conjunction with a straight line connecting target #0 to target #1 on the start frame. By the same token, the event generation section 32 finds another rotation angle formed by a straight line connecting target #1 to target #2 on the (t+1)th frame in conjunction with a straight line connecting target #1 to target #2 on the start frame. In the same way, the event generation section 32 finds a further rotation angle formed by a straight line connecting target #2 to target #0 on the (t+1)th frame in conjunction with a straight line connecting target #2 to target #0 on the start frame.

As described above, any two of the three targets form a set. To put it concretely, targets #0 and #1, targets #1 and #2 as well as targets #2 and #0 each form a set.

Figure 20:
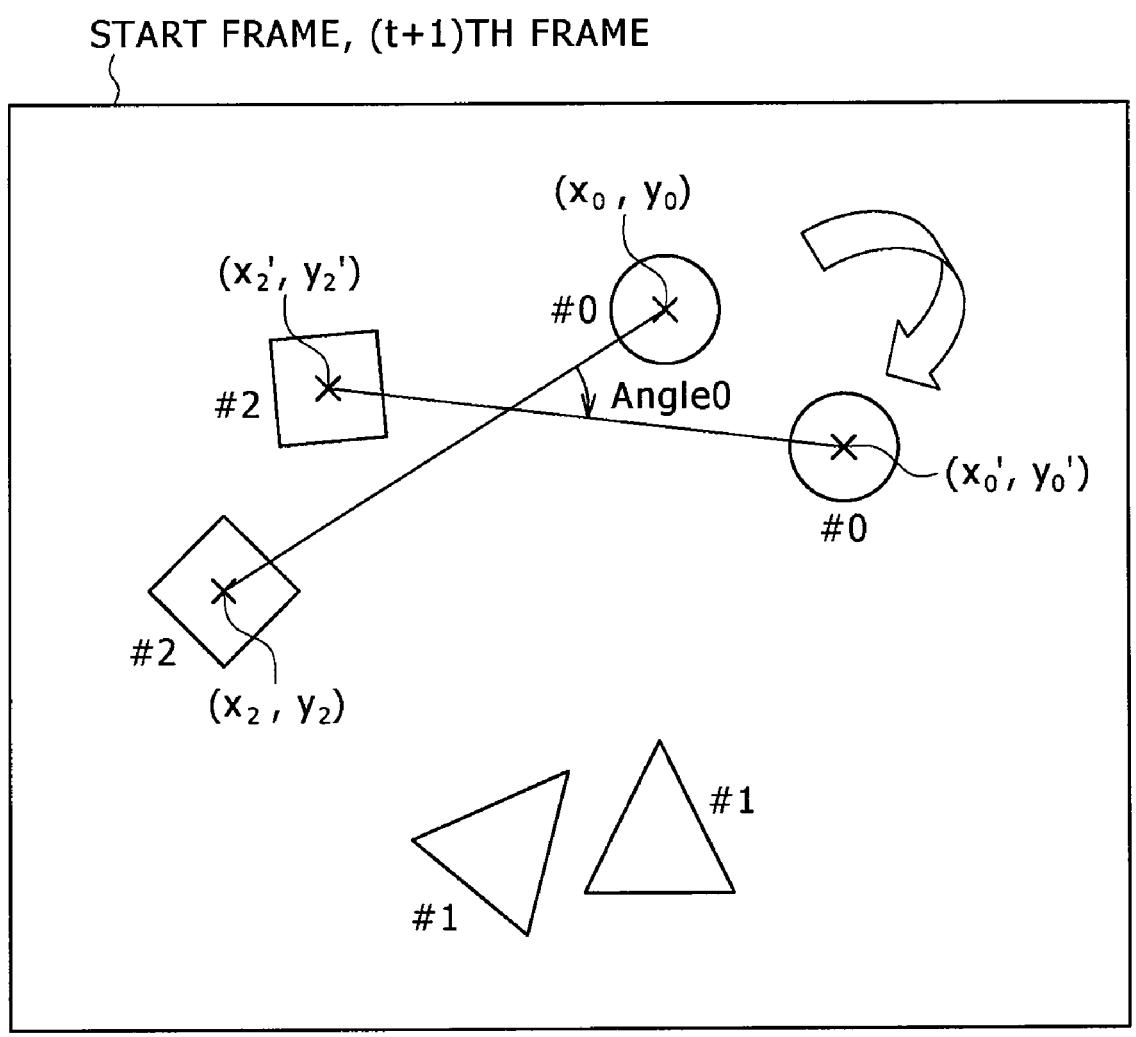
FIG. 20 is an explanatory diagram showing a state of superposing a (t+1)th frame on a start frame.

FIG. 20 is an explanatory diagram showing a state in which the (t+1)th frame is superposed on the start frame.

As shown in FIG. 20, a rotation angle Angle0 is formed by a straight line connecting target #2 to target #0 on the (t+1)th frame in conjunction with a straight line connecting target #2 to target #0 on the start frame. The rotation angle Angle0 is found by subtracting the gradient angle of the straight line connecting target #2 to target #0 on the start frame as a gradient angle relative to the horizontal line from the gradient angle of the straight line connecting the target #2 to target #0 on the (t+1)th frame as a gradient angle relative to the horizontal line in accordance with Eq. (2) as follows:

$$\text{Angle0}=a\tan 2(y0'-y2',x0'-x2')-a\tan 2(y0-y2,x0-x2) \quad (2)$$

Figure 21:
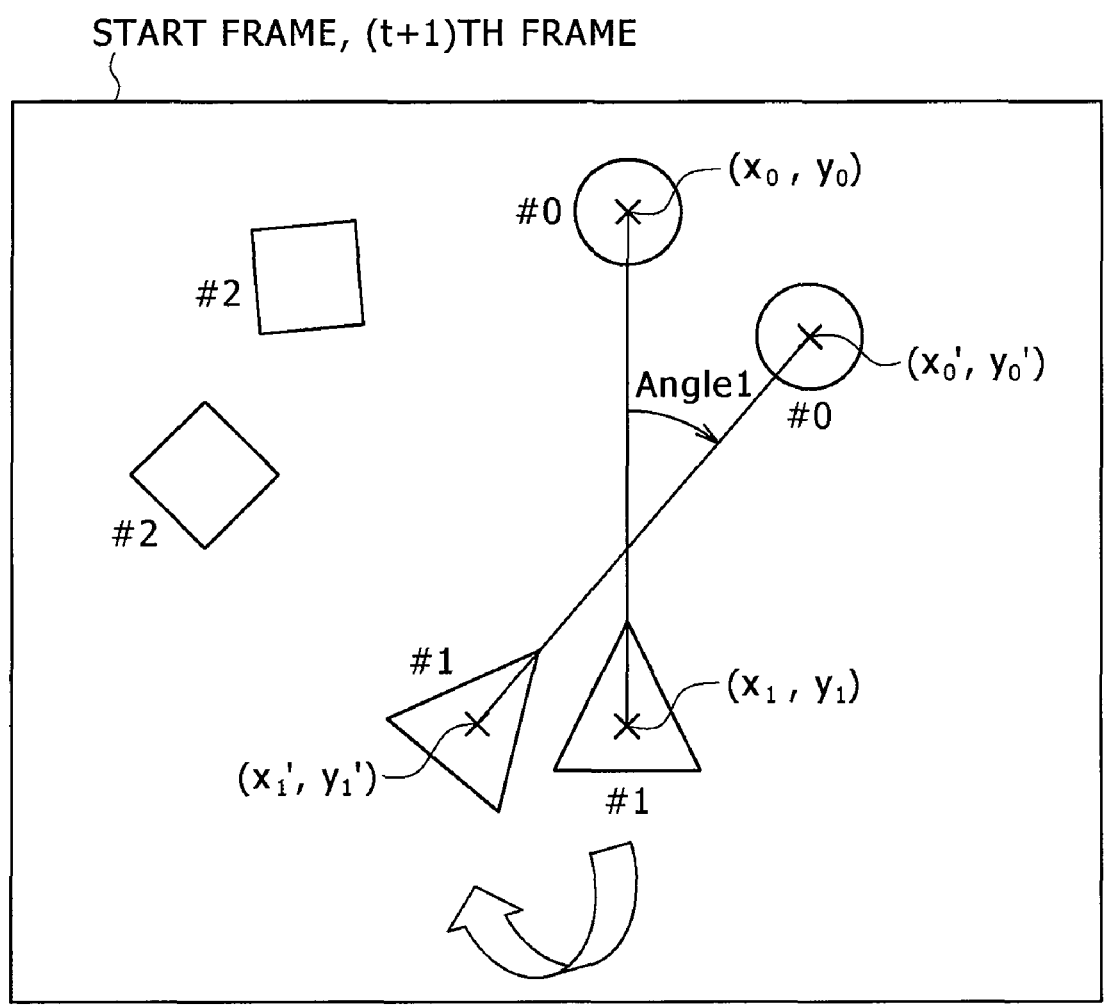
FIG. 21 is an explanatory diagram showing another state of superposing the (t+1)th frame on the start frame

FIG. 21 is an explanatory diagram showing another state in which the (t+1)th frame is superposed on the start frame.

As shown in FIG. 21, a rotation angle Angle1 is formed by a straight line connecting target #0 to target #1 on the (t+1)th frame in conjunction with a straight line connecting target #0 to target #1 on the start frame. The rotation angle Angle1 is found by subtracting the gradient angle of the straight line connecting target #0 to target #1 on the start frame as a gradient angle relative to the horizontal line from the gradient angle of the straight line connecting the target #0 to target #1 on the (t+1)th frame as a gradient angle relative to the horizontal line in accordance with Eq. (3) as follows:

$$\text{Angle1}=a\tan 2(y1'-y0',x1'-x0')-a\tan 2(y1-y0,x1-x0) \quad (3)$$

Figure 22:
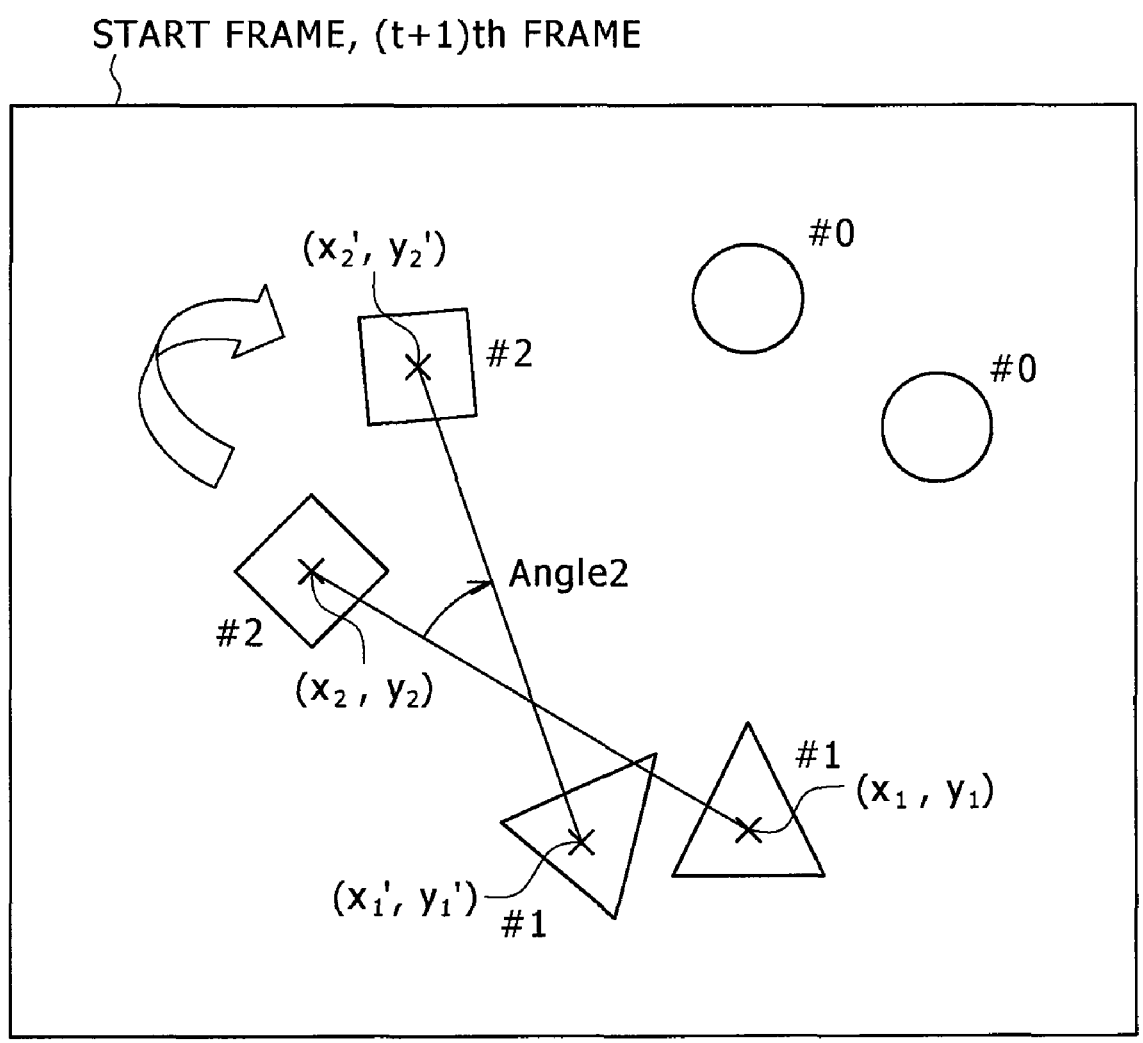
FIG. 22 is an explanatory diagram showing a further state of superposing the (t+1)th frame on the start frame.

FIG. 22 is an explanatory diagram showing a further state in which the (t+1)th frame is superposed on the start frame.

As shown in FIG. 22, a rotation angle Angle2 is formed by a straight line connecting target #1 to target #2 on the (t+1)th frame in conjunction with a straight line connecting target #1 to target #2 on the start frame. The rotation angle Angle2 is found by subtracting the gradient angle of the straight line connecting target #1 to target #2 on the start frame as a gradient angle relative to the horizontal line from the gradient angle of the straight line connecting the target #1 to target #2 on the (t+1)th frame as a gradient angle relative to the horizontal line in accordance with Eq. (4) as follows:

$$\text{Angle2}=a\tan 2(y2'-y1',x2-x1')-a\tan 2(y2-y1,x2-x1) \quad (4)$$

An angle of rotation for three targets #0, #1 and #2 is defined as an average rotation angle of the rotation angle Angle0 found for the set consisting of targets #2 and #0, the rotation angle Angle1 found for the set consisting of targets #0 and #1 and the rotation angle Angle2 found for the set consisting of targets #1 and #2. The angle of rotation for three targets #0, #1 and #2 is thus found in accordance with Eq. (5) as follows:

$$\text{Angle}=(\text{Angle0}+\text{Angle1}+\text{Angle2})/3 \quad (5)$$

If the absolute value of the average of the rotation angles Angle0, Angle1 and Angle2 is at least equal to a predetermined threshold value, a '3-point rotate' event is generated.

The '3-point rotate' event is an event having attributes including extra information in addition to an event ID, an event type and the target identification information tid. The extra information includes the average rotation angle of the rotation angles for three targets on the start frame and the three targets on the (t+1)th frame.

Figure 23:
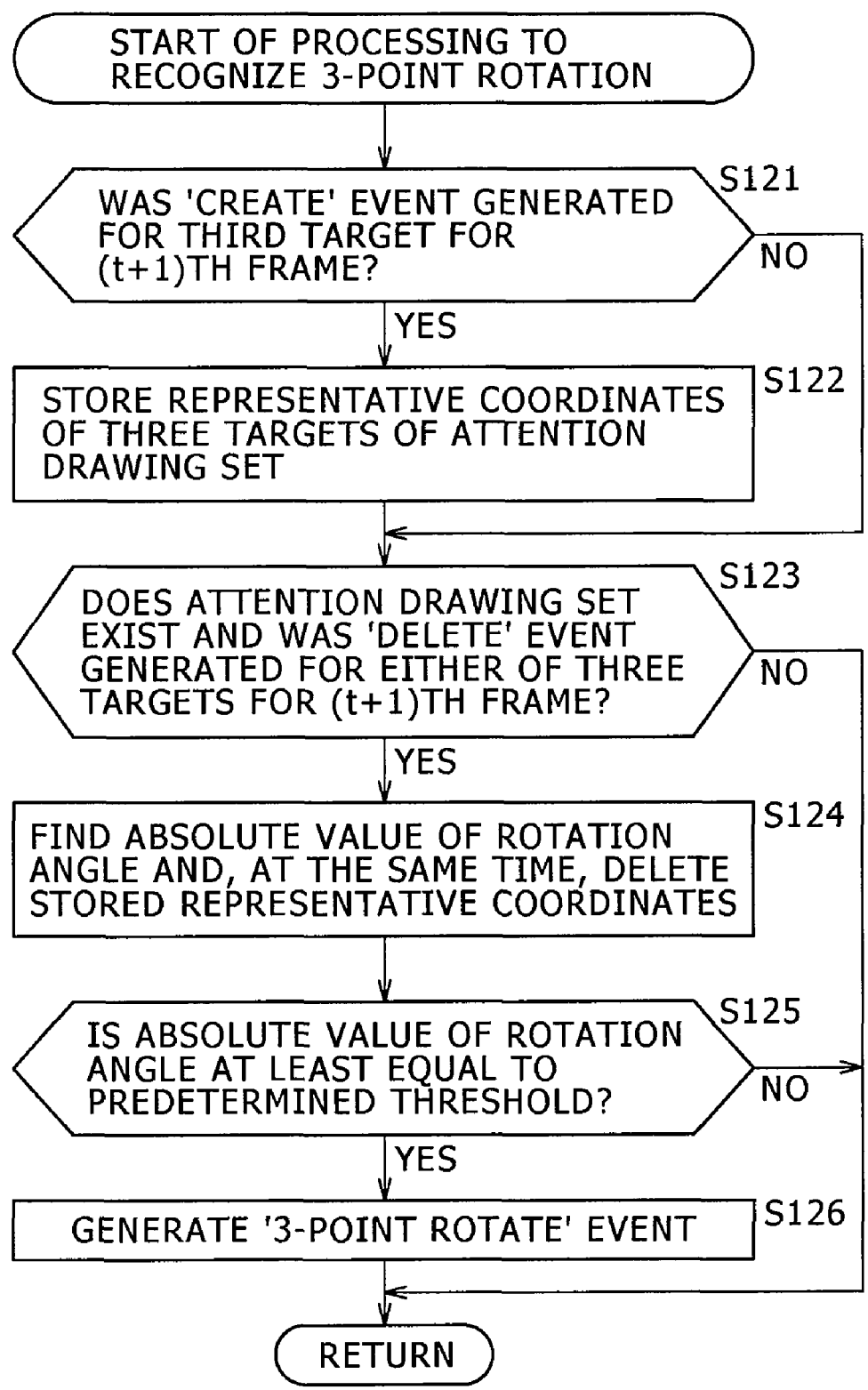
FIG. 23 shows a flowchart to be referred to in description of processing carried out at the step S5 of the flowchart shown in FIG. 2 in order to recognize 3-point rotation.

By referring to a flowchart shown in FIG. 23, the following description explains processing carried out by the event generation section 32 of the generation section 25 employed in the display system 1 shown in FIG. 1 at the step S5 of the flowchart shown in FIG. 2 in order to recognize 3-point rotation and generate a '3-point rotate' event indicating the recognized rotation.

It is to be noted that, since the processing carried out in order to recognize 3-point rotation and generate a '3-point rotate' event indicating the recognized 3-point rotation is carried out after an integration process, at the start of the processing, information on targets on the start frame and information on targets on the (t+1)th frame appearing after the integration process are already in a state of being usable.

As shown in FIG. 23, the flowchart begins with a step S121 at which the event generation section 32 produces a result of determination as to whether or not a 'create' event has been generated with the timing of a third target for the (t+1)th frame. If the determination result produced in the process carried out at the step S121 indicates that a 'create' event has been generated with the timing of the third target for the (t+1)th frame, the flow of the 3-point rotation recognition processing represented by this flowchart goes on to a step S122. At the step S122, the event generation section 32 takes a set of three targets on the (t+1)th frame as an attention drawing set and stores the representative coordinates of the three targets pertaining to the attention drawing set in the storage section 33 along with the target IDs of the three targets by associating the representative coordinates and their respective target IDs with each other.

If the determination result produced in the process carried out at the step S121 indicates that a 'create' event has been generated for a target other than the third target with the timing of the (t+1)th frame or a 'create' event has not been generated at all with the timing of the (t+1)th frame, on the other hand, the flow of the 3-point rotation recognition processing represented by this flowchart goes on directly to a step S123 by skipping the process of the step S122.

At the step S123, the event generation section 32 produces a result of determination as to whether or not the three targets pertaining to the attention drawing set exist on the start frame and a 'delete' event has been generated for either one of the three targets pertaining to the attention drawing set with the timing of the (t+1)th frame.

If the determination result produced in the process carried out at the step S123 indicates that the three targets pertaining to the attention drawing set exist on the start frame and a 'delete' event has been generated for either one of the three targets pertaining to the attention drawing set with the timing of the (t+1)th frame, the flow of the 3-point rotation recognition processing represented by this flowchart goes on to a step S124. At the step S124, the event generation section 32 reads out representative coordinates associated with the target IDs as the representative coordinates of the three targets pertaining to the attention drawing set on the start frame as well as representative coordinates associated with the target IDs as the representative coordinates of the three targets pertaining to the attention drawing set on the (t+1)th frame from the storage section 33. Then, the event generation section 32 finds the absolute value of the average rotation angle for the three targets from the representative coordinates of the three targets pertaining to the attention drawing set on the start frame and the representative coordinates of the three targets pertaining to the attention drawing set on the (t+1)th frame in accordance with Eq. (5). In addition, the event generation section 32 deletes the representative coordinates of the three targets pertaining to the attention drawing set on the start and (t+1)th frames and the IDs of the three targets from the storage section 33 in order to prevent the storage area of the storage section 33 from being wasted unnecessarily.

If the determination result produced in the process carried out at the step S123 indicates that the three targets pertaining to the attention drawing set do not exist on the start frame or a 'delete' event has not been generated for either one of the three targets pertaining to the attention drawing set with the timing of the (t+1)th frame, on the other hand, the event generation section 32 ends the execution of the 3-point rotation recognition processing represented by this flowchart without carrying out the processes of the steps S124 to S126.

At the step S125 following the step S124, the event generation section 32 produces a result of determination as to whether or not the absolute value found in the process carried out at the step S124 as the absolute value of the average rotation angle for the three targets is at least equal to a predetermined threshold value. If the determination result produced in the process carried out at the step S125 indicates that the absolute value found in the process carried out at the step S124 as the absolute value of the average rotation angle for the three targets is at least equal to the predetermined threshold value, the flow of the 3-point rotation recognition processing represented by this flowchart goes on to a step S126. At the step S126, the event generation section 32 generates a '3-point rotate' event with extra information thereof including the average rotation angle of the three targets pertaining to the attention drawing set. Finally, the event generation section 32 ends the execution of the 3-point rotation recognition processing represented by this flowchart.

If the determination result produced in the process carried out at the step S125 indicates that the absolute value found in the process carried out at the step S124 as the absolute value of the average rotation angle for the three targets is smaller than the predetermined threshold value, on the other hand, the event generation section 32 ends the execution of the 3-point rotation recognition processing represented by this flowchart without carrying out the process of the step S126.

By producing a result of determination as to whether or not the absolute value of the average rotation angle found for three targets pertaining to the attention drawing set on the start frame and the three targets pertaining to the attention drawing set on the (t+1)th frame is at least equal to a predetermined threshold value as described above, it is possible to prevent a '3-point rotate' event from being generated by mistake in case the absolute value of the average rotation angle is found smaller than the predetermined threshold value.

By carrying out of the 3-point rotation recognition processing as described above, it is possible to generate a '3-point rotate' event indicating that the absolute value of the average rotation angle found for three targets pertaining to the attention drawing set on the start frame and the three targets pertaining to the attention drawing set on the (t+1)th frame is at least equal to a predetermined threshold value.

It is to be noted that, in the 3-point rotation recognition processing, if four or more targets exist on the (t+1)th frame, a '3-point rotate' event is not generated. If four or more targets exist on the (t+1)th frame, it is possible to provide a configuration in which sets each consisting of two targets are formed and an angle of rotation is created for each of the sets. Then, an average angle of rotation is computed from the rotation angles each found for a set. Finally, if the absolute value of the average rotation angle is at least equal to a predetermined threshold value, a predetermined event is generated.

As described above, even if inputs are entered to a plurality of points on the input/output panel 16 from an external source, on the basis of timewise or spatial relations between input portions each located on a present frame as portions each receiving one of the inputs and targets each located on a frame immediately preceding the present frame as a target representing a series of aforementioned inputs entered so far, a specific input portion may be integrated with a target associated with the specific input portion and information on the associated target is updated in order to generate an updated target. In addition, information on an event representing a change in state from the pre-updating target to the post-updating target is also generated as well. Thus, information on inputs entered to the points can be handled with ease.

When the integration processing and the recognition processing are carried out as described above, the number of events having information thereof stored in the storage section 33 undesirably increases. In order to solve this problem, a so-called garbage collecting process is carried out in order to delete information on events from the storage section 33 if a predetermined condition is satisfied. For example, the garbage collecting process is carried out if a predetermined period of time has lapsed or if the number of events having information thereof stored in the storage section 33 exceeds a predetermined number.

By the same token, the garbage collecting process can be carried out in order to delete information on targets from the storage section 33 if a predetermined condition is satisfied in the same way as events. For example, the garbage collecting process is carried out if a predetermined period of time has lapsed or if the number of targets having information thereof stored in the storage section 33 exceeds a predetermined number.

In the recognition processing described above, an event is generated on the basis of information on targets. In this case, the information on targets is the representative coordinates of each target. As an alternative, an event may also be generated on the basis of information on target areas, information on target regions or other information on targets.

Let us assume for example that the user strongly presses a finger thereof against an input portion on the display screen of the input/output display 22 in order to enter an input. In this case, an area (or a size) included in the information on a target, with which the pressed input portion is integrated, as the area of the input portion is compared with a predetermined threshold value. If the area of the input portion is found at least equal to the threshold value, a change of the state of the target is recognized and an even having a type corresponding to the recognized change is generated.

By referring to FIGS. 24 and 25, the following description explains the processing executed by the control section 12 at the step S7 of the flowchart shown in FIG. 2 in order to control a display on the input/output display 22.

Figure 24A:
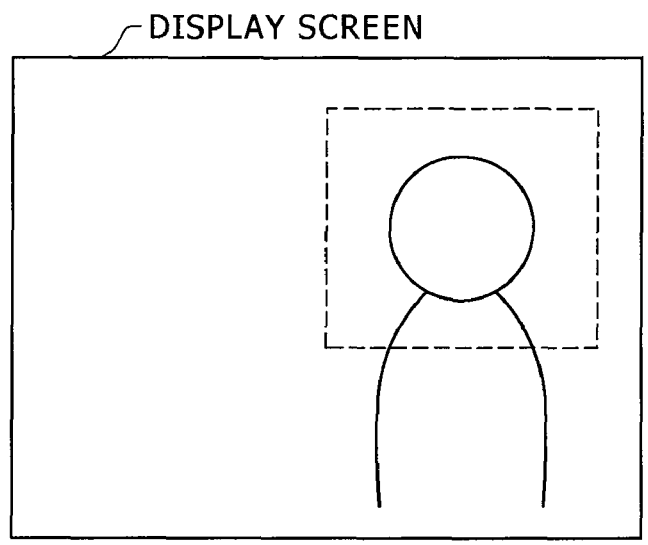
FIGS. 24A to 24C are explanatory diagrams showing each frame in processing carried out on the basis of information on an 'enlarge' event in order to control a display appearing on an input/output display.
Figure 24B:
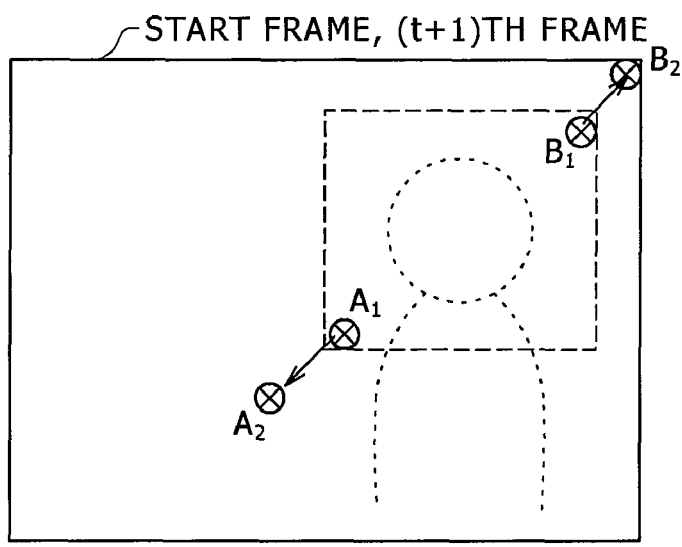
Figure 24C:
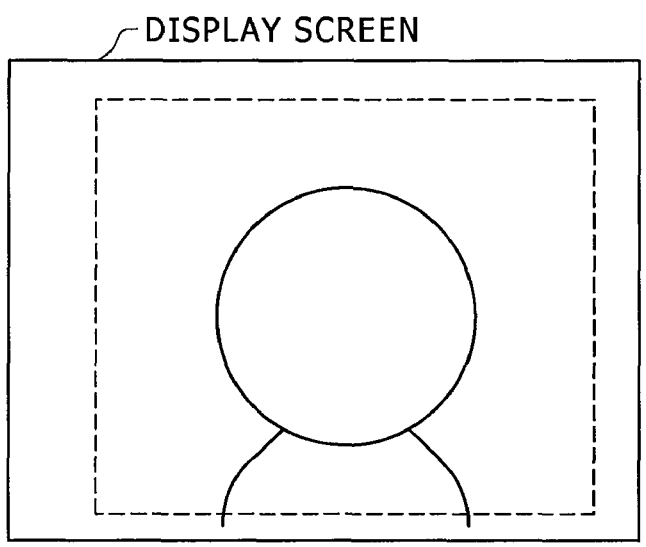

First of all, the user starts an operation to bring two fingers thereof into contact with the two ends of a region in which the user wants to display an enlarged image selected among images appearing on the display screen of the input/output display 22 as shown in FIG. 24B and, then, while sustaining the two fingers in the state of being in contact with the surface of the display screen thereafter, the user moves the two fingers over the surface of the display screen in order to separate the fingers from each other to result in an enlarged image as shown in FIG. 24C when the user removes the two fingers from the surface of the display screen. An enlargement rate E is defined as the ratio of the size of the enlarged image shown in FIG. 24C to the size of the original image shown in FIG. 24B. In this case, if the enlargement rate E is at least equal to a predetermined threshold value, the generation section 25 generates an 'enlarge' event as an event with extra information including the enlargement rate E and the representative coordinates (or the origin coordinates) of two targets on a start frame. Then, the generation section 25 outputs (or supplies) information on the 'enlarge' event to the control section 12. When the control section 12 receives information on the 'enlarge' event from the generation section 25, the control section 12 executes control to generate an enlarged image by enlarging an image selected among images appearing on the display screen of the input/output display 22 as the original image in the region cited above to typically the full size of the display screen and display the enlarged image on the display screen provided that the enlargement rate E is at least equal to the predetermined threshold value.

By referring to FIG. 24, the following description explains processing carried out by the control section 12 on the basis of information on an 'enlarge' event to control a display appearing on the display screen of the input/output display 22.

A frame with an appearance timing coinciding with the start of an operation carried out in order to bring two fingers thereof into contact with the surface of the display screen is referred to as a start frame shown in FIG. 24B.

FIG. 24A is an explanatory diagram showing the display screen of the input/output display 22. FIG. 24B is an explanatory diagram showing the (t+1)th frame superposed on the start frame. FIG. 24C is an explanatory diagram showing the display screen of the input/output display 22 as a result of the movements of the fingers over the surface of the display screen. The display screen shows an enlarged area of the face of the person. The face area has been enlarged on the basis of information on an 'enlarge' event.

As described above, FIG. 24A is an explanatory diagram showing the display screen of the input/output display 22. The display screen shows an image of a person on the right-hand side of the start frame.

In FIG. 24B, the user starts an operation to bring two fingers thereof into contact with respectively a position A1 on the left lower corner of a region enclosed by a dotted line in the figure as a region showing the face of the person on the start frame appearing on the surface of the display screen of the input/output display 22 and a position B1 on the right upper corner of the same region on the start frame and, while sustaining the fingers in the state of being in contact with the surface of the display screen thereafter, the user moves the two fingers over the surface of the display screen to respectively positions A2 and B2 on the (t+1)th frame appearing on the surface of the display screen in order to separate the fingers from each other. Then, when the user removes the fingers from the positions A2 and B2, the enlargement rate E of the distance between the two fingers is computed. If the enlargement rate E is found at least equal to a predetermined threshold value, the generation section 25 generates an 'enlarge' event having extra information including the enlargement rate E and outputs (or supplies) information on the 'enlarge' event to the control section 12.

When the control section 12 receives the information on the 'enlarge' event from the generation section 25, the control section 12 generates an image of an enlarged smallest-area (smallest-size) rectangular region including the origin coordinates mentioned before provided that the enlargement rate E included in the extra information is at least equal to the predetermined threshold value. Then, the control section 12 supplies the data of the image to the input/output display 22 by way of the display-signal processing section 21.

FIG. 24C is an explanatory diagram showing an image resulting a process carried out to enlarge the image to the full size of the display screen of the input/output display 22 on the display screen as an image of the face of the person.

As described above, the user starts an operation to bring two fingers thereof into contact with respectively a position A1 in the figure as a region showing the face of the person on the start frame appearing on the surface of the display screen of the input/output display 22 and a position B1 of the same region on the start frame appearing on the surface of the display screen of the input/output display 22 and, while sustaining the two fingers in the state of being in contact with the surface of the display screen thereafter, the user moves the two fingers over the surface of the display screen to respectively positions A2 and B2 on the (t+1)th frame appearing on the surface of the display screen in order to separate the fingers from each other. As a result, it is possible to show the image in a desired smallest-area (smallest-size) rectangular region enlarged to the full size of the display screen of the input/output display 22 on the display screen. In the example described above, the image is the image of the face of a person.

Figure 25A:
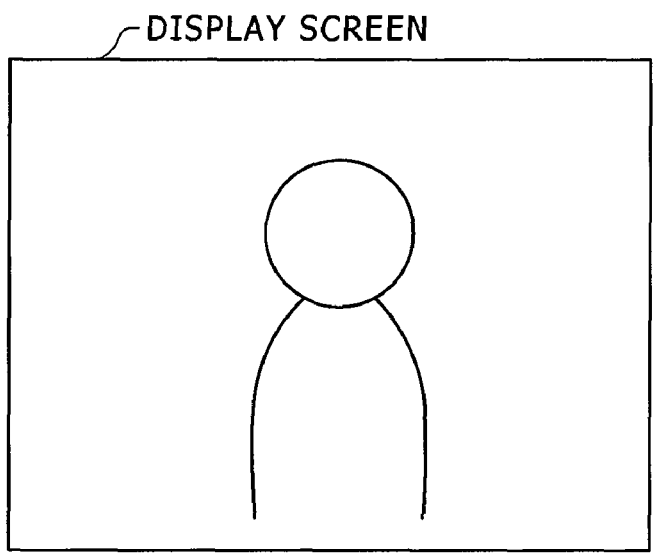
FIGS. 25A to 25C are explanatory diagrams showing each frame in processing carried out on the basis of information on a 'rotate' event in order to control a display appearing on the input/output display.
Figure 25B:
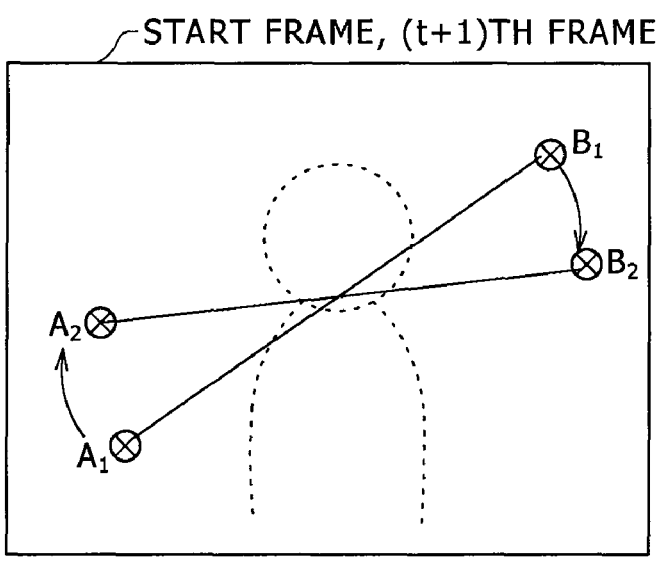
Figure 25C:
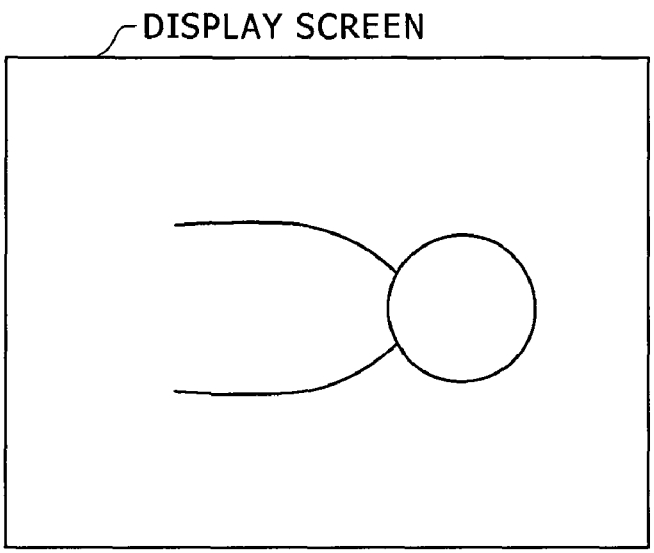

Next, the user starts an operation to bring two fingers thereof into contact with respectively positions A1 and B1 on the display screen of the input/output display 22 and, while sustaining the two fingers in the state of being in contact with the surface of the display screen thereafter, the user moves the two fingers over the surface of the display screen to positions A2 and B2 respectively in order to draw two concentric circles on the surface in such a way that the center common to the concentric circles coincides with a point on the surface as shown in FIG. 25B before removing the fingers from the surface. Then, when the user removes the fingers from the positions A2 and B2, the absolute value of a rotation angle $\theta$ formed by a straight line connecting the position A1 to the position B1 in conjunction with a straight line connecting the position A2 to the position B2 is computed. If the absolute value of the rotation angle $\theta$ is found at least equal to a predetermined threshold value, the generation section 25 generates a 'rotate' event having extra information including the rotation angle $\theta$ and outputs (or supplies) information on the 'rotate' event to the control section 12. When the control section 12 receives the information on the 'rotate' event from the generation section 25, as shown in FIG. 25C, the control section 12 generates an image rotated by 90 degrees in the clockwise direction from the orientation of the image shown in FIG. 25A or 25B provided that the absolute value of the rotation angle included in the extra information is at least equal to the predetermined threshold value. Then, the control section 12 supplies the data of the image to the input/output display 22 by way of the display-signal processing section 21.

By referring to FIG. 25, the following description explains processing carried out by the control section 12 on the basis of information on a 'rotate' event to control a display appearing on the display screen of the input/output display 22.

A frame with an appearance timing coinciding with the start of an operation carried out in order to bring two fingers thereof into contact with the surface of the display screen is referred to as a start frame. On the other hand, a frame with an appearance timing coinciding with the timing of a process carried out in order to generate the 'rotate' event is referred to as the (t+1)th frame.

FIG. 25A is an explanatory diagram showing the display screen displaying an image of a person at the center thereof. FIG. 25B is an explanatory diagram showing the (t+1)th frame superposed on the start frame. FIG. 25C is an explanatory diagram showing the display screen of the input/output display 22 as a result of the movements of the fingers. As shown in FIG. 25C, the control section 12 generates an image rotated by 90 degrees in the clockwise direction from the orientation of the image located at the center of the display screen as shown in FIG. 25A or 25B on the basis of information on a 'rotate' event generated with the timing of the (t+1)th frame.

As described above, FIG. 25A is an explanatory diagram showing the display screen of the input/output display 22 displaying an image of a person at the center of the start frame appearing on the surface of the display screen of the input/output display 22.

As shown in FIG. 25B, the user starts an operation to bring two fingers thereof into contact with respectively positions A1 and B1 on the start frame appearing on the surface of the display screen of the input/output display 22 and, while sustaining the two fingers in the state of being in contact with the surface of the display screen of the input/output display 22 thereafter, the user moves the two fingers over the surface of the display screen to respectively positions A2 and B2 on the (t+1)th frame appearing on the surface of the display screen in order to draw two concentric circles on the surface in such a way that the center common to the concentric circles coincides with a point on the surface before removing the fingers from the surface. Then, when the user removes the fingers from the positions A2 and B2 on the surface of the display screen, the absolute value of a rotation angle θ formed by a straight line connecting the position A1 to the position B1 in conjunction with a straight line connecting the position A2 to the position B2 is computed. If the absolute value of the rotation angle θ is found at least equal to a predetermined threshold value, the generation section 25 generates a 'rotate' event having extra information including the rotation angle θ and outputs (or supplies) information on the 'rotate' event to the control section 12.

When the control section 12 receives the information on the 'rotate' event from the generation section 25, as shown in FIG. 25C, the control section 12 generates an image rotated by 90 degrees in the clockwise direction from the orientation of the image shown in FIG. 25A or 25B provided that the absolute value of the rotation angle included in the extra information is at least equal to the predetermined threshold value. Then, the control section 12 supplies the data of the image to the input/output display 22 by way of the display-signal processing section 21.

As explained above, FIG. 25C is an explanatory diagram showing the display screen of the input/output display 22 as a result of the movements of the fingers. As shown in FIG. 25C, the control section 12 generates an image rotated by 90 degrees in the clockwise direction from the orientation of the image located at the center of the display screen as shown in FIG. 25A or 25B on the basis of information on a 'rotate' event.

As described above, the user starts an operation to bring two fingers thereof into contact with respectively positions A1 and B1 on the display screen of the input/output display 22 and, while sustaining the two fingers in the state of being in contact with the surface of the display screen thereafter, the user moves the two fingers over the surface of the display screen to positions A2 and B2 respectively in order to draw two concentric circles on the surface in such a way that the center common to the concentric circles coincides with a point on the surface before removing the fingers from the surface. As a result, it is possible to display an image rotated by 90 degrees in the clockwise direction from the orientation of the image located at the center of the display screen of the input/output display 22 on the screen.

FIG. 26 is a block diagram showing a typical configuration of another embodiment implementing a display system 101 to which the present application is applied.

The display system 101 shown in FIG. 26 is obtained by moving the generation section 25 employed in the input/output panel 16 as shown in FIG. 1 to the control section 12.

The display system 101 shown in FIG. 26 employs an antenna 110, a signal processing section 111, a storage section 113, an operation section 114, a communication section 115, a display-signal processing section 121, an input/output display 122, optical sensors 122A, a received-light signal processing section 123, an image processing section 124 and a control generation section 125, which are identical with respectively the antenna 10, the signal processing section 11, the storage section 13, the operation section 14, the communication section 15, the display-signal processing section 21, the input/output display 22, the optical sensors 22A, the received-light signal processing section 23, the image processing section 24 and the control generation section 25, which are employed in the display system 1 shown in FIG. 1. Thus, the display system 101 shown in FIG. 26 is capable of carrying out the same processing to control the display of an image based on a received-light signal as the display system 1 shown in FIG. 1. The storage section 113 employed in the display system 101 shown in FIG. 26 serves as both the data storage section 13 and the storage section 33, which are employed in the control generation section 25 shown in FIG. 1.

FIG. 27 is a block diagram showing a typical configuration of a further embodiment implementing a display system 201 to which the present application is applied.

The display system 201 shown in FIG. 27 is obtained by moving the generation section 25 and the image processing section 24, which are employed in the input/output panel 16 as shown in FIG. 1, to the control section 12.

The display system 201 shown in FIG. 27 employs an antenna 210, a signal processing section 211, a storage section 213, an operation section 214, a communication section 215, a display-signal processing section 221, an input/output display 222, optical sensors 222A, a received-light signal processing section 223, an image processing section 224 and a control generation section 225, which are identical with respectively the antenna 10, the signal processing section 11, the storage section 13, the operation section 14, the communication section 15, the display-signal processing section 21, the input/output display 22, the optical sensors 22A, the received-light signal processing section 23, the image processing section 24 and the control generation section 25, which are employed in the display system 1 shown in FIG. 1. Thus, the display system 201 shown in FIG. 27 is capable of carrying out the same processing to control the display of an image based on a received-light signal as the display system 1 shown in FIG. 1.

The present application can be applied to not only a display apparatus employing an input/output display for receiving light and displaying an image based on the received light, but also other apparatus employing the input/output display. Examples of the other apparatus are a hand phone and a TV set.

The series of processes described previously can be carried out by hardware and/or execution of software. If the series of processes described above is carried out by execution of software, programs composing the software can be installed into a computer embedded in dedicated hardware, a general-purpose personal computer or the like from typically a program recording medium. A general-purpose personal computer is a personal computer, which can be made capable of carrying out a variety of functions by installing a variety of programs into the personal computer.

It is worth noting that, in this specification, steps of each of the programs cited above can be of course carried out in a pre-prescribed order along the time axis. Instead of carrying out the steps in a pre-prescribed order along the time axis, the steps can also be carried out concurrently or individually.

It is to be noted that the technical term 'system' used in this specification implies the configuration of a confluence including a plurality of apparatus.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A display apparatus comprising:
    a display screen;
    a processor; and
    a memory device storing instructions which when executed by the processor, causes the processor to:
    display an image on the display screen;
    detect a light beam representing an input received from an external source, wherein inputs received from the external source are inputs destined for a plurality of points on the display screen;
    generate information on a target located on said display screen to represent a series of inputs received from said external source on the basis of a timewise or spatial relation between input portions located on said display screen as portions receiving inputs from said external source; and
    recognize an event representing a change of a state of said target on the basis of said information on said target and generating information on said event;
    wherein said information on a target is attributes of said target at least including:
    identification information peculiar to said target; and
    information of coordinates of a position representing an input portion integrated with said target; and
    wherein said position representing the input portion integrated with said target is the center of gravity of said input portion or the center of said input portion.

2. The display apparatus according to claim 1, wherein the instructions further cause the processor to:
    change a display state of the display screen on the basis of said information on a target or said information on an event.

3. The display apparatus according to claim 1 wherein said information on a target is attributes of said target including:
    region information representing a range of the input portion integrated with said target;
    area information representing an area of the region of said input portion integrated with said target;
    time information representing a time at which a series of inputs by said target is started; and
    another time information representing a time at which a series of inputs by said target is ended.

4. A display apparatus comprising:
    a display screen;
    a processor; and
    a memory device storing instructions which when executed by the processor, causes the processor to:
    display an image on the display screen;
    detect a light beam representing an input received from an external source, wherein inputs received from the external source are inputs destined for a plurality of points on the display screen;
    generate information on a target located on said display screen to represent a series of inputs received from said external source on the basis of a timewise or spatial relation between input portions located on said display screen as portions receiving inputs from said external source; and
    recognize an event representing a change of a state of said target on the basis of said information on said target and generating information on said event
    wherein the instructions further cause the processor to:
    store said information on a target, and delete said stored information on a target on the basis of a predetermined condition.

5. The display apparatus according to claim 1 wherein said information on an event is attributes of said event at least including:
    identification information peculiar to said event;
    type information representing a type of said event;
    identification information identifying a target, a state of which is represented by said event; and
    time information representing a time at which said event is generated.

6. The display apparatus according to claim 5 wherein said information on an event is attributes of said event including additional information provided to said event.

7. A display apparatus comprising:
    a display screen;
    a processor; and
    a memory device storing instructions which when executed by the processor, causes the processor to:
    display an image on the display screen;
    detect a light beam representing an in input received from an external source, wherein inputs received from the external source are inputs destined for a plurality of points on the display screen;
    generate information on a target located on said display screen to represent a series of inputs received from said external source on the basis of a timewise or spatial relation between input portions located on said display screen as portions receiving inputs from said external source; and
    recognize an event representing a change of a state of said target on the basis of said information on said target and generating information on said event;
    wherein said information on an event is attributes of said event at least including:
    identification information peculiar to said event;
    type information representing a type of said event;
    identification information identifying a number of targets, a state of which is represented by said event;
    time information representing a time at which said event is generated; and
    a number of pieces of additional information provided to said event.

8. A display apparatus comprising:
    a display screen;
    a processor; and
    a memory device storing instructions which when executed by the processor, causes the processor to:
    display an image on the display screen;

detect a light beam representing an input received from an external source, wherein inputs received from the external source are inputs destined for a plurality of points on the display screen;

generate information on a target located on said display screen to represent a series of inputs received from said external source on the basis of a timewise or spatial relation between input portions located on said display screen as portions receiving inputs from said external source; and recognize an event representing a change of a state of said target on the basis of said information on said target and generating information on said event;

wherein the instructions further cause the processor to:

store said information on an event, and delete said stored information on an event on the basis of a predetermined condition.

9. A display apparatus comprising:
a display screen;
a processor; and
a memory device storing instructions which when executed by the processor, causes the processor to:

display an image on the display screen;

detect a light beam representing an input received from an external source, wherein inputs received from the external source are inputs destined for a plurality of points on the display screen;

generate information on a target located on said display screen to represent a series of inputs received from said external source on the basis of a timewise or spatial relation between input portions located on said display screen as portions receiving inputs from said external source; and recognize an event representing a change of a state of said target on the basis of said information on said target and generating information on said event; wherein the instructions further cause the processor to:

output a time at which said information on a target or an event respectively is outputted.

* * * * *